(12) United States Patent
Jakobsson et al.

(10) Patent No.: US 12,277,247 B2
(45) Date of Patent: Apr. 15, 2025

(54) SYSTEMS AND METHODS FOR ENCRYPTING AND CONTROLLING ACCESS TO ENCRYPTED DATA BASED UPON IMMUTABLE LEDGERS

(71) Applicant: Artema Labs, Inc, Los Angeles, CA (US)

(72) Inventors: Bjorn Markus Jakobsson, Portola Valley, CA (US); Stephen C. Gerber, Austin, TX (US); Ajay Kapur, Valencia, CA (US)

(73) Assignee: Artema Labs, Inc, Los Angeles, CA (US)

( * ) Notice: Subject to any disclaimer, the term of this patent is extended or adjusted under 35 U.S.C. 154(b) by 163 days.

(21) Appl. No.: 17/806,728

(22) Filed: Jun. 13, 2022

(65) Prior Publication Data
US 2022/0398340 A1    Dec. 15, 2022

Related U.S. Application Data

(60) Provisional application No. 63/282,211, filed on Nov. 23, 2021, provisional application No. 63/279,146, (Continued)

(51) Int. Cl.
    G06F 21/62    (2013.01)
    G06F 21/60    (2013.01)
    (Continued)

(52) U.S. Cl.
    CPC ........ *G06F 21/6245* (2013.01); *G06F 21/602* (2013.01); *H04L 9/30* (2013.01);
    (Continued)

(58) Field of Classification Search
    None
    See application file for complete search history.

(56) References Cited

U.S. PATENT DOCUMENTS 5,754,939 A * 5/1998 Herz ................. H04N 21/4622
                                                    348/E7.071
8,543,649 B2   9/2013 Gilmour et al.
               (Continued)

FOREIGN PATENT DOCUMENTS

EP    3244332 B1    3/2019
EP    3582439 A1 * 12/2019  ............... G06F 8/65
               (Continued)

OTHER PUBLICATIONS

Yongge Wang and Yuliang Zheng; (Fast and Secure Append-Only Storage with Infinite Capacity); pp. 9; Aug. 27 (Year: 2003).*
(Continued)

*Primary Examiner* — Cheng-Feng Huang
*Assistant Examiner* — Ali H. Cheema
(74) *Attorney, Agent, or Firm* — KPPB LLP

(57) ABSTRACT

Systems and methods for automated blockchain-based recommendation generation, advertising and promotion in accordance with various embodiments of the invention are described. A user device in accordance with an embodiment of the invention includes: a network interface; memory; and a processor. In addition, the processor is configured to implement an execution environment that enables: initiation of transactions via an immutable ledger; recordation of events; updating a user profile, where the user profile comprises at least one characterization associated with the user profile; encrypting the updated user profile and securely storing the encrypted user profile; receiving a request to access the encrypted user profile from a process; determining access permissions of the process; and when the process has sufficient access permissions, decrypting the user profile and providing user profile data to the process.

15 Claims, 55 Drawing Sheets

Related U.S. Application Data filed on Nov. 14, 2021, provisional application No. 63/233,304, filed on Aug. 15, 2021, provisional application No. 63/210,040, filed on Jun. 13, 2021.

(51) Int. Cl.
*H04L 9/30* (2006.01)
*G06F 21/64* (2013.01)
*H04L 9/00* (2022.01)

(52) U.S. Cl.
CPC ............... *G06F 21/64* (2013.01); *H04L 9/50* (2022.05); *H04L 2209/42* (2013.01)

(56) References Cited

U.S. PATENT DOCUMENTS

| | | | |
|---|---|---|---|
| 8,620,767 | B2 | 12/2013 | Linden et al. |
| 9,143,542 | B1 | 9/2015 | Tseytlin |
| 10,735,192 | B2 | 8/2020 | Kim et al. |
| 10,887,447 | B2 | 1/2021 | Jakobsson et al. |
| 10,909,529 | B2* | 2/2021 | Ortiz ................... G06F 21/62 |
| 10,929,512 | B1 | 2/2021 | Jakobsson |
| 10,936,749 | B2 | 3/2021 | Jakobsson |
| 10,951,435 | B2 | 3/2021 | Jakobsson |
| 10,993,082 | B2 | 4/2021 | Jakobsson |
| 11,017,036 | B2 | 5/2021 | Jakobsson |
| 11,343,107 | B2* | 5/2022 | Främling ............. H04L 9/3247 |
| 11,610,012 | B1* | 3/2023 | Della Maggiora ... G06F 21/645 |
| 2007/0033414 | A1 | 2/2007 | Dunko |
| 2008/0034369 | A1 | 2/2008 | Polizzi et al. |
| 2010/0031335 | A1* | 2/2010 | Handler ................. H04L 63/08 726/8 |
| 2010/0191919 | A1* | 7/2010 | Bernstein ............. G06F 3/0688 711/141 |
| 2011/0238478 | A1* | 9/2011 | Gottfurcht ............ G06Q 30/02 705/14.25 |
| 2012/0130812 | A1 | 5/2012 | Ramer et al. |
| 2013/0007041 | A1 | 1/2013 | Comparelli et al. |
| 2014/0223573 | A1 | 8/2014 | Reedy et al. |
| 2014/0359782 | A1* | 12/2014 | Golic ................. H04L 63/0407 726/26 |
| 2015/0019944 | A1 | 1/2015 | Kalgi |
| 2015/0100488 | A1 | 4/2015 | Dua |
| 2015/0339020 | A1 | 11/2015 | D'amore et al. |
| 2016/0050188 | A1* | 2/2016 | Wilson ............... H04L 63/0435 713/171 |
| 2016/0260089 | A1 | 9/2016 | Chen |
| 2016/0366245 | A1 | 12/2016 | Gupta |
| 2017/0109839 | A1 | 4/2017 | Berryman |
| 2017/0250816 | A1* | 8/2017 | Popa ....................... G06F 21/62 |
| 2017/0277773 | A1* | 9/2017 | Iasi ......................... H04W 4/08 |
| 2018/0077092 | A1 | 3/2018 | Jalil |
| 2019/0026730 | A1 | 1/2019 | Moy et al. |
| 2019/0079950 | A1* | 3/2019 | Ramabaja ............. H04L 9/0637 |
| 2019/0122152 | A1 | 4/2019 | Mccoy et al. |
| 2019/0147495 | A1* | 5/2019 | Wilson ............... G06Q 30/0269 705/14.66 |
| 2019/0164153 | A1 | 5/2019 | Agrawal et al. |
| 2019/0333031 | A1 | 10/2019 | Kravitz |
| 2019/0356473 | A1 | 11/2019 | Rosenoer et al. |
| 2019/0362169 | A1 | 11/2019 | Lin et al. |
| 2019/0394179 | A1 | 12/2019 | Androulaki et al. |
| 2020/0027117 | A1* | 1/2020 | Cotsakos ........... G06Q 30/0235 |
| 2020/0099530 | A1 | 3/2020 | Khatib et al. |
| 2020/0117690 | A1 | 4/2020 | Tran et al. |
| 2020/0151715 | A1 | 5/2020 | Sato et al. |
| 2020/0184473 | A1 | 6/2020 | Fang et al. |
| 2020/0200824 | A1* | 6/2020 | Narayanaswami ..... H04L 67/12 |
| 2020/0250633 | A1* | 8/2020 | Vinson ............... G06Q 20/3676 |
| 2020/0250719 | A1 | 8/2020 | Shah |
| 2020/0273048 | A1 | 8/2020 | Andon et al. |
| 2020/0274712 | A1 | 8/2020 | Gray et al. |
| 2020/0304289 | A1* | 9/2020 | Androulaki ........... H04L 9/0637 |
| 2020/0334752 | A1 | 10/2020 | Doney et al. |
| 2020/0364588 | A1* | 11/2020 | Knox ..................... G06V 40/20 |
| 2020/0387433 | A1* | 12/2020 | Wang .................. G06F 16/2365 |
| 2021/0073811 | A1 | 3/2021 | Chan et al. |
| 2021/0209249 | A1 | 7/2021 | Hoffer |
| 2021/0209684 | A1* | 7/2021 | Foote .................. G06Q 20/0655 |
| 2021/0377052 | A1 | 12/2021 | Brown |
| 2021/0390161 | A1 | 12/2021 | Nakadaira et al. |
| 2021/0406449 | A1 | 12/2021 | Meling |
| 2021/0406904 | A1 | 12/2021 | Ravinathan |
| 2022/0020018 | A1 | 1/2022 | Jivanyan et al. |
| 2022/0129481 | A1* | 4/2022 | Galindo ................ H04L 63/108 |
| 2022/0147961 | A1 | 5/2022 | Yoon et al. |
| 2022/0198524 | A1* | 6/2022 | Wang .................. G06F 16/9558 |
| 2022/0391887 | A1 | 12/2022 | Jakobsson et al. |
| 2022/0398538 | A1 | 12/2022 | Jakobsson et al. |
| 2022/0407702 | A1 | 12/2022 | Jakobsson et al. |
| 2023/0050944 | A1* | 2/2023 | Martinez De La Cruz ................. H04L 63/0435 |
| 2023/0055618 | A1 | 2/2023 | Jakobsson et al. |
| 2023/0385815 | A1 | 11/2023 | Jakobsson et al. |
| 2024/0086915 | A1 | 3/2024 | Finlow-bates |

FOREIGN PATENT DOCUMENTS

| | | |
|---|---|---|
| EP | 4356307 A1 | 4/2024 |
| EP | 4359984 A1 | 5/2024 |
| EP | 4388405 A1 | 6/2024 |
| WO | 2019193452 A1 | 10/2019 |
| WO | 2020090118 A1 | 5/2020 |
| WO | 2022178096 A1 | 8/2022 |
| WO | 2022261650 A2 | 12/2022 |
| WO | 2022266608 A1 | 12/2022 |
| WO | 2022266609 A1 | 12/2022 |
| WO | 2022272272 A1 | 12/2022 |
| WO | 2022261650 A3 | 1/2023 |
| WO | 2023028462 A1 | 3/2023 |
| WO | 2022272272 A9 | 11/2023 |
| WO | 2024059758 A1 | 3/2024 |

OTHER PUBLICATIONS

Yongge Wang and Yuliang Zheng; "Fast and Secure Append-Only Storage with Infinite Capacity" pp. 9; Published on Aug. 27, 2003.*

Christian Tschudin; "End-to-end Encrypted Scalable Abstract Data Types over ICN" pp. 7; Published on Sep. 21-23, 2018.*

Yongge Wang and Yuliang Zheng; (Fast and Secure Append-Only Storage with Infinite Capacity); p. 9; Published on Aug. 27. (Year: 2003).*

Matteo Maffei, Giulio Malavolta, Manuel Reinert, Dominique Schroder; (Privacy and Access Control for Outsourced Personal Records); p. 18; Published on Jul. 20 (Year: 2015).*

Randy Baden, Adam Bender, Neil Spring, Bobby Bhattacharjee, and Daniel Starin; (Persona: An Online Social Network with User-Defined Privacy); p. 12; Published on Aug. 16 (Year: 2009).*

International Preliminary Report on Patentability for International Application PCT/US2022/072829, Report issued Nov. 21, 2023, Mailed on Dec. 21, 2023, 07 Pgs.

International Preliminary Report on Patentability for International Application PCT/US2022/072910, Report issued Dec. 14, 2023, Mailed on Dec. 28, 2023, 09 Pgs.

International Preliminary Report on Patentability for International Application PCT/US2022/072911, Report issued Dec. 14, 2023, Mailed on Dec. 28, 2023, 08 Pgs.

International Preliminary Report on Patentability for International Application PCT/US2022/073098, Report issued Dec. 14, 2023, Mailed on Jan. 4, 2024, 05 Pgs.

International Preliminary Report on Patentability for International Application PCT/US2022/075297, Report issued Feb. 27, 2024, Mailed on Mar. 7, 2024, 07 Pgs.

International Search Report and Written Opinion for International Application No. PCT/US2022/073098, Search completed Aug. 20, 2022, Mailed Sep. 12, 2022, 12 pgs.

International Search Report and Written Opinion for International Application No. PCT/US2023/074260, Search completed Dec. 8, 2023, Mailed Feb. 9, 2024, 18 Pgs.

(56) References Cited

OTHER PUBLICATIONS

International Search Report and Written Opinion for International Application No. PCT/US2022/072829, Search completed Oct. 12, 2022, Mailed Oct. 26, 2022, 17 pgs.

International Search Report and Written Opinion for International Application No. PCT/US2022/072910, Search completed Oct. 2, 2022, Mailed Oct. 17, 2022, 16 pgs.

International Search Report and Written Opinion for International Application No. PCT/US2022/072911, Search completed Aug. 16, 2022, Mailed Oct. 17, 2022, 15 pgs.

International Search Report and Written Opinion for International Application No. PCT/US2022/075297, Search completed Nov. 25, 2022, Mailed Jan. 3, 2023, 13 Pgs.

"Financial Instruments in Recommendation Mechanisms", Published in FC 2002: Financial Cryptography, 2003, LNCS 2357, pp. 31-43.

Adida et al., "Towards Trustworthy Elections—New Directions in Electronic Voting".

Brands et al., "Distance-Bounding Protocols", Workshop on the Theory and Application of of Cryptographic Techniques Eurocrypt1993: Advances in Cryptology—Eurocrypt '93, First Online: Jul. 13, 2001, pp. 344-359.

Camenisch et al., "Signature Schemes and Anonymous Credentials from Bilinear Maps", Annual International Cryptology Conference Crypto 2004: Advances in Cryptology—Crypto 2004 pp. 56-72.

Chaum, , "Untraceable Electronic Mail, Return Addresses, and Digital Pseudonyms", Communications of the ACM, Feb. 1981, vol. 24 Issue 2, pp. 84-88.

Colberg et al., "SPlaT: A System for Self-Plagiarism Detection", Published in IADIS International Conference WWW/INTERNET 2003, Algarve, Portugal Nov. 5-8, 2003.

Coppersmith et al., "Almost Optimal Hash Sequence Traversal", Proceedings of the 6th international conference on Financial cryptography, 16pgs.

Firsov et al., "BLT+L: Efficient Signatures from Timestamping and Endorsements".

Goldschlag et al., "Onion Routing for Anonymous and Private Internet Connections", Communications of the ACM, Feb. 1999, 42(2) DOI: 10.1145/293411.293443, 6pgs.

Golle et al., "Reusable Anonymous Return Channels", WPES '03: Proceedings of the 2003 ACM workshop on Privacy in the electronic society Oct. 2003 pp. 94-100. https://doi.org/10.1145/1005140.1005155.

Grozea et al., "ENCOPLOT: Pairwise sequence matching in linear time applied to plagiarism detection", Published in 3rd PAN Workshop. Uncovering Plagiarism, Authorship and Social Software Misuse 2009.

Hastad et al., "Funkspiel schemes: an alternative to conventional tamper resistance", CCS 2000, Proceedings of the 7th ACM Conference on Computer and Communications Security, 2000, 10 pgs.

Herzberg et al., "Proactive public key and signature systems", CCS '97: Proceedings of the 4th ACM conference on Computer and communications security Apr. 1997 pp. 100-110. https://doi.org/10.1145/266420.266442.

Jakobsson, , "On Quorum Controlled Asymmetric Proxy Re-encryption", Lecture Notes in Computer Science, Oct. 1999, vol. 1560: 632-632. DOI:10.1007/3-540-49162-7_9.

Jakobsson et al., "Mix and Match: Secure Function Evaluation via Ciphertexts", Advances in Cryptology—Asiacrypt 2000 pp. 162-177.

Micali et al., "A Simple Method for Generating and Sharing Pseudo-Random Functions, with Applications to Clipper-like Escrow Systems", Annual International Cryptology Conference, Crypto 1995: Advances in Cryptology—Crypto' 95 pp. 185-196.

Munster et al., "People's Expensive NFTs Keep Vanishing. This Is Why", Obtained online from https://www.vice.com/en/article/pkdj79/peoples-expensive-nfts-keep-vanishing-this-is-why, Mar. 29, 2021, 7 pages.

Reiter et al., "Anonymous Web transactions with Crowd", Communications of the ACM vol. 42 Issue Feb. 2, 1999 pp. 32-48 https://doi.org/10.1145/293411.293778.

Weyl et al., "Decentralized Society: Finding Web3's Soul", Available at SSRN: https://ssrn.com/abstract=4105763, May 10, 2022, 37 pages.

Yin et al., "Convolutional neural network for paraphrase identification", Published in Proceedings of the 2015 Conference of the North American Chapter of the Association for Computational Linguistics: Human Language Technologies, 2015.

* cited by examiner

SYSTEMS AND METHODS FOR ENCRYPTING AND CONTROLLING ACCESS TO ENCRYPTED DATA BASED UPON IMMUTABLE LEDGERS

CROSS-REFERENCE TO RELATED APPLICATIONS

The current application claims the benefit of and priority under 35 U.S.C. § 119(e) to U.S. Provisional Patent Application No. 63/210,040 entitled "Content Recommendation Method" filed Jun. 13, 2021, U.S. Provisional Patent Application No. 63/233,304 entitled "Targeted Execution Environment" filed Aug. 15, 2021, U.S. Provisional Patent Application No. 63/279,146 entitled "Usage Statistics Tokens and Applications" filed Nov. 14, 2021, and U.S. Provisional Patent Application No. 63/282,211 entitled "Automated Blockchain Based Recommendation Generation, Advertising and Promotion" filed Nov. 23, 2021, the disclosures of which are hereby incorporated by reference in their entireties for all purposes.

FIELD OF THE INVENTION

The present invention relates generally to computer security and more specifically to systems and methods for securely accessing encrypted user profile data automatically accumulated using entries in immutable ledgers.

BACKGROUND

Evaluation of product and service suitability for a person or organization is becoming increasingly complex. Historically, many products have been mass-produced, and evaluated using the reputation of the manufacturer or the brick-and-mortar stores that sell the products. Among other things, this fails in a world where more and more products are sold online, by sellers that are not recognized by the buyers. Custom products, such as artwork, have been evaluated by a small group of knowledgeable specialists (e.g., artists, investors, or resellers) and the larger public have merely accepted their wisdom and preferences as valuable. This becomes untenable when the perceived number of products dramatically increases, at which time only the most recognized products and brands (such as individual paintings and artists) will be recognized, and a large body of lesser-known quality products will be undervalued by the greater masses. It may also be said that the higher volume, most widely adopted products, generally lack in quality. Similarly, services can maintain a reputation when there are relatively few services and service providers, and it is easy to select a mainstream choice; however, as services increasingly become customized, the evaluation of quality becomes more difficult. Digital goods and services are no different, and there are many examples that show how recommendation systems fail, are gamed, or do not represent the likely preferences of an individual whose opinions are not aligned with other consumers. Moreover, in an area where speculation is rife and value fluctuates rapidly, and sometimes due to manipulation of the marketplace, whether by users or bots, there is very little trust in recommendations as the risks of abuse or other failures are high. The direst situation arises for online sales of customized products and services from largely unknown but potentially very talented providers, which is the direction the Internet is currently headed in terms of commerce.

SUMMARY OF THE INVENTION

Systems and methods for automated blockchain-based recommendation generation, advertising and promotion in accordance with various embodiments of the invention are described.

A recommendation platform in accordance with an embodiment of the invention includes: a network interface; memory; and a processor, the processor configured to:
retrieve transaction data records stored within an immutable ledger, where each retrieved data record is associated with a public key; and
each public key is associated with a user profile;
identify a need associated with a specific user profile based upon information including retrieved data records associated with the public key of the specific user profile;
identify retrieved data records containing information relevant to the identified need;
identify user profiles associated with the retrieved data records containing information relevant to the identified need;
determine weights based upon similarity of the identified user profiles associated with the retrieved data records containing information relevant to the identified need and the specific user profile;
weight the information from the retrieved data records containing information relevant to the identified need based upon the determined weights;
generate a recommendation with respect to a resource based upon the weighted information from the retrieved data records containing information relevant to the identified need; and
transmit the recommendation to a user device associated with the specific user profile.

In a further embodiment, the resource is at least one of a specific product and a specific service.

In another embodiment, the retrieved transaction data records stored within an immutable ledger comprise transactions reflecting actions associated with user profiles.

In a still further embodiment, the processor is further configured to: determine a precision of the recommendation based upon the weighted information from the retrieved data records containing information relevant to the identified need; and transmit the precision to the user device associated with the specific user profile.

In still another embodiment, the processor is further configured to determine that the precision is insufficient to generate a recommendation.

In a yet further embodiment, the determination that the precision is insufficient to generate a recommendation comprises comparing the determined precision to a threshold.

In yet another embodiment, the recommendation comprises rendering information that directs the user device how to render the recommendation via a user interface.

In a further embodiment again, the recommendation includes a plurality of alternative recommendations.

In another embodiment again, the processor is further configured to determine weights by generating a matrix of weights for the specific user profile.

In a further additional embodiment, the matrix of weights includes: a first dimension that corresponds to different user profiles; and a second dimension that corresponds to a weighted array, where each entry in the weighted array corresponds to a weight for one resource characterized in that the weight indicates the similarity of the specific user profile with one of the different user profiles.

In another additional embodiment, the matrix of weights further comprises a third dimension corresponding to different resources.

In a still yet further embodiment, the matrix of weights further comprises at least one dimension representing at least one of temporal aspects, and preferences.

In still yet another embodiment, the processor is further configured to estimate the scarcity of a resource to which the recommendation relates.

In a still further embodiment again, the processor is further configured to receive the specific user profile as an input.

In still another embodiment again, the specific user profile includes at least one selected from the group consisting of:
  demographic data;
  action data; and
  at least one recommendation associated with the specific user profile.

In a still further additional embodiment, the processor is further configured to identify opinions associated with the specific user profile.

In still another additional embodiment, at least one of the opinions associated with the specific user profile is identified within the retrieved transaction data records.

In a yet further embodiment again, the processor is further configured to use the specific user profile to retrieve at least one additional source of information selected from the group consisting of:
  demographic data;
  action data; and
  at least one recommendation associated with the specific user profile.

In yet another embodiment again, the processor is further configured to store information concerning features of the resource as an N-dimensional feature vector.

In a yet further additional embodiment, the processor is further configured to generate a self-organized map of a plurality of resources based upon N-dimensional feature vectors for each of the plurality of resources.

In yet another additional embodiment, the processor is further configured to generate a lower dimensional representation of a plurality of resources based upon N-dimensional feature vectors for each of the plurality of resources.

In a further additional embodiment again, the processor is further configured to identify a subspace of a plurality of resources based upon N-dimensional feature vectors for each of the plurality of resources.

In another additional embodiment again, the subspace corresponds to a plurality of resources having at least one characteristic relevant to the identified need.

In a still yet further embodiment again, the processor is further configured to detect user profiles associated with abuse based upon the retrieve transaction data records and a representation of a plurality of resources.

In still yet another embodiment again, the processor is further configured to automatically generate user profiles.

In a still yet further additional embodiment, the retrieved transaction data records include information concerning conversion of a previously generated recommendation and the processor is further configured to determine an attribution for the conversion to one of the user profiles associated with the retrieved data records.

A process in accordance with an embodiment of the invention includes:
  retrieving data records from at least one immutable ledger using a recommendation platform, where each retrieved data record is associated with a public key;
  associating information obtained from retrieved data records associated with specific public keys using the recommendation platform;
  generating at least one user profile based on information associated with specific public keys using the recommendation platform;
  generating at least one characterization for association within the at least one user profile based on information associated with specific public keys using the recommendation platform;
  receiving a request with respect to an identifier associated with an identified user profile using the recommendation platform; and
  generating a response to the request based upon at least one characterization associated with the identified user profile using the recommendation platform.

A further embodiment of the process of the invention further includes creating a cluster of user profiles based upon characterizations associated with the clustered user profiles.

In another embodiment of the process of the invention, the response is a recommendation generated based upon the cluster of user profiles.

In a still further embodiment of the method of the invention, the request includes a template identifying at least one characterization.

Still another embodiment of the method of the invention further includes receiving information associated with the at least one user profile from at least one end-user module present on at least one user device.

In a yet further embodiment of the method of the invention, the information associated with the at least one user profile is a token.

In yet another embodiment of the method of the invention, the response is a token.

A further embodiment again of the method of the invention further includes receiving information associated with the at least one user profile from at least one execution environment present on at least one user devices.

A user device in accordance with an embodiment of the invention includes: a network interface; memory; and a processor, the processor configured to implement an execution environment that enables:
  initiation of transactions via an immutable ledger;
  recordation of events;
  updating a user profile, where the user profile comprises at least one characterization associated with the user profile;
  encrypting the updated user profile and securely storing the encrypted user profile;
  receiving a request to access the encrypted user profile from a process;
  determining access permissions of the process; and
  when the process has sufficient access permissions, decrypting the user profile and providing user profile data to the process.

In a further embodiment, the events comprise user request and user actions.

In another embodiment, the processor is further configured to transmit user profile data for remote storage.

In a still further embodiment, the processor is further configured to receive user profile data from a remote source and the execution environment enables updating of the user profile data of the encrypted user profile based upon the received user profile data.

In still another embodiment, the processor is further configured to create an append-only area of user profile data using a public key associated with the execution environment and a corresponding private key.

In a yet further embodiment, the request includes a pseudonym and the process is determined to have sufficient access permissions when the pseudonym is matches a pseudonym associated with the user profile.

A recommendation platform in accordance with another embodiment of the invention includes: a network interface; memory; and a processor, the processor configured to:
- retrieve transaction data records stored within an immutable ledger, where each retrieved data record is associated with a public key; and
- each public key is associated with a user profile;
- identify a plurality of needs;
- identify retrieved data records containing information relevant to each of the plurality of identified needs;
- identify user profiles associated with the retrieved data records containing information relevant to the identified need;
- determine a plurality of recommendations with respect to each of the plurality of identified needs based upon the retrieved data records containing information relevant to each of the plurality of identified needs;
- identify a need from the plurality of identified needs associated with a specific user profile based upon information including retrieved data records associated with the public key of the specific user profile;
- determine weights based upon similarity of the identified user profiles associated with the retrieved data records containing information relevant to the identified need from the plurality of identified needs and the specific user profile;
- weight the plurality of recommendations determined with respect to identified need from the plurality of identified needs based upon the determined weights;
- generate a recommendation based upon the plurality of weighted recommendations; and
- transmit the recommendation to a user device associated with the specific user profile.

In a further embodiment, the resource is at least one of a specific product and a specific service.

In another embodiment, the retrieved transaction data records stored within an immutable ledger comprise transactions reflecting actions associated with user profiles.

In a still further embodiment, the processor is further configured to: determine a precision of the recommendation based upon the weighted information from the retrieved data records containing information relevant to the identified need; and transmit the precision to the user device associated with the specific user profile.

In still another embodiment, the processor is further configured to determine that the precision is insufficient to generate a recommendation.

In a yet further embodiment, the determination that the precision is insufficient to generate a recommendation comprises comparing the determined precision to a threshold.

In yet another embodiment, the recommendation comprises rendering information that directs the user device how to render the recommendation via a user interface.

In a further embodiment again, the recommendation includes a plurality of alternative recommendations.

In another embodiment again, the processor is further configured to determine weights by generating a matrix of weights for the specific user profile.

In a further additional embodiment, the matrix of weights includes: a first dimension that corresponds to different user profiles; and a second dimension that corresponds to a weighted array, where each entry in the weighted array corresponds to a weight for one resource characterized in that the weight indicates the similarity of the specific user profile with one of the different user profiles.

In another additional embodiment, the matrix of weights further comprises a third dimension corresponding to different resources.

In a still yet further embodiment, the matrix of weights further comprises at least one dimension representing at least one of temporal aspects, and preferences.

In still yet another embodiment, the processor is further configured to estimate the scarcity of a resource to which the recommendation relates.

In a still further embodiment again, the processor is further configured to receive the specific user profile as an input.

In still another embodiment again, the specific user profile includes at least one selected from the group consisting of:
- demographic data;
- action data; and
- at least one recommendation associated with the specific user profile.

In a still further additional embodiment, the processor is further configured to identify opinions associated with the specific user profile.

In still another additional embodiment, at least one of the opinions associated with the specific user profile is identified within the retrieved transaction data records.

In a yet further embodiment again, the processor is further configured to use the specific user profile to retrieve at least one additional source of information selected from the group consisting of:
- demographic data;
- action data; and
- at least one recommendation associated with the specific user profile.

In yet another embodiment again, the processor is further configured to store information concerning features of the resource as an N-dimensional feature vector.

In a yet further additional embodiment, the processor is further configured to generate a self-organized map of a plurality of resources based upon N-dimensional feature vectors for each of the plurality of resources.

In yet another additional embodiment, the processor is further configured to generate a lower dimensional representation of a plurality of resources based upon N-dimensional feature vectors for each of the plurality of resources.

In a further additional embodiment again, the processor is further configured to identify a subspace of a plurality of resources based upon N-dimensional feature vectors for each of the plurality of resources.

In another additional embodiment again, the subspace corresponds to a plurality of resources having at least one characteristic relevant to the identified need.

In a still yet further embodiment again, the processor is further configured to detect user profiles associated with abuse based upon the retrieve transaction data records and a representation of a plurality of resources.

In still yet another embodiment again, the processor is further configured to automatically generate user profiles.

In a still yet further additional embodiment, the retrieved transaction data records include information concerning conversion of a previously generated recommendation and the processor is further configured to determine an attribution for the conversion to one of the user profiles associated with the retrieved data records.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
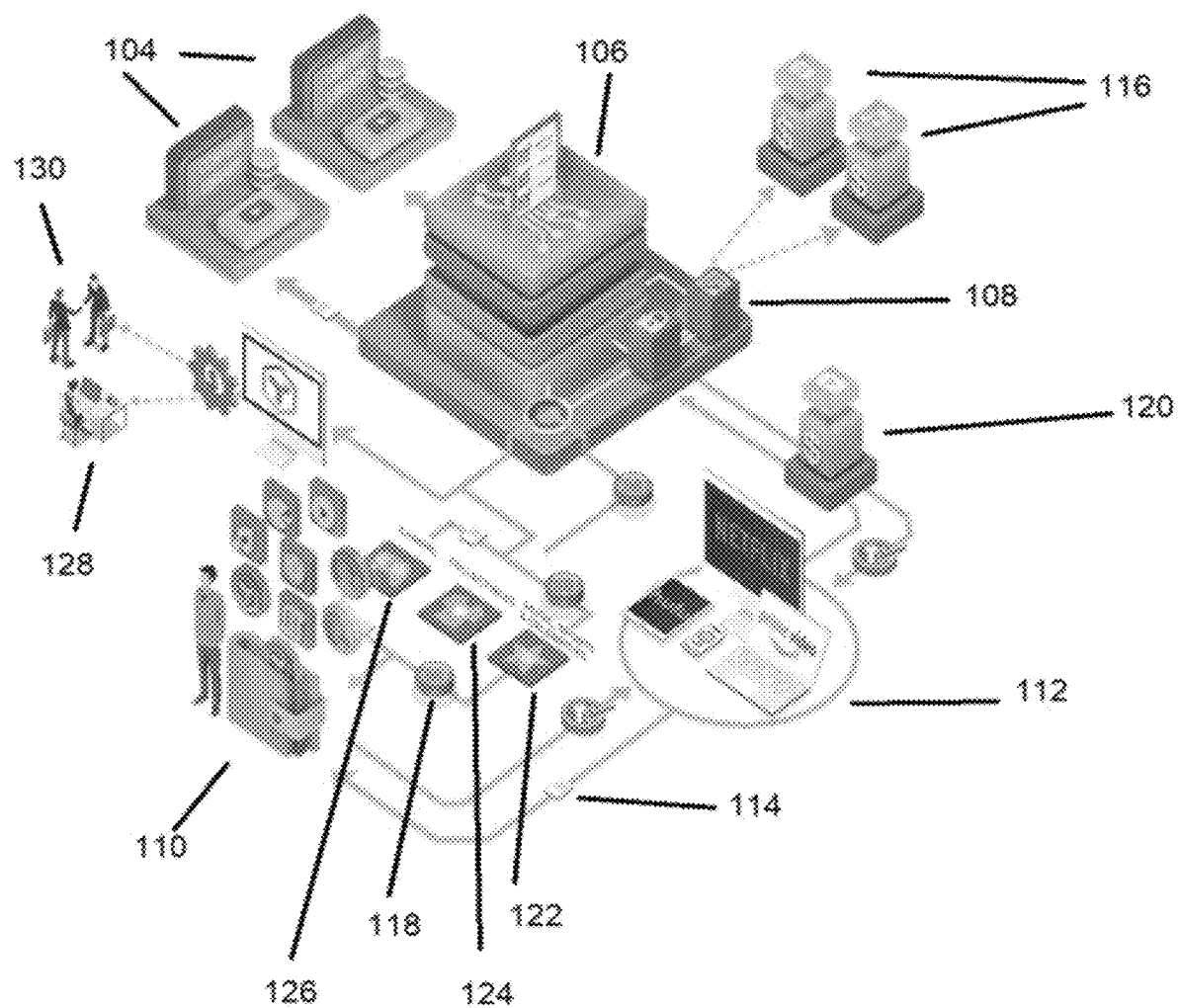
FIG. 1 is a conceptual diagram of an NFT platform in accordance with an embodiment of the invention.

Turning now to the drawings, systems and methods for automated blockchain-based recommendation generation, advertising and promotion in accordance with various embodiments of the invention are illustrated. In many embodiments, a blockchain-based Non-Fungible Token (NFT) platform is provided that includes a recommendation platform that is capable of generating recommendations regarding products and/or services. Recommendation platforms in accordance with several embodiments of the invention can provide recommendations with respect to one or more resources, such as physical items, services, or digital items, including NFTs, based upon a variety of factors. In the context of blockchain-based NFT platforms, recommendations can include (but are not limited to) advertisements and/or promotions that involve payment on the part of an advertiser and/or promoter in exchange for the presentation of a particular recommendation. While many of the processes for generating recommendations described herein focus on the generation of recommendations for the acquisition of resources, recommendation can also be generated with respect to the provision of resources and/or for the benefits of offerors in accordance with various embodiments of the invention. As can readily be appreciated, the specific recommendations generated by a recommendation platform implemented within a blockchain-based NFT platform are largely only limited by the requirements of a given application.

People buy or acquire rights to products and services, whether physical or virtual, for a variety of reasons. One reason is to address a personal, family or organizational need related to the acquirer. Examples of this are to rent a movie, buy a phone, buy a ringtone, or purchase a virtual sword for a game. Here, a product or a service is a good match if it is priced right relative to the expected enjoyment of it by the acquirer. Another reason is to address the needs of another entity, e.g., to acquire a product or service for a client or as a housewarming gift for an acquaintance. In this case, an acquisition is good if it matches the needs of another entity, while remaining within the budgetary boundaries of the acquirer. A third reason is for purposes of an investment. A good acquisition is one that increases in value, which happens when it is increasingly appreciated by one or more (potentially unknown) tentative later acquirers, whether due to being seen as a good investment to these, or by matching another reason to acquire for one or more of them. At the same time, investments also come with ownership benefits before a resale, whether this be the opportunity to enjoy using the product or service, e.g., drive a car, own a lakeside property, view an art piece, or due to the prestige that comes with ownership.

Current recommendation mechanisms typically fail to address these complexities. Most notably, (a) they do not address the individual aspects, i.e., do not attempt to identify what endorsements are most likely to be most relevant to a tentative buyer based on an alignment of preferences; and (b) they do not predict likely future trends in value, and therefore do not address the investment angle to any extent at all.

Recommendation platforms in accordance with many embodiments of the invention identify likely alignment of a product and/or service with one or more users. In a number of embodiments, the recommendation platform determines alignment based upon one or more factors indicative of (but not limited to) the expected enjoyment and/or the expected utility value of the product or service. In many embodiments, recommendation platforms observe actions of users. The observed actions can be used to generate user profiles, which can then be utilized to generate recommendations. In a number of embodiments, the similarity (or dissimilarity) of user profiles can be utilized to weight user actions. Recommendation platforms can then use weighted information to determine the likelihood that an action such as (but not limited to) a review is relevant to a need of a particular user. Furthermore, actions of users with similar user profiles can be given greater weight in the generation of recommendations. In certain embodiments, the recommendation platform provides additional information regarding the precision and/or confidence of a recommendation to enable a user to assess the extent to which the recommendation can be relied upon.

In a number of embodiments, recommendation platforms generate recommendations by assessing a product's feature vector. In certain embodiments, the features of a product are expressed as an N-dimensional feature vector. In many embodiments, the process of generating a recommendation involves an estimate of the scarcity of the particular good and/or service to which the recommendation relates. In certain embodiments, the recommendation platform also estimates information regarding users including (but not limited to) demographic information.

In many embodiments, the recommendation platform utilizes betting-based information in the generation of recommendations. In several embodiments, betting information can be accumulated through the minting of smart contracts that enable users to provide predictions. In this way, information concerning potential outcomes can be written to an immutable ledger and then utilized in the formation of recommendations.

In certain embodiments, processes for generating recommendations also include automatically detecting abuse (e.g., paid reviews and/or other actions). In many embodiments, processes for abuse detection rely upon a user-specific self-organized map that is based solely on users themselves as nodes. In a number of embodiments, bounty hunters assist with the detection of abuse. As can readily be appreciated, the information gathered by recommendation platforms can be utilized in a variety of ways to detect patterns of suspicious behavior and/or user behavior indicative of abuse.

Rich user profiles can be highly beneficial in the generation of relevant recommendations. Recommendation platforms in accordance with many embodiments of the invention build profiles and generate associated characterizations based upon information including (but not limited to) transaction data recorded in immutable ledgers. In many embodiments, recommendation platforms automatically scan blockchain entries and record data associated with specific public keys. In several embodiments, applications that interact with blockchains can provide additional information that can be utilized to build and/or maintain user profiles. In several embodiments, end-user modules in software applications automatically provide user data to recommendation platforms. In a number of embodiments, the recommendation platform communicates with an execution environment that can securely provide user profile information.

In several embodiments, recommendation platforms can securely share user profile data with advertisers using templates. In certain embodiments, an end-user module, e.g., in the form of a wallet or a browser plugin, may determine that the user associated with it has one or more interests associated with one or more of the templates expressed by a given advertiser. In many embodiments, the end-user module can generate a token that includes information expressing the user's interest aligned with these templates. This token may be purchased by the advertiser, from the end user module, or obtained in exchange for a service.

Recommendation platforms and processes for automatically building user profiles and/or generating recommendations in accordance with various embodiments of the invention are discussed in detail below. While recommendation platforms are not limited to use in blockchain-based non-fungible (NFT) platforms, blockchain-based non-fungible (NFT) platforms that can include recommendation platforms are introduced below as an illustrative example of the manner in which recommendation platforms in accordance with various of the embodiments of the invention can be implemented within blockchain-based systems.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
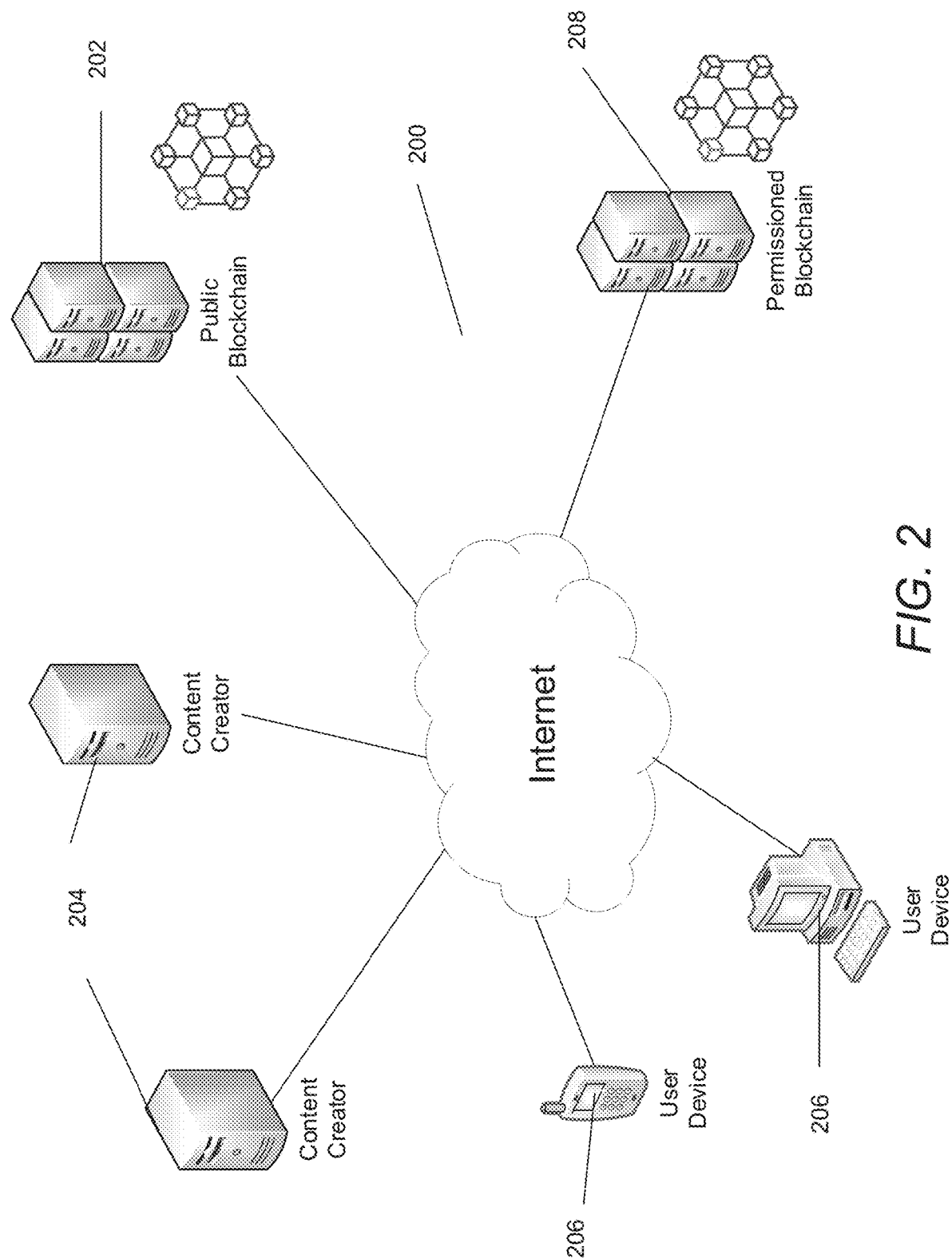
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans, influencers, trend spotters and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
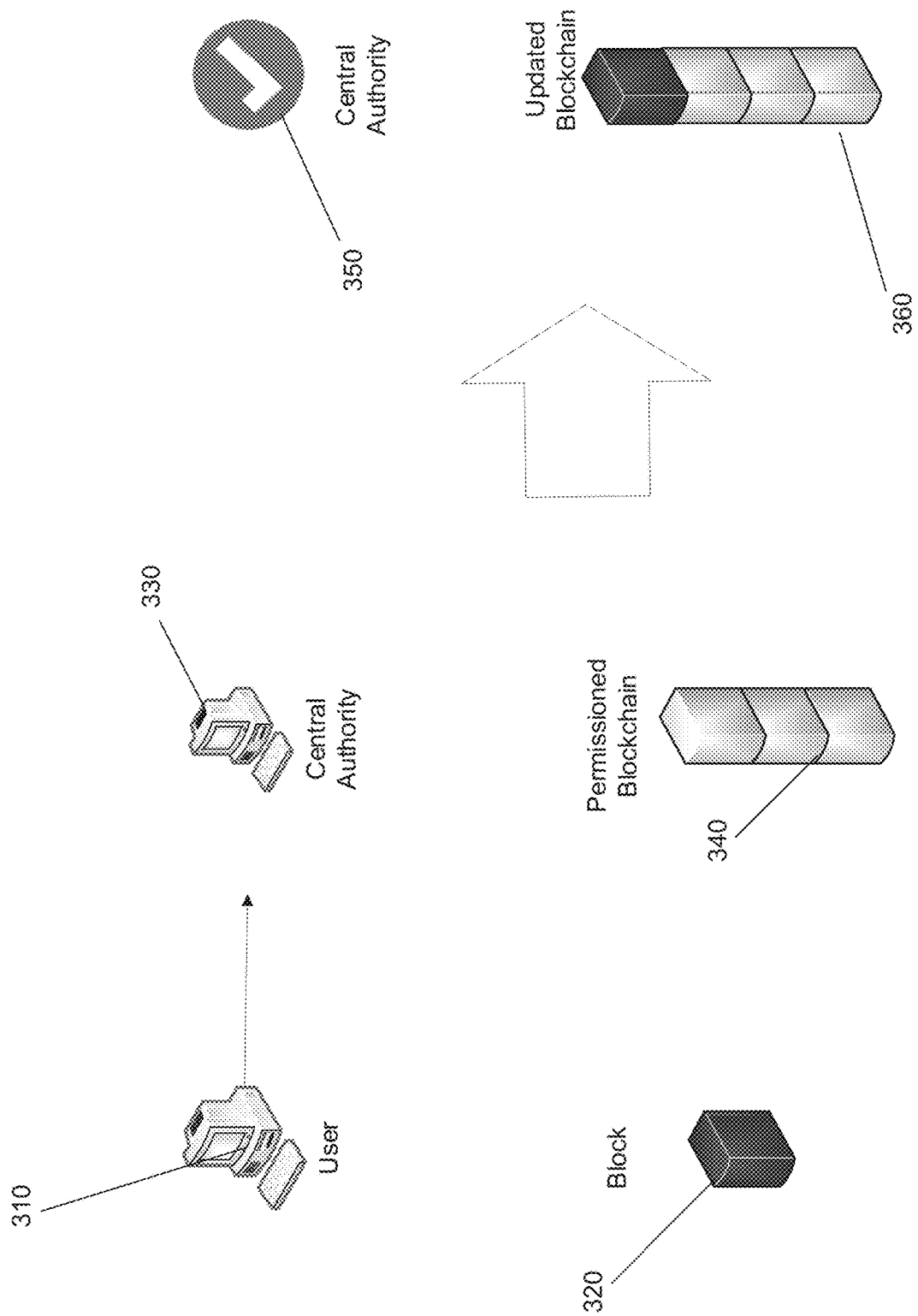
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
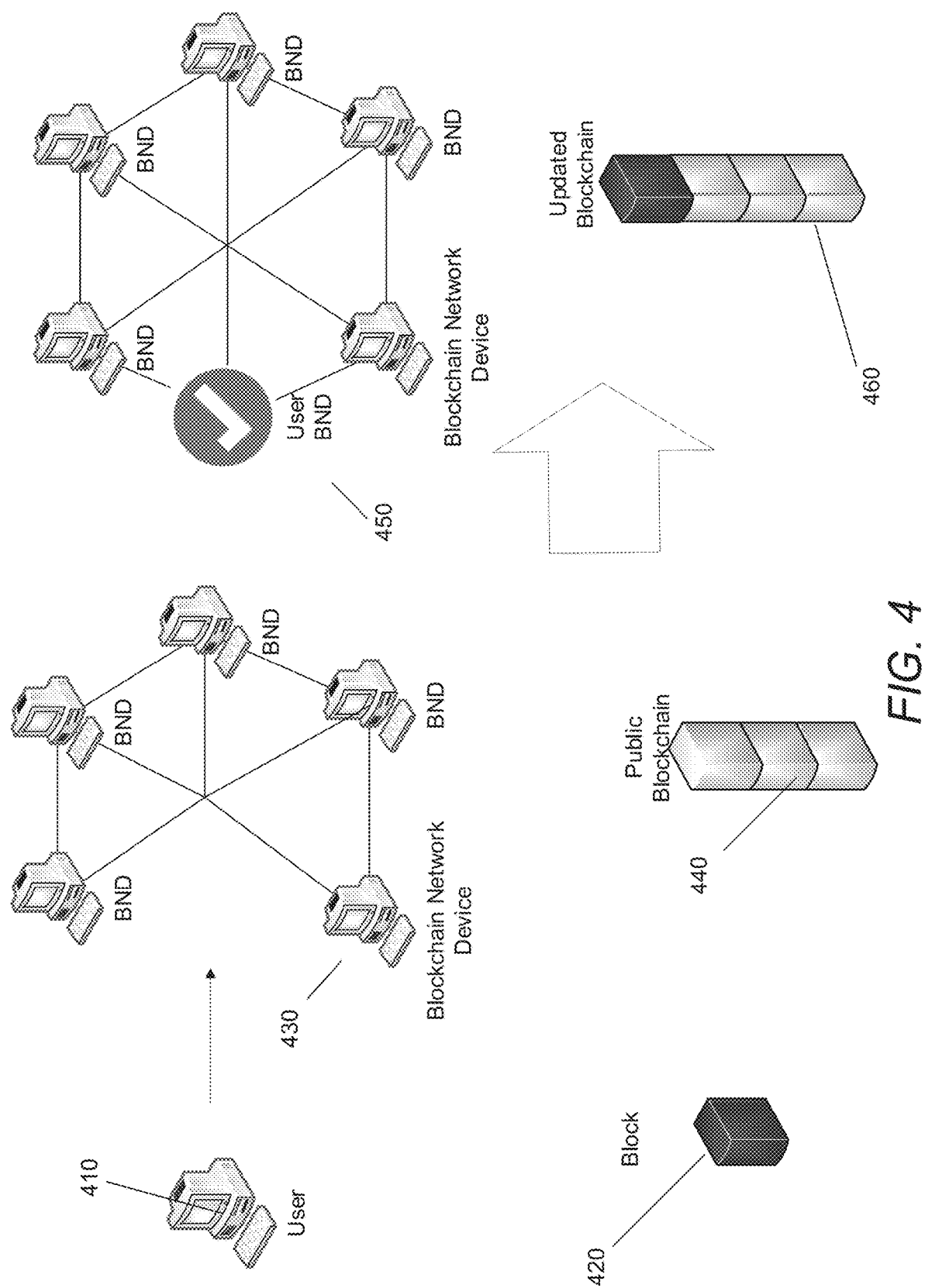
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, proof of stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
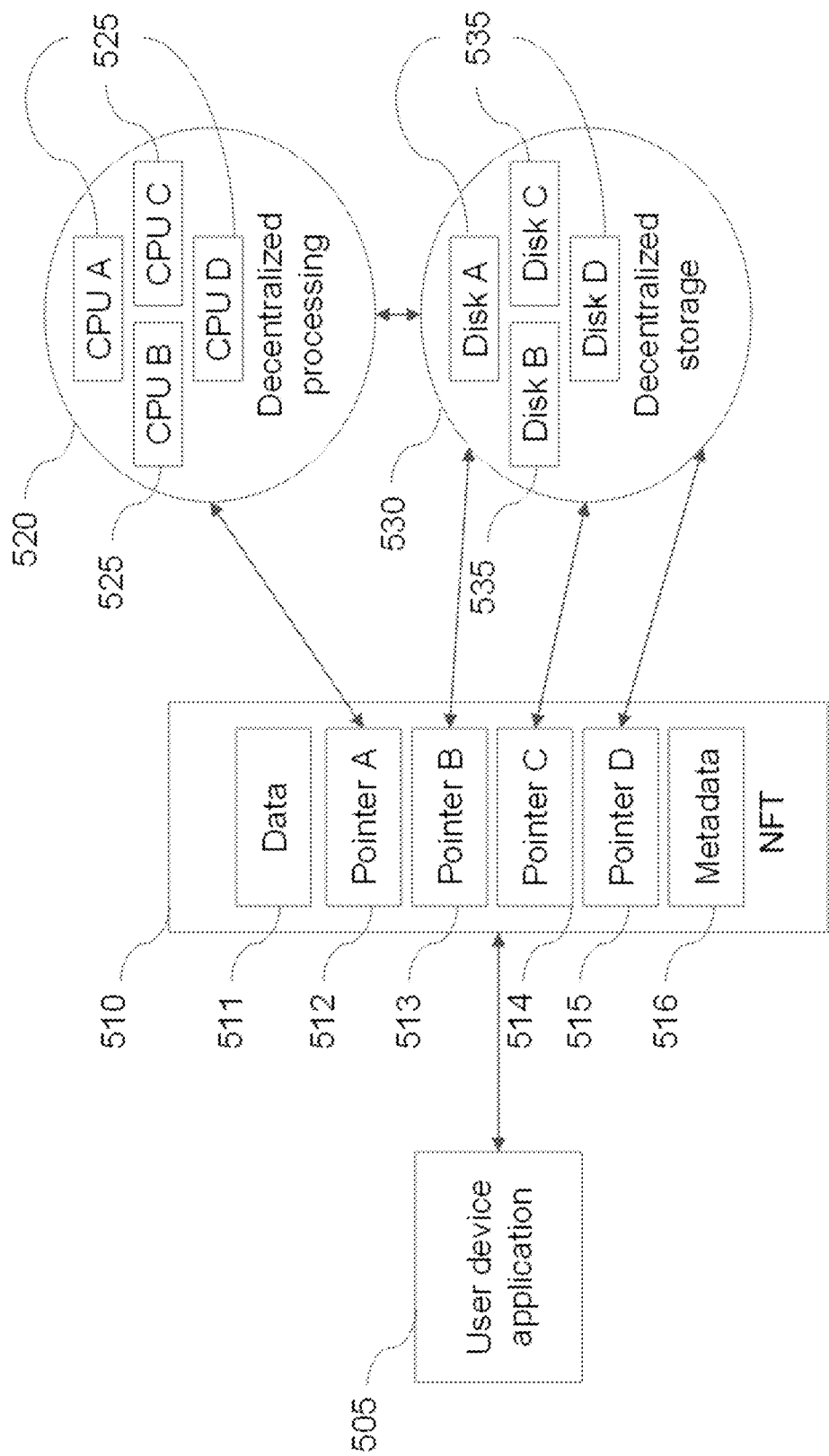
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
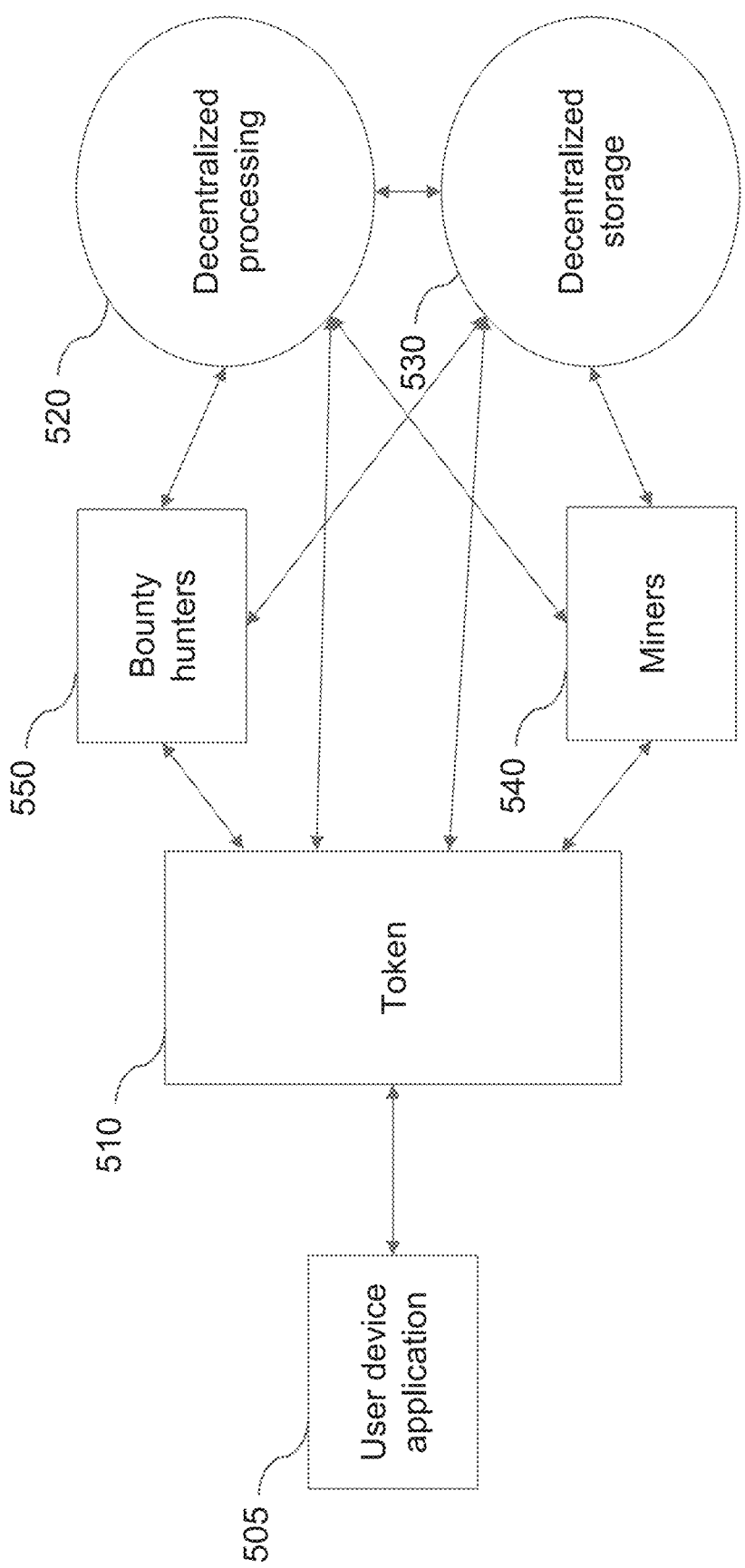

An additional benefit of blockchains exists in the possibility of incorporating methods for detection of abuse, essentially a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
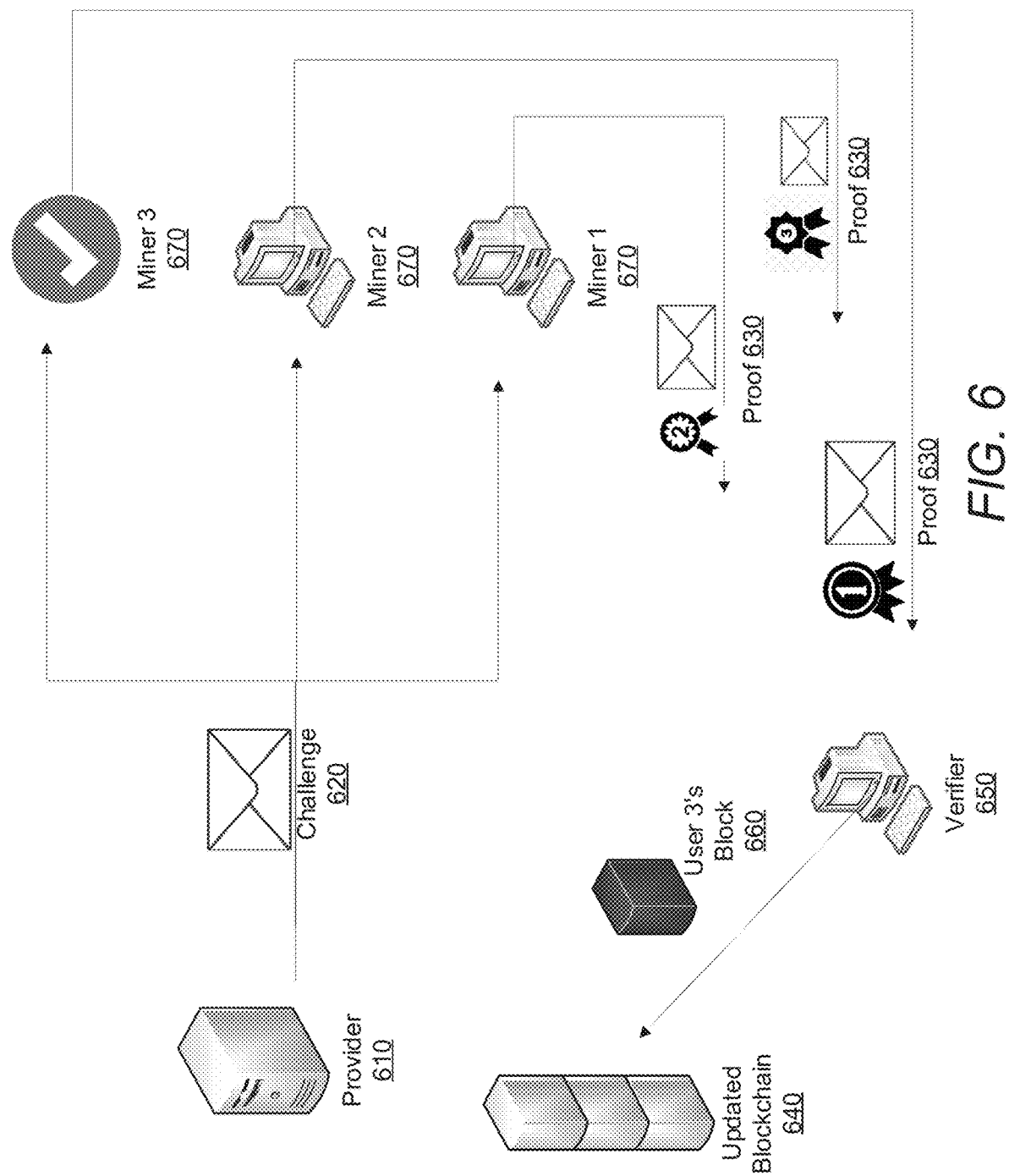
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
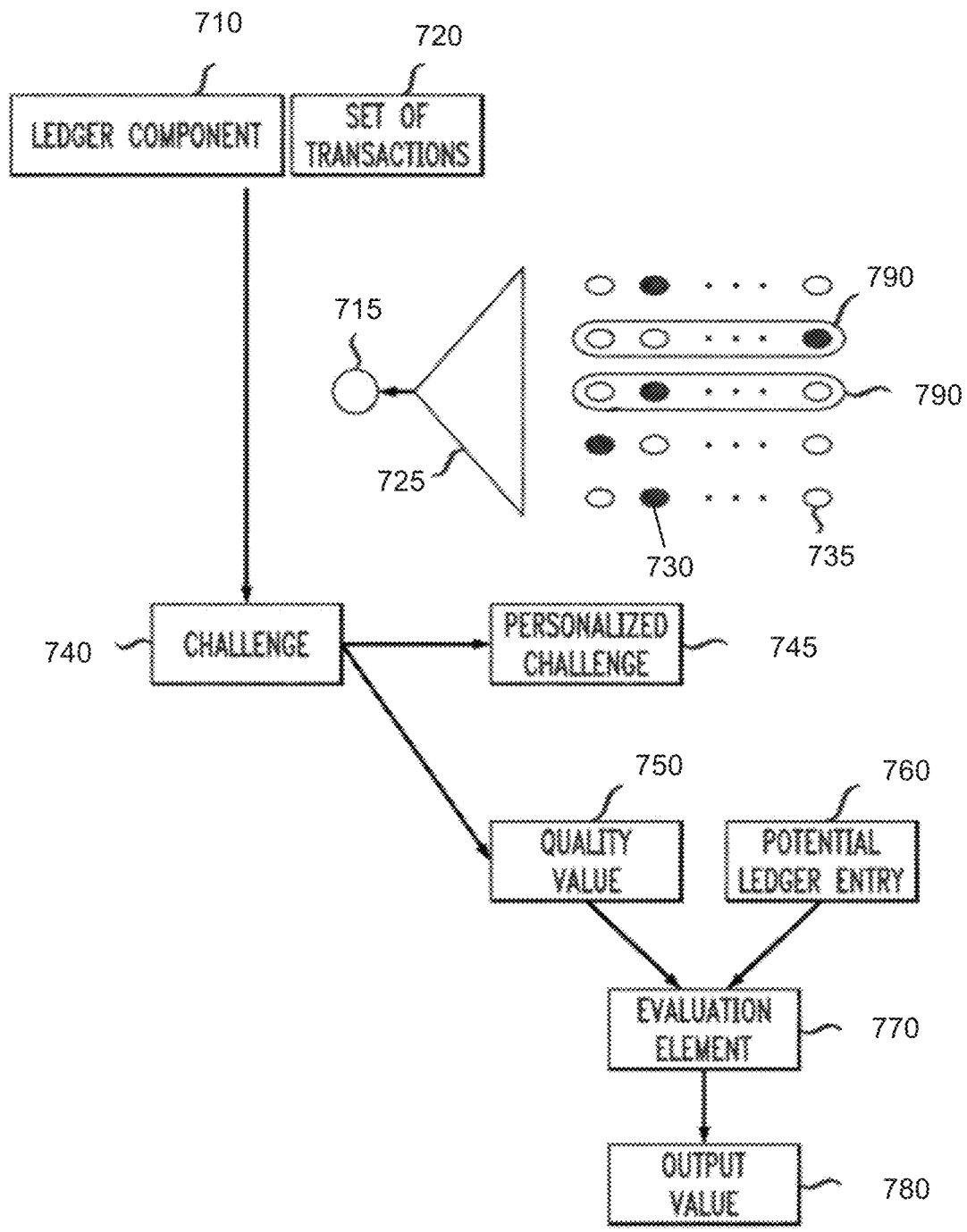
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also operate as public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
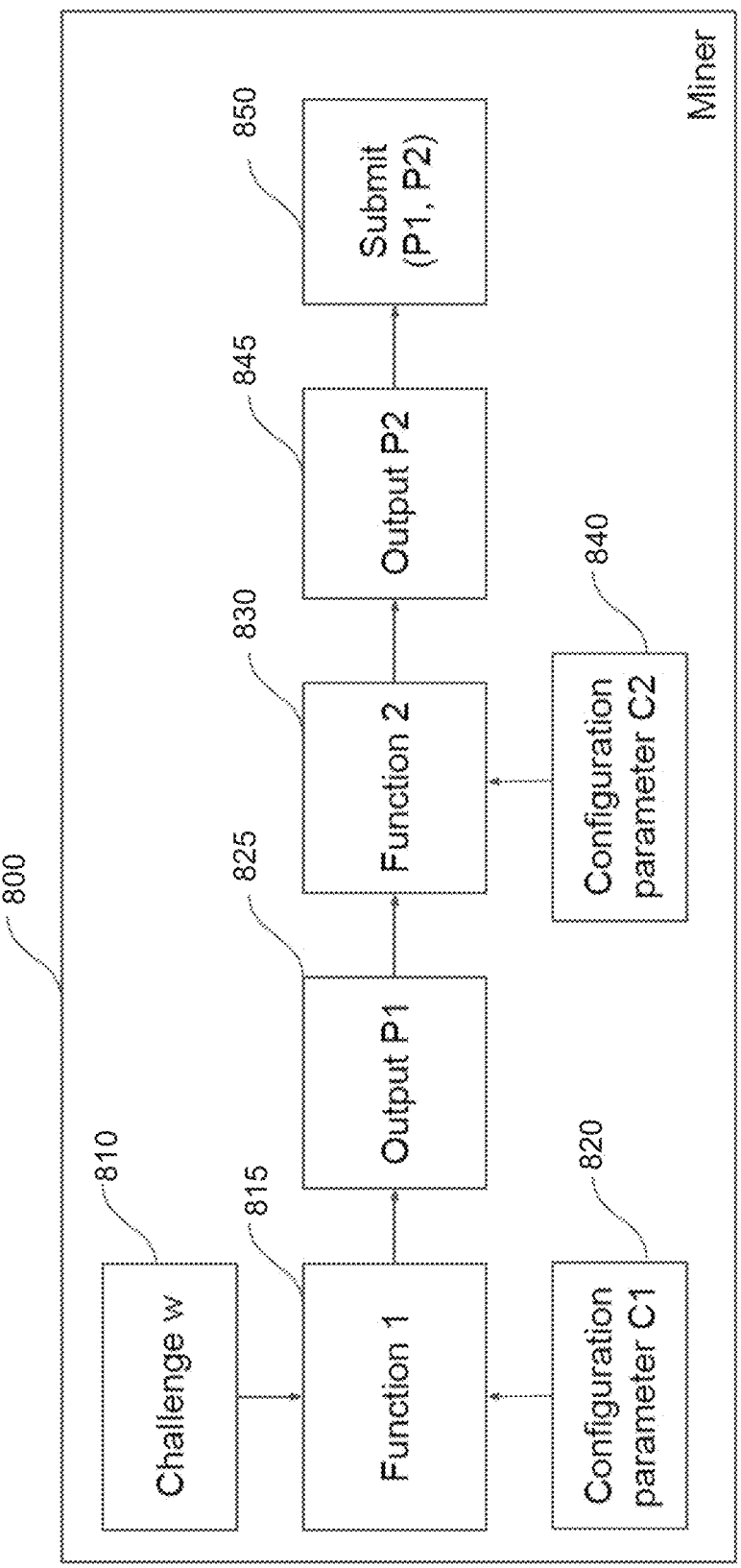
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
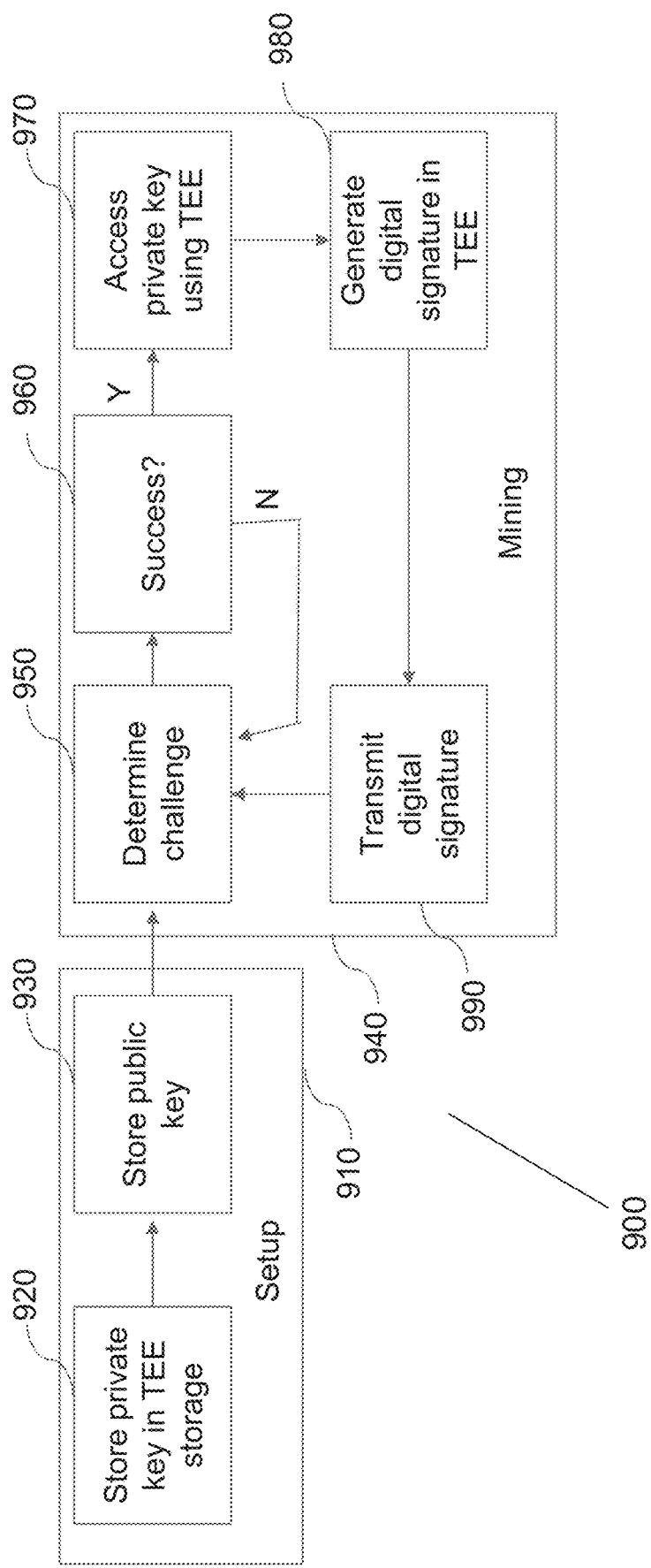
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications; including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, proof of stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
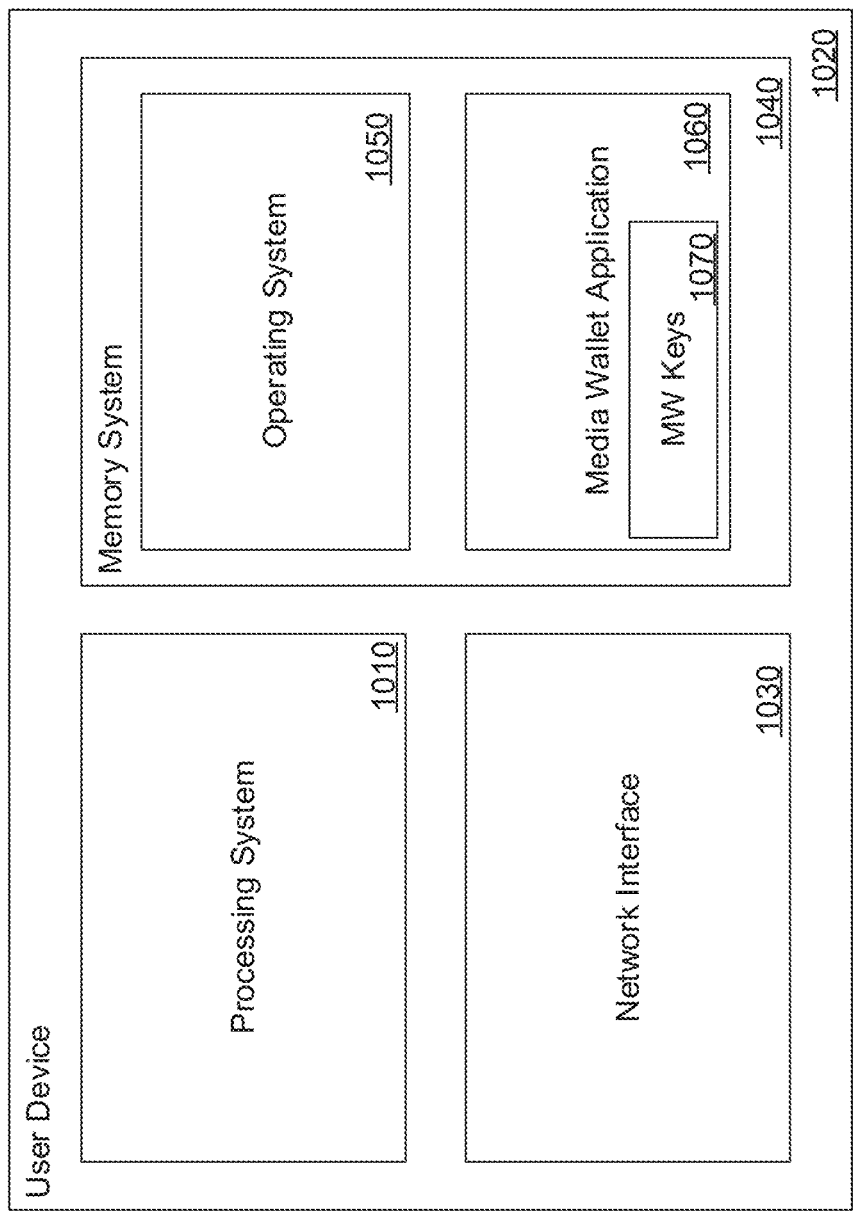
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
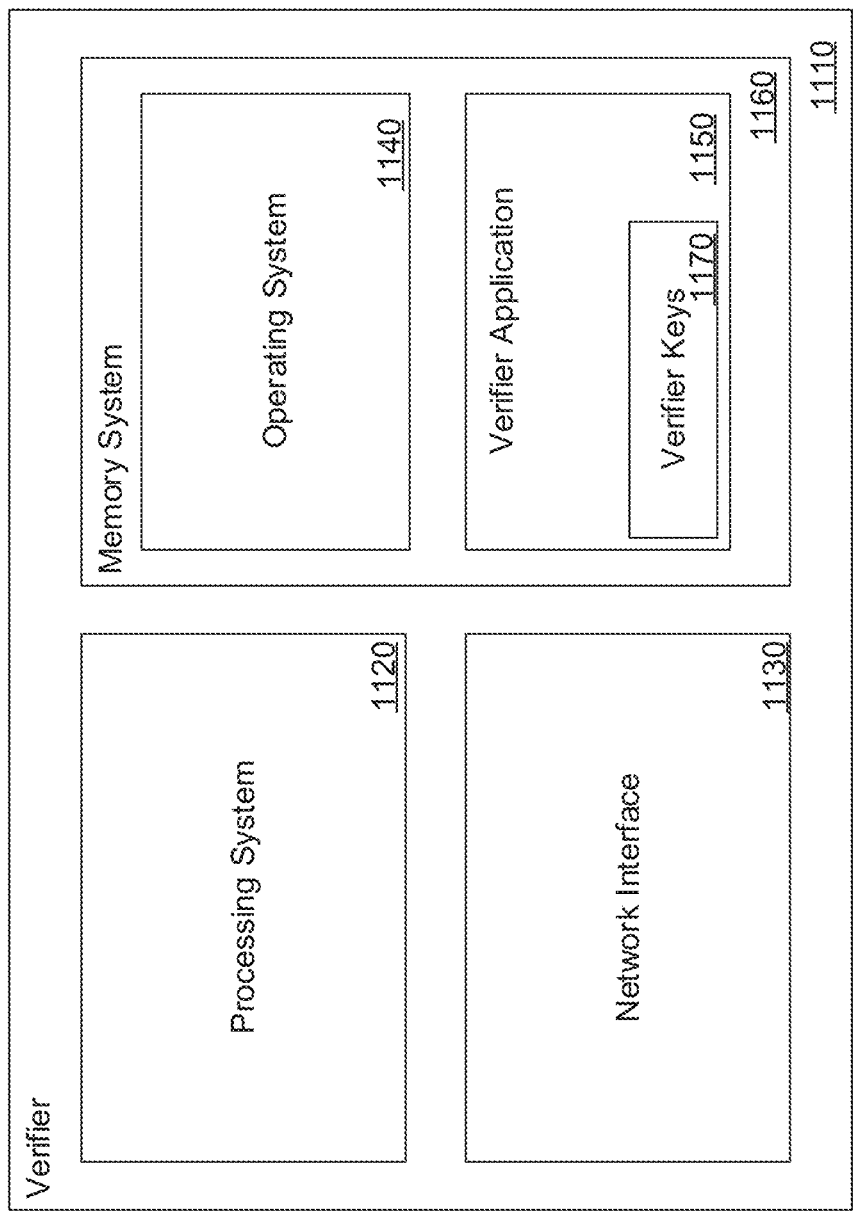

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
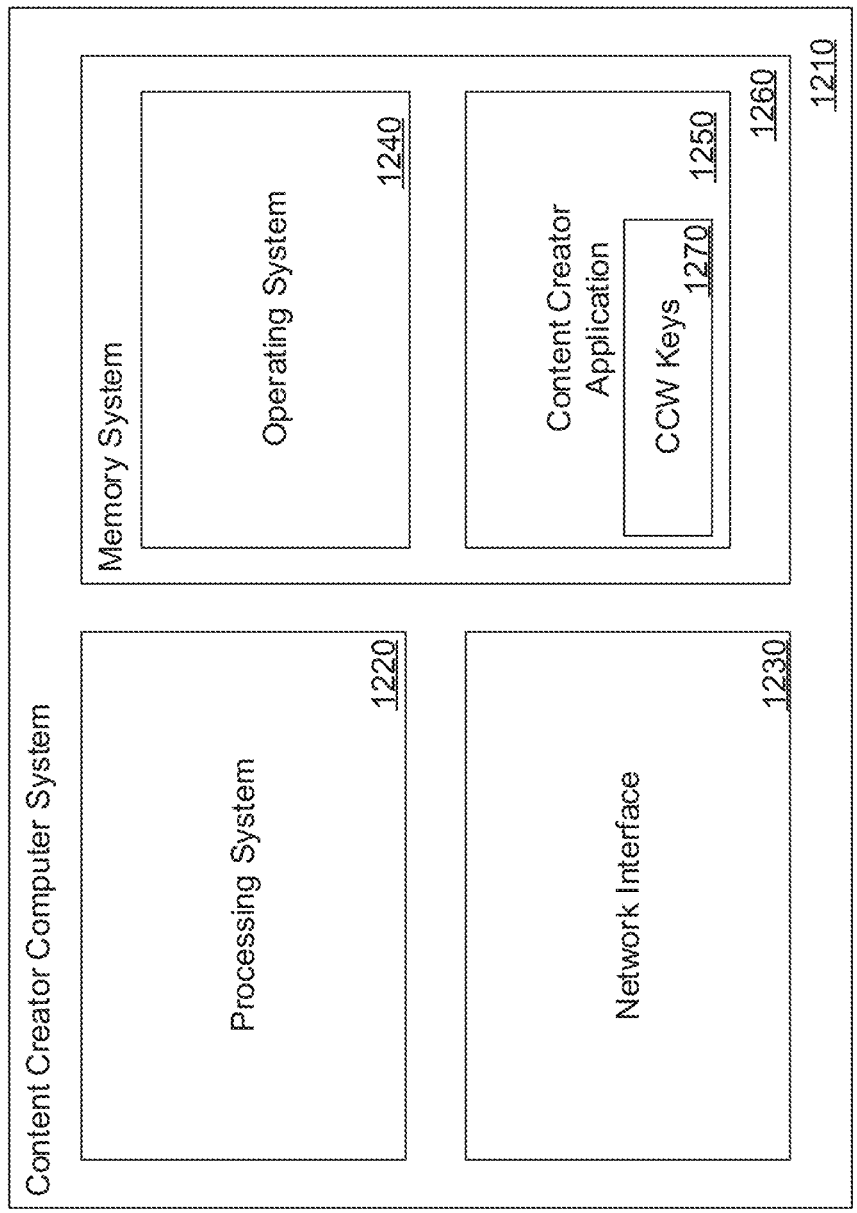

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
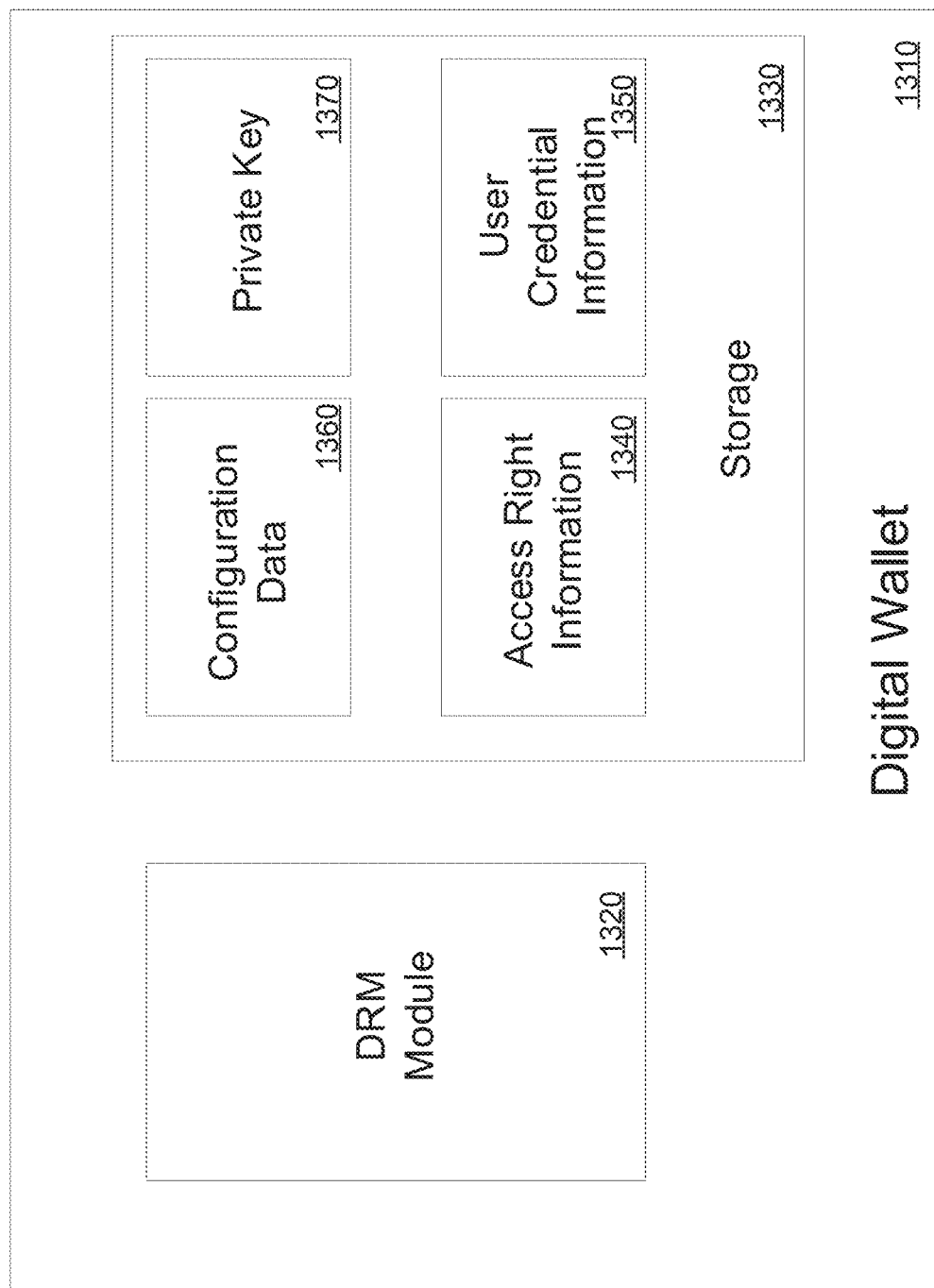
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including (but not limited to) executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on the wallet content. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions."

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
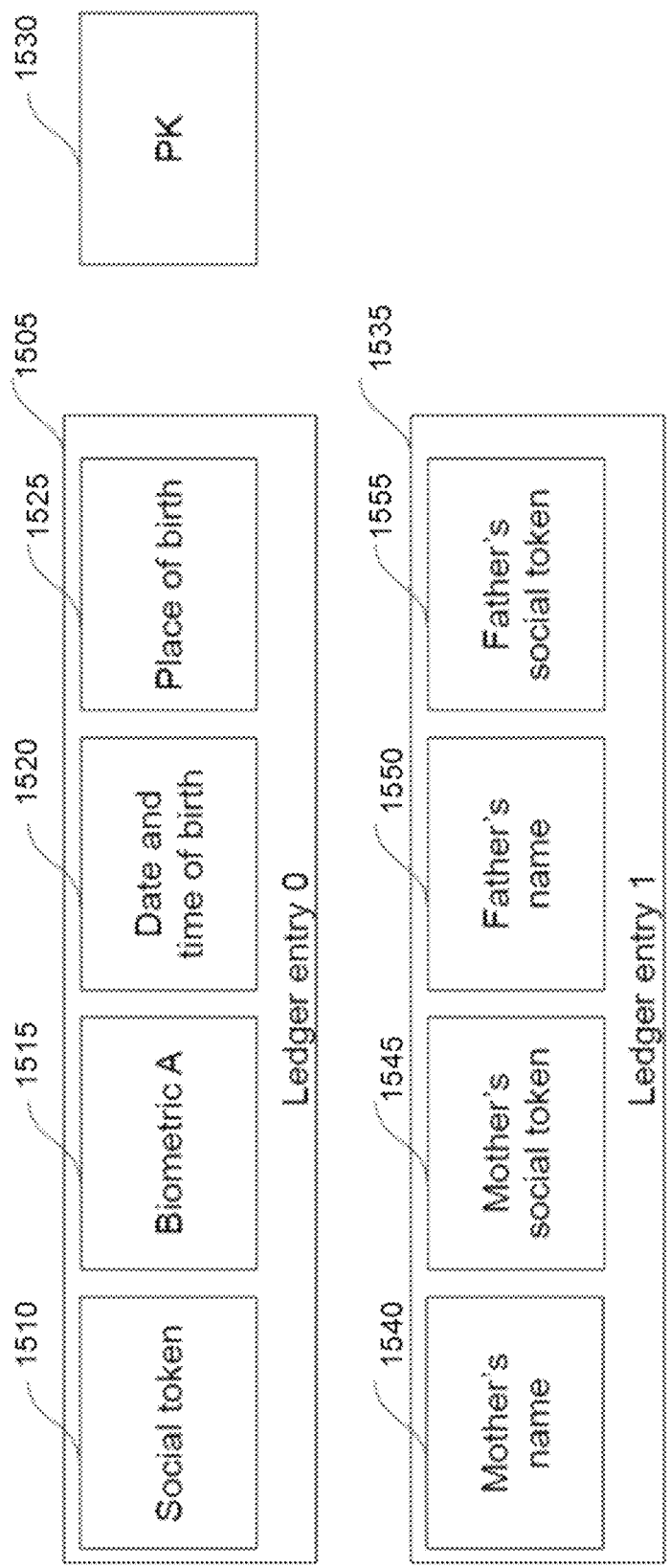
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to wireless technology (e.g., Wi-Fi™) networks. When computers are replaced with newer models, users may want to maintain all old relationships, for the new computer. For example, users may want to retain Wi-Fi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
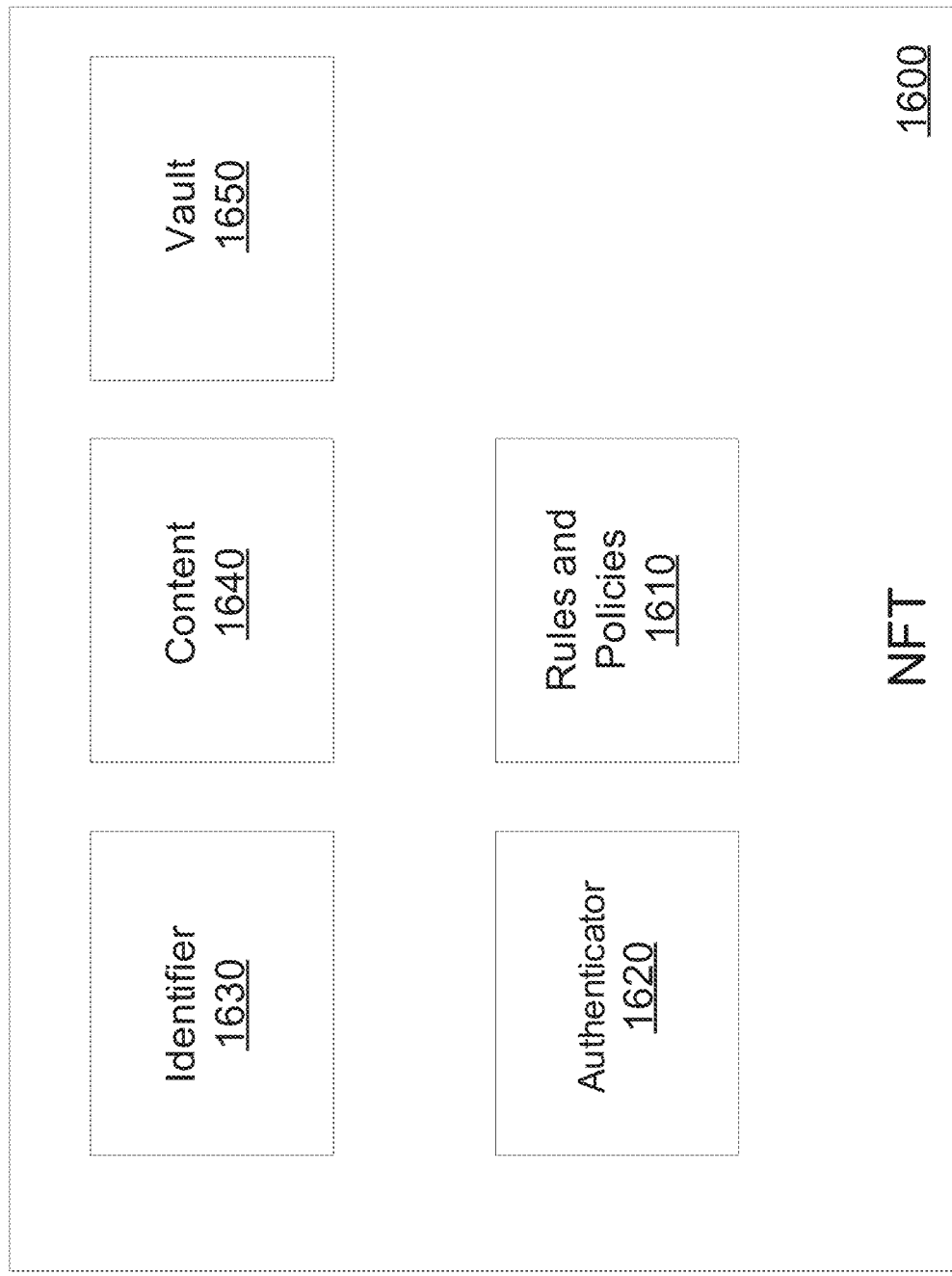
FIGS. 16A-16B illustrate an NFT arrangement relationship with corresponding physical content in accordance with an embodiment of the invention.
Figure 16B:
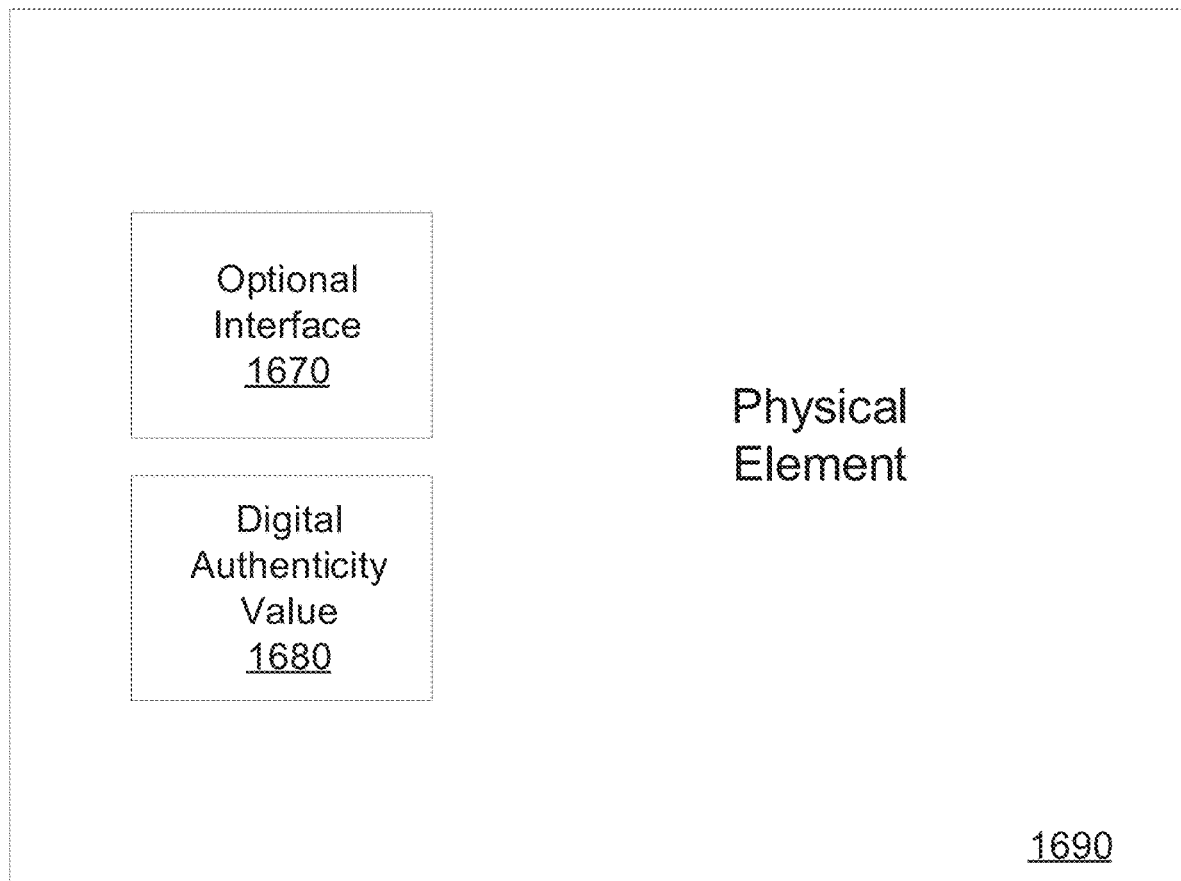

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
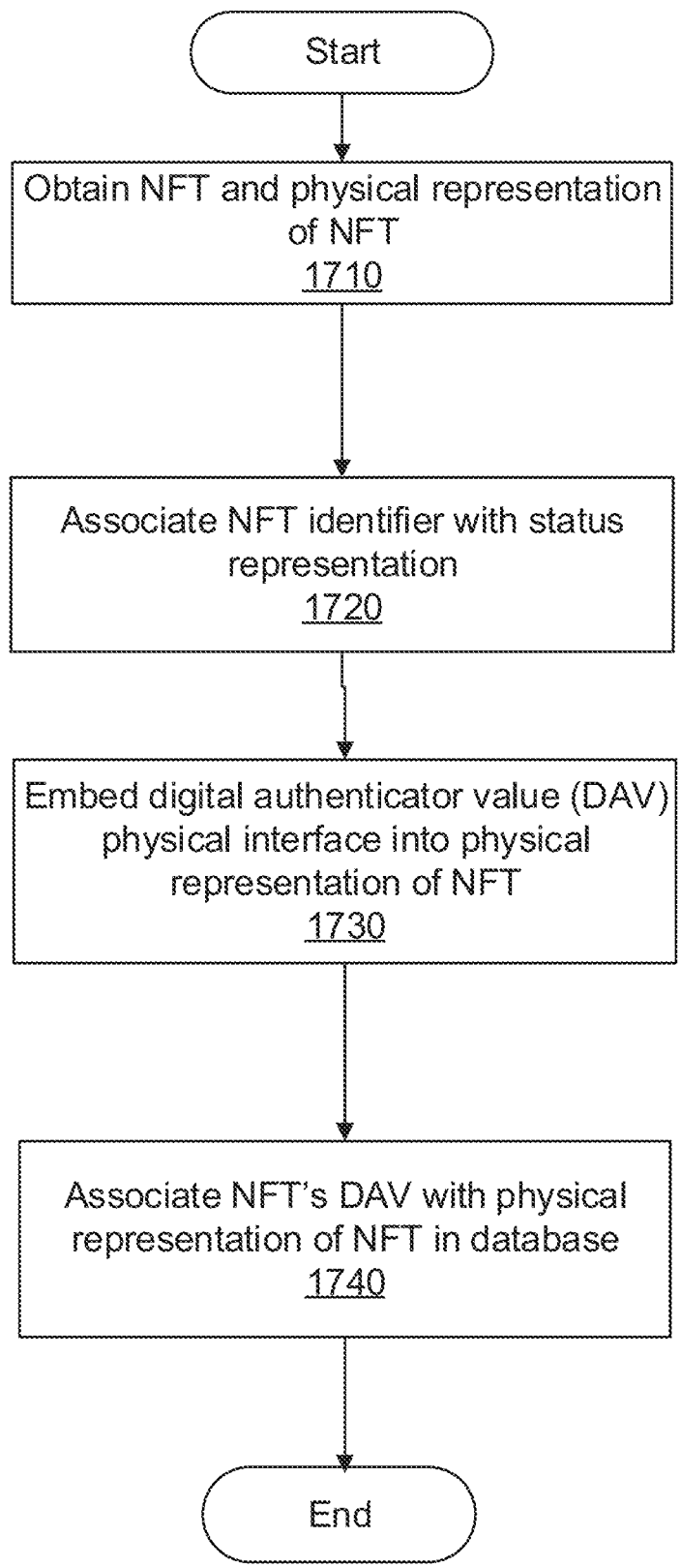
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Blockchain-Based NFT Platforms Incorporating Recommendation Platforms

A variety of systems that incorporate blockchain-based recommendations, including rich media systems, are described above. In several embodiments, blockchain-based NFT platforms are provided that incorporate one or more recommendation platforms that identify likely alignment of a product and/or service with one or more users. In a number of embodiments, the recommendation platform determines alignment based upon on one or more factors indicative of (but not limited to) the expected enjoyment and/or the expected utility value of the product or service. In several embodiments, the recommendation platform is capable of generating recommendations that are not specific to particular target users. In several embodiments, the recommendation platform can improve an initial user-independent recommendation by targeting the recommendation to the one or more intended users. In various embodiments, the recommendation platform generates recommendations and/or improves recommendations based upon user information such as (but not limited to) demographic information and/or prior usage information of other products and services related to the one or more users. In certain embodiments, the recommendation platform can use economic indicators such as inflation levels and consumer sentiment.

Recommendation platforms in accordance with various embodiments of the invention take as input one or more configuration parameters obtained from or about the one or more users associated with the buyer of the product or service, where these configuration parameters may either be explicitly stated (e.g., age, zip code and interests); implicitly derived (e.g., from a series of past purchases) or a combination thereof (e.g., a series of assessment by the one or more users, on one or more previous purchases). In several embodiments, the recommendation system also takes risk factors into consideration when generating one or more recommendations. For example, in the context of investing, several smaller and diversified investments are commonly less risky than one bigger investment. As for the smaller investments, it is less likely that they all fail to appreciate in value. On the other hand, a purchaser with higher risk appetite or more long-term investment plans may be able to benefit for a smaller number of large investments, assuming these maintain a higher profile and therefore benefit from greater appreciation. As can readily be appreciated, the specific information utilized by recommendation platforms in the generation of recommendations is largely dependent upon the requirements of specific applications and/or the characteristics of particular users. Blockchain-based NFT platforms that incorporate recommendation platforms in accordance with various embodiments of the invention are discussed further below.

Recommendation Platforms

Figure 18:
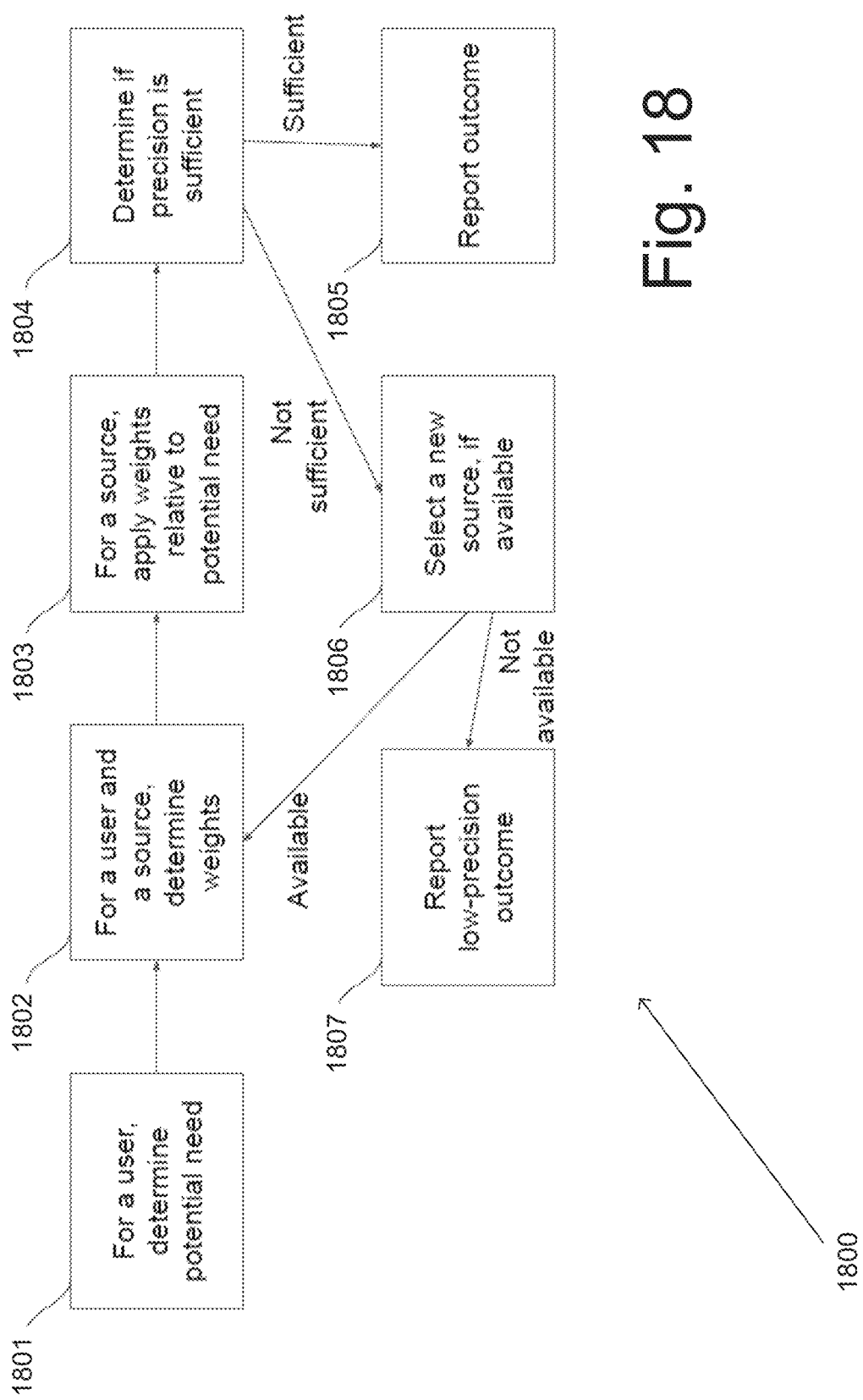
FIG. 18 illustrates a process for generating a recommendation using a recommendation platform in accordance with an embodiment of the invention.

A process for generating a recommendation using a recommendation platform in accordance with an embodiment of the invention is illustrated in FIG. 18. The process 1800 includes determining (1801) a need for a select user. In several embodiments, the need can be determined based upon receipt of a search query. A need can also be determined in response to observing a user action, such as (but not limited to) a purchase, the rendering of or click on a webpage, an interaction with a URL embedded in an email or an SMS, the installation of or opening of an app, or more. An example need may correspond to an interest in a service or a product type.

A set of weights can be determined (1802) for the user and relative to one or more sources. A source may be another user with whom a comparison of interests are made, and a weight can be computed to reflect the correspondence between the user and the source. The source may also be a provider of recommendations as discussed further below.

In several embodiments, a weight associated with the user and a source such as a provider of recommendations indicates the likely agreement of the views of the user and the recommendation provider, based on past actions of the user and of the recommendation provider. Example actions include (but are not limited to) purchases, requests to view information, recommendations (including reviews) created by the user or recommendation provider, actions taken by the user in response to recommendations and a comparison between these recommendations and recommendations associated with the recommendation provider. The weights may be an assessment of similarity between the user and the source, whether for the identified need (1801) or more generally. As can readily be appreciated, the specific manner in which weights are generated and/or associations are identified between particular users is largely dependent on the requirements of a given application.

The computed weights can be applied (1803) to one or more actions associated with the source, for actions such as (but not limited to) those considered during the evaluation (1802) of the weights and related to the need (1801). By applying the weights to the actions, actions of highly similar sources are given a greater importance than actions of less similar sources, wherein the similarity is relative to the user. For example, if the need is an interest to buy an NFT image of dogs, and the source has similar dog-related interests as the user, then any recommendation or other indication of interest associated with the source and relative to the need are used as an indication of potential value to the user.

In a number of embodiments, an assessment is made as to whether sufficient information is available to make a reliable recommendation. In several embodiments, a precision is determined (1804) and compared to a threshold to determine whether the precision is sufficient to generate a recommendation. If only a small number of sources have been identified as relevant, or the sources were not highly similar to the user, then the precision may not be sufficient, based on a threshold set by the user or for the user by the system. If so, a new source is selected (1806), if available, and the new source is utilized to determine weights (1802). If the precision is insufficient but there are no more relevant sources, then the current (but low-precision) recommendation is generated (1807). If the precision is determined (1804) to be sufficient, a high reliability recommendation is generated (1805).

In a number of embodiments, irrespective of the precision, the recommendation of a product or service takes the form of a ranking of available alternatives. In many embodiments, the recommendation is to a single alternative. In certain embodiments, the recommendation can include an advertisement and/or promotion. As can readily be appreciated the specific recommendation(s), advertisement(s) and/or promotion(s) presented are largely dependent upon the requirements of a particular application and/or can be configured by individual users.

The generation (1805, 1807) of a recommendation can include generating a rendering of information to a user via a user interface. In many embodiments, the generation of a recommendation can also automatically initiate an attempt to initiate a transaction with respect to an immutable ledger. For example, a transaction may be initiated based upon the bytecode of a smart contract associated with a user account and a matching smart contract associated with a provider of merchandise and/or services. In several embodiments, the specific transaction that is initiated can correspond to a ranking of matching resources.

While specific processes are described above with reference to FIG. 18 concerning the generation of recommendations by a recommendation platform, any of a variety of processes can be utilized to generation recommendations including (but not limited to) processes that perform collaborative filtering in which individual users provide information that is utilized in the generation of recommendations, processes that utilize alternative methods for assessing the reliability of recommendations, and/or processes that generate recommendations including a variety of organic recommendations and/or targeted advertisements as appropriate to the requirements of specific applications. Furthermore, recommendation processes in accordance with various embodiments of the invention can be utilized within any of the blockchain-based NFT platforms and/or rich media platforms described above as appropriate to the requirements of specific applications. Specific processes for generating recommendations based upon weights determined based upon the actions of other users in accordance with various embodiments of the invention are discussed further below.

Figure 19:
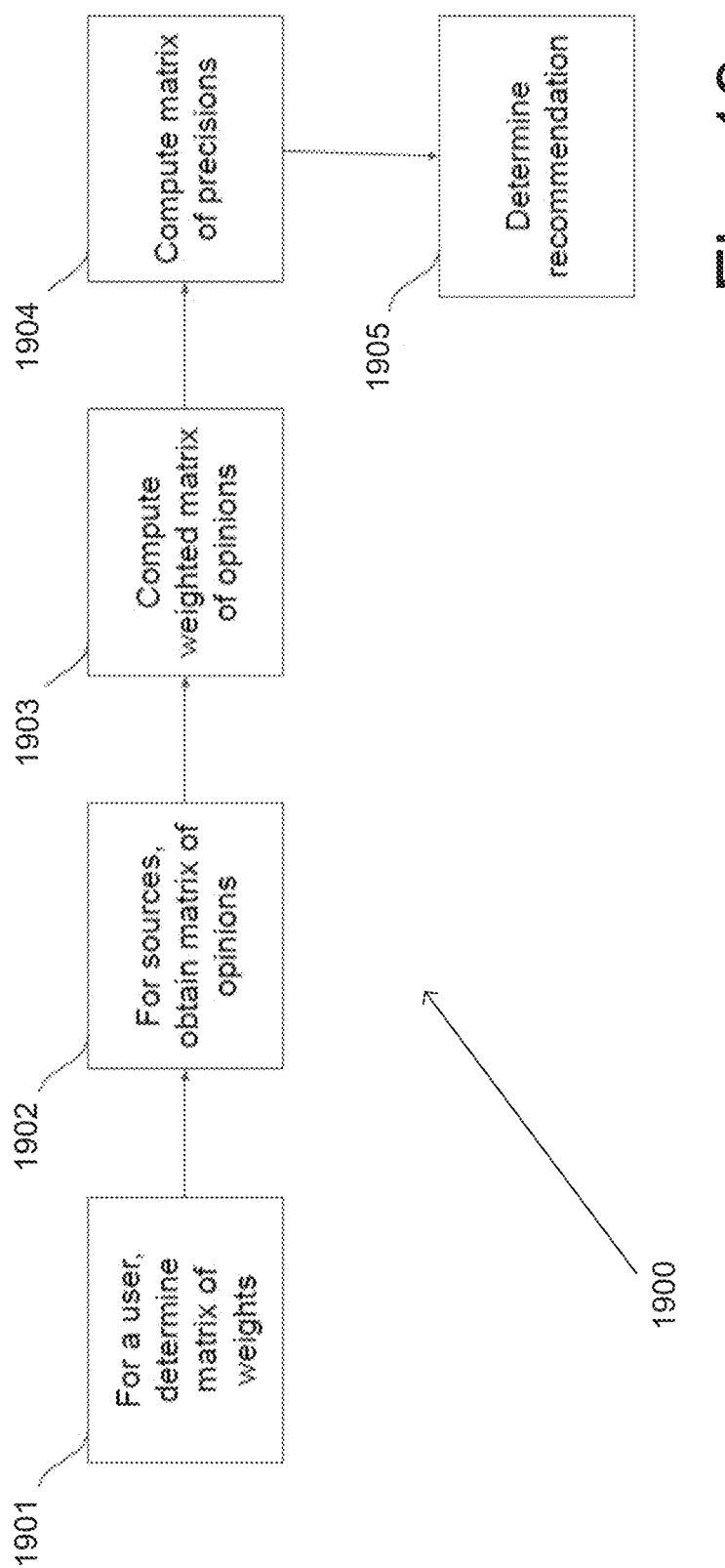
FIG. 19 illustrates a process for generating recommendations based upon weights determined for a user in accordance with an embodiment of the invention.

A process for generating recommendations based upon weights determined for a user in accordance with an embodiment of the invention is illustrated in FIG. 19. As noted above, a matrix of weights can be determined (1901) for a user. In several embodiments, one dimension of the matrix corresponds to different sources, and another dimension corresponds to a weighted array, each entry corresponding to the weight for one product, computed based on one source and the user, e.g., as is described above with reference to FIG. 18. A third dimension may correspond to different products. Yet other dimensions can represent other aspects, such as (but not limited to) temporal aspects, preference and/or additional factors.

A matrix of opinions can be obtained (1902), where these opinions relate to various potential needs, as described above with respect to FIG. 18. A weighted matrix of opinions can also be generated (1903). In a number of embodiments, the weighted matrix of opinion is generated using matrix multiplication methods based on the matrix of weights (1901) and the matrix of opinions (1902). As can readily be appreciated, any of a variety of processes can be utilized for weighting opinions as appropriate to the requirements of specific applications. In several embodiments, the resulting weighted matrix of opinions is stored.

A matrix of precisions can also be computed (1904). In several embodiments, the matrix of precisions relates to the precision of the elements of the weighted matrix of opinions (1903), and describes the extent to which the opinions apply to the user and are representative of a sufficiently large sample size and strength of opinion, among other things. An opinion with very low precision is largely inactionable, whereas an opinion with high precision can be meaningful to act on as it is likely to be accurate.

In several embodiments, the various matrixes generated during the process 1900 are utilized to generate (1905) one or more recommendations. In a number of embodiments, the recommendations are the opinions for which the precision exceeds a threshold that may either be set by the user or the system, or by both in collaboration. The determined recommendations can be presented to the user, e.g., using a GUI or an API, as discussed further below.

In certain embodiments, advertisers can also pay to present specific recommendations and/or opinions to users. As can readily be appreciated, advertisers are typically unlikely to spend money to advertiser irrelevant goods and services to users. Accordingly, the willingness and/or amount of money that an advertiser is willing to spend to present a recommendation to a user can be indicative of the relevancy of the recommendation. In many embodiments, the extent to which particular advertisements are subsequently found to be relevant can be a factor that is utilized in determining whether to present recommendations to prevent advertisers from spamming users with irrelevant advertising. As can readily be appreciated, any of a variety of processes can be utilized to supplement recommendations with advertisements and/or promotions that are likely to be of interest to users as appropriate to the requirements of specific applications in accordance with various embodiments of the invention. Processes for determining recommendations to present to a specific user are discussed further below.

Figure 20:
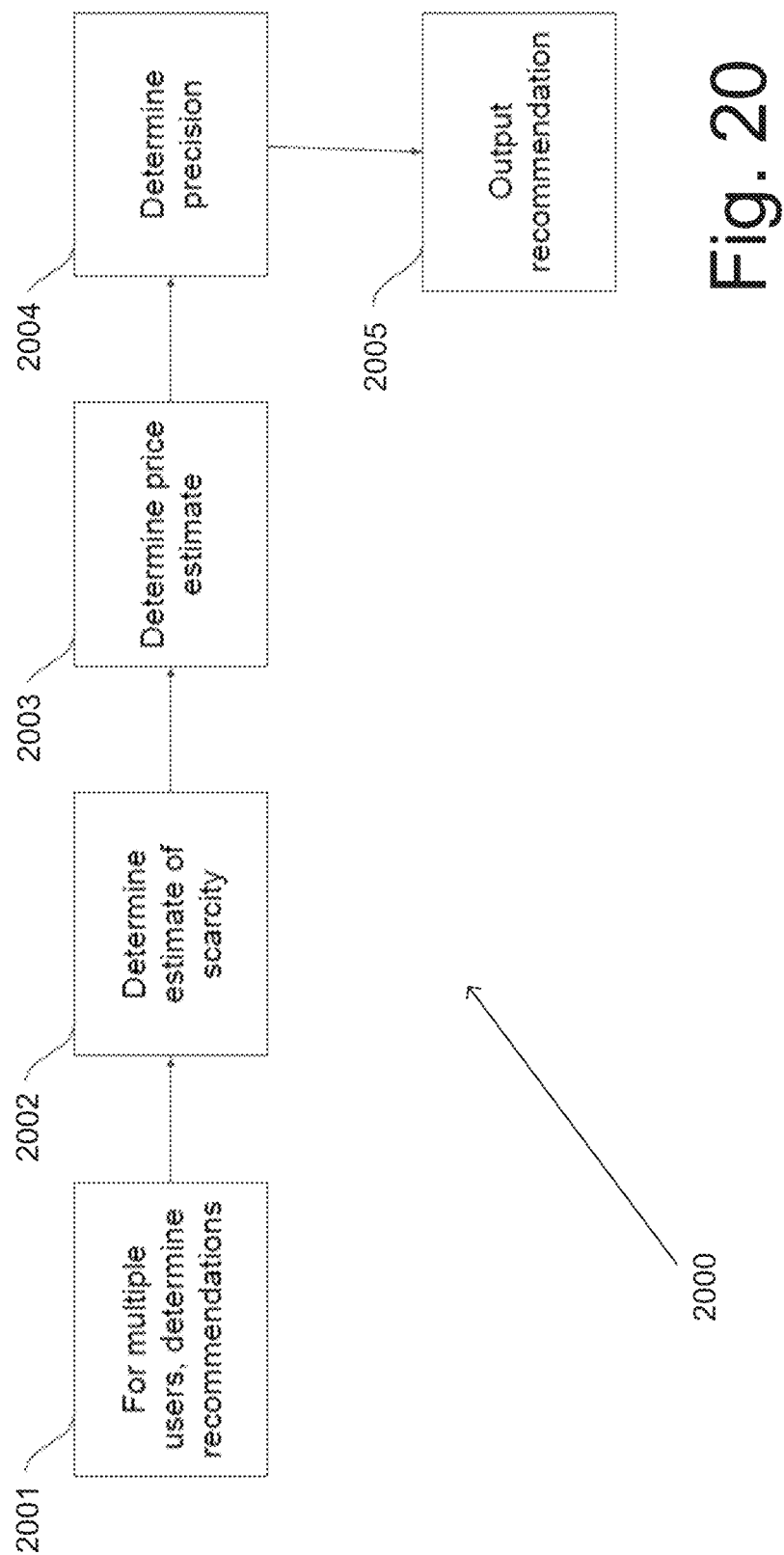
FIG. 20 illustrates a process for determining a recommendation based both on the likely preferences of one or more users, and based on the likely price trends for the products or services in accordance with an embodiment of the invention.

A process for determining a recommendation based both on the likely preferences of one or more users, and based on the likely price trends for the products or services in accordance with an embodiment of the invention is illustrated in FIG. 20. The process 2000 includes determining (2001) recommendations for one or more users. In several embodiments, the recommendations can be generated using any of the various processes described above with reference to FIG. 19. As can readily be appreciated, the specific process that is utilized to generate a recommendation is largely dependent upon the requirements of a specific application.

An estimate of scarcity can be determined (2002). In many embodiments, scarcity is inherent to the specific good and/or service to which a recommendation relates. For example, an NFT can be unique or one of a limited edition of NFTs. In several embodiments, the recommendation relates to a good and/or service that does not have a declared scarcity and a process is utilized to determine and/or estimate scarcity. A variety of processes for determining scarcity are discussed below. As can readily be appreciated, any of a variety of processes for determining scarcity can be utilized as appropriate to the requirements of specific applications in accordance with various embodiments of the invention.

In many embodiments, a price estimate is determined (2003). In several embodiments, the price estimate can be determined based on factors including (but not limited to) current prices, historical prices and/or estimated scarcity and appreciation data. Scarcity data can be determined as part of the process (2000). In certain embodiments, determination (2001) of a recommendation can involve generating appreciation data. As can readily be appreciated, generation of an estimated price is an optional aspect of process 2000 and the specific factors that are utilized in the generation of an estimated price are largely dependent upon the requirements of specific applications and/or users.

In order to assist users in evaluating the usefulness of recommendations and/or estimated pricing information, one or more precision estimates can be determined (2004). In several embodiments, the determined (2004) estimates indicate the accuracy of provided price estimate(s). In a number of embodiments, confidence information is provided including (but not limited to) a variance value, a standard deviation value, a count indicating the number of datapoints the price estimate is based on, and/or another statistical measure of accuracy.

In a several embodiments, the recommendation is output, e.g., using a GUI or an API. In certain embodiments, the recommendation is output in combination with the price estimate and/or the precision estimate. In a number of embodiments, price estimate and/or the precision estimate is output in response to a user request with respect to a specific recommendation. In certain embodiments, the recommendation that is output is accompanied by information in a manner that is specific to additional data including (but not limited to) at least one estimated trend data and/or the user profile of at least one user. As can readily be appreciated, the specific manner in which a recommendation is output and the companion information that is provided with the generated recommendation is largely dependent upon the requirements of specific applications.

While specific processes for generating recommendations and/or additional information that enables evaluation of the reliability of generated recommendations are described above with reference to FIGS. 18-20, any of a variety of processes can be utilized to generate recommendations and/or reliability information as appropriate to the requirements of specific applications in accordance with various embodiments of the invention. Furthermore, processes similar to those described above with reference to FIGS. 18-20 can be utilized within any of the blockchain-based NFT platforms and/or rich media platforms described above with reference to FIGS. 1-17. Accordingly, recommendation platforms described herein should be understood as not limited to any specific recommendation process and/or to use within any specific blockchain-based NFT platform architecture.

Recommendations Based Upon User Profiles

Recommendation platforms in accordance with many embodiments of the invention utilize user profiles in the generation of recommendations. In a number of embodiments, the recommendation platform takes as input a user profile for a user i. In certain embodiments, the user profile can include at least some demographic data, some action data, and in many cases also some recommendations associated with user i. Here, the demographics may at least in part be generated from action data, but may also be obtained from the user, e.g., age, gender and zip code. Action data can include purchases and other monetization events such as clicks on advertisements, as well as user search terms, browsing data, co-location data indicating potential bonds with other users, and more. Various processes for automatically generating user profiles and the specific data that can be automatically aggregated within user profiles in accordance with a variety of embodiments of the invention are discussed further below.

In several embodiments, recommendations generated by a recommendation platform include opinions collected from user i, including positive indications such as (but not limited to) positive reviews and repeat purchases; negative indications such as negative reviews, merchandise returns, complaints, switches to other competing products; and intermediate indications such as luke-warm reviews. Some of these, such as reviews, are explicitly generated opinion expressions, whereas others, such as repeat purchases and merchandise returns are implicitly generated opinion expressions. Based on the user profile data of the input, one or more other user profiles, such as the user profile of a user j, are compared with the user profile data of the input and a similarity measure is determined. The similarity measure may be general or may be related to a particular interest area, such as horses, jogging or photography. The general similarity measure $S_{ij}$ between user i and j is a value between 0 and 1, and the topical similarity measure $ST_{ij}$ between user i and j, of topic T, is a value between 0 and 1. In one example situation $S_{ij}$=0.2 and $ST_{ij}$=0.85 for T=music. That means that users i and j are not very similar in general, but their music tastes are very highly aligned. Each similarity measure, such as $S_{ij}$ and $ST_{ij}$, also have a precision value $P_{ij}$ and $PT_{ij}$, where the precision value indicates how accurate the estimate of the corresponding similarity measure is, e.g., based on the number of observations that the similarity measure is based on. A large number of observations means that the precision is high, which in turn means that the corresponding similarity measure is a highly accurate predictor of shared opinions, whether in general for all observed demographics and actions, or for a particular topic. For example, a precision of $P_{ij}$=0.75 means that the corresponding estimate $S_{ij}$ is a very accurate assessment, whereas a precision of $P_{ij}$=0.02 means that there is very little certainty in the estimate $S_{ij}$. Based on the similarity measure and the corresponding precision, a recommendation can be generated. The recommendation can include one or more assessments of products and services, and a likelihood that user i would find these desirable, based on the observed actions and based on opinions of user j, whether implicitly or explicitly generated. Identification of a user with a high similarity measure and a high precision value can be valuable to determine likely preferences for a given input user, whereas a user with low similarity or low precision is likely to be less valuable, if at all. If a malicious user provides fake recommendations, e.g., based on being paid to write reviews, the odds that there is a high similarity between that user and a given input user is low, as the profile (including the fake recommendations and the absence of associated behavior) of the malicious user are unlikely to correspond to the profile of the input user. Therefore, malicious users will not be able to influence the disclosed system as much as they can in today's recommendation systems.

In several embodiments, the recommendation platform takes as input a user profile and at least some demographic data related to the available level of disposable income. An individual user's disposable income may be estimated in many ways, including one or more of a review of previous purchases, blockchain-based transactions, their location, such as their zip code, their background such as employment or tax history, or credit histories—many of which are publicly available on the Internet. For example, Alice has a history of purchases that correlates to items associated with other users with high levels of disposable income. Alice also has a history of purchasing songs, movies, artwork, and luxury products such as a genuine Gucci handbag and expensive dinnerware that the system has determined to be luxury goods. The system scores Alice with a disposable income score of 0.85 where a score approaching 0.1 may indicate minimal disposable income, 0.5 may indicate average income and 0.95 may indicate an ability to purchase without concern for finances or budget. In certain embodiments, the recommendation platform can also determine the item's luxury score with a music download having, perhaps, a score of 0.4 and a kitchen plasticware container having a luxury score of 0.2, and an investment NFT having a luxury score of 0.91. In various embodiments, a machine learning algorithm determines a given item's luxury score and projects trends based upon the buyer demographics. For example, an item with a modest luxury score of 0.7, such as an expensive new game software, may be trending among users with disposable income scores below 0.5 indicating a trend toward unusually high demand among those that are typically too budget-constrained to make such a purchase. As can be readily appreciated, the specific information aggregated about a user in a user profile and/or the mechanisms utilized to infer user profile information are largely dependent upon the requirements of specific applications and/or the information sources available to the recommendation platform. As noted above, systems such as (but not limited to) rich media platforms can enable recommendation platforms to pay users to access user profile data aggregated concerning users via a permissioned blockchain. Specific processes for generating user profiles in accordance with various embodiments of the invention are discussed further below.

Figure 21:
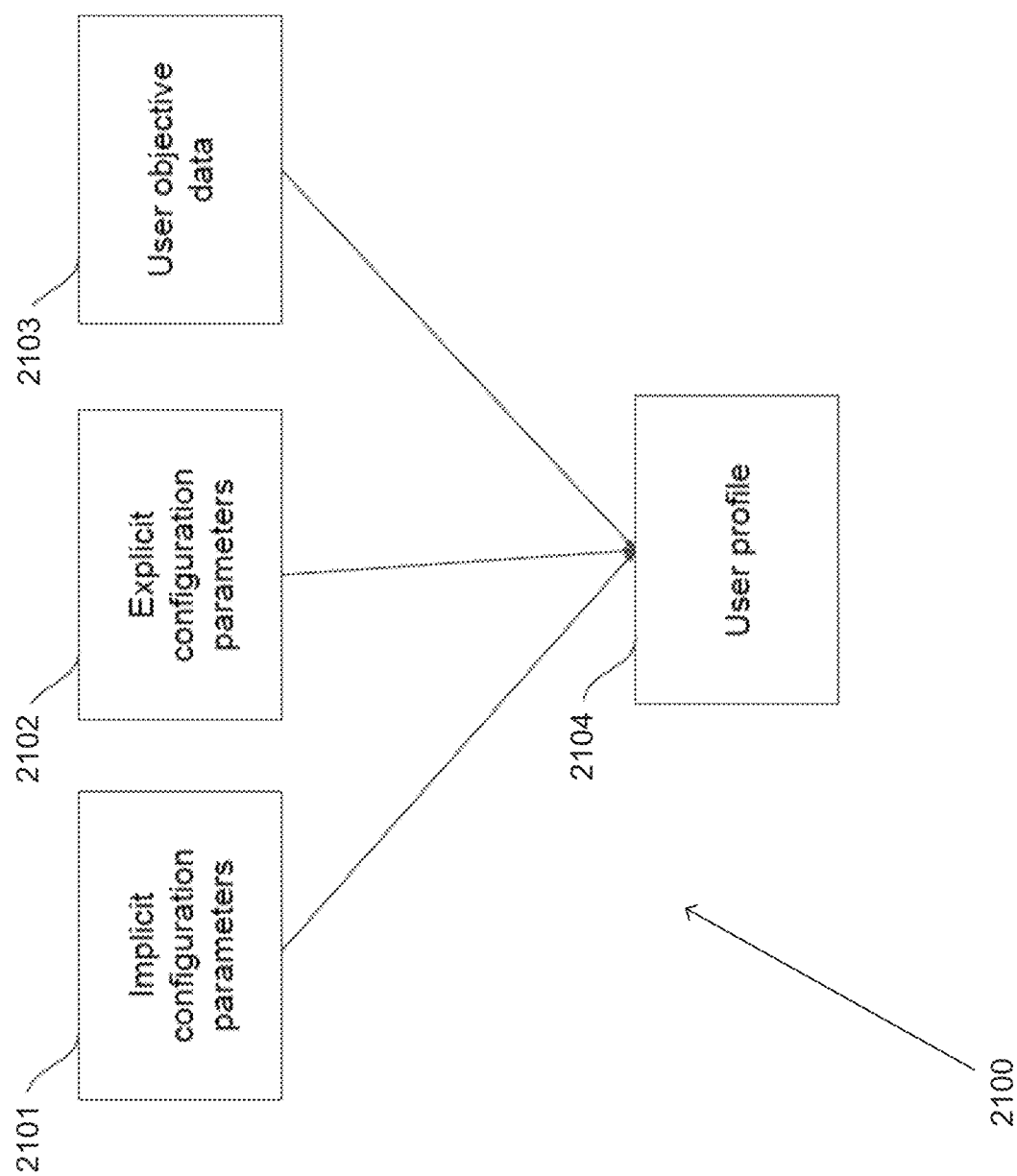
FIG. 21 conceptually illustrates a process for generating a user profile in accordance with an embodiment of the invention.

A process for generating a user profile in accordance with an embodiment of the invention is conceptually illustrated in FIG. 21. The process 2100 includes generating a user profile (2104) from implicit configuration parameters (2101) associated with a user; explicit configuration parameters (2102) associated with the user, and user objective data (2103). Example implicit configuration parameters (2101) include (but are not limited to) observations of actions associated with the user, where actions may include searches, clicks, ad conversions, purchases associated with the user. Example explicit configuration parameters (2102) include (but are not limited to) ratings generated by the user, recommendations generated by the user, and/or responses to surveys by the user. Example user objective data (2103) may include (but is not limited to) search terms, indications of the extent to which the goal is for the service or product to maintain or increase in value, and more. The user profile (2104) can include (but is not limited to) the simple combinations of inputs 2101, 2102 and 2103, such as a concatenation; it may also involve the generation of one or more predicates describing the user, where said predicates are generated from inputs 2101, 2102 and 2103. Example predicates generation is disclosed in U.S. Pat. No. 10,951,435, titled "Methods and apparatus for determining preferences and events and generating associated outreach therefrom", which is incorporated by reference in its entirety. As can readily be appreciated, the specific sources of information utilized in the generation of a user profile are largely dependent upon the requirements of particular applications.

Figure 22:
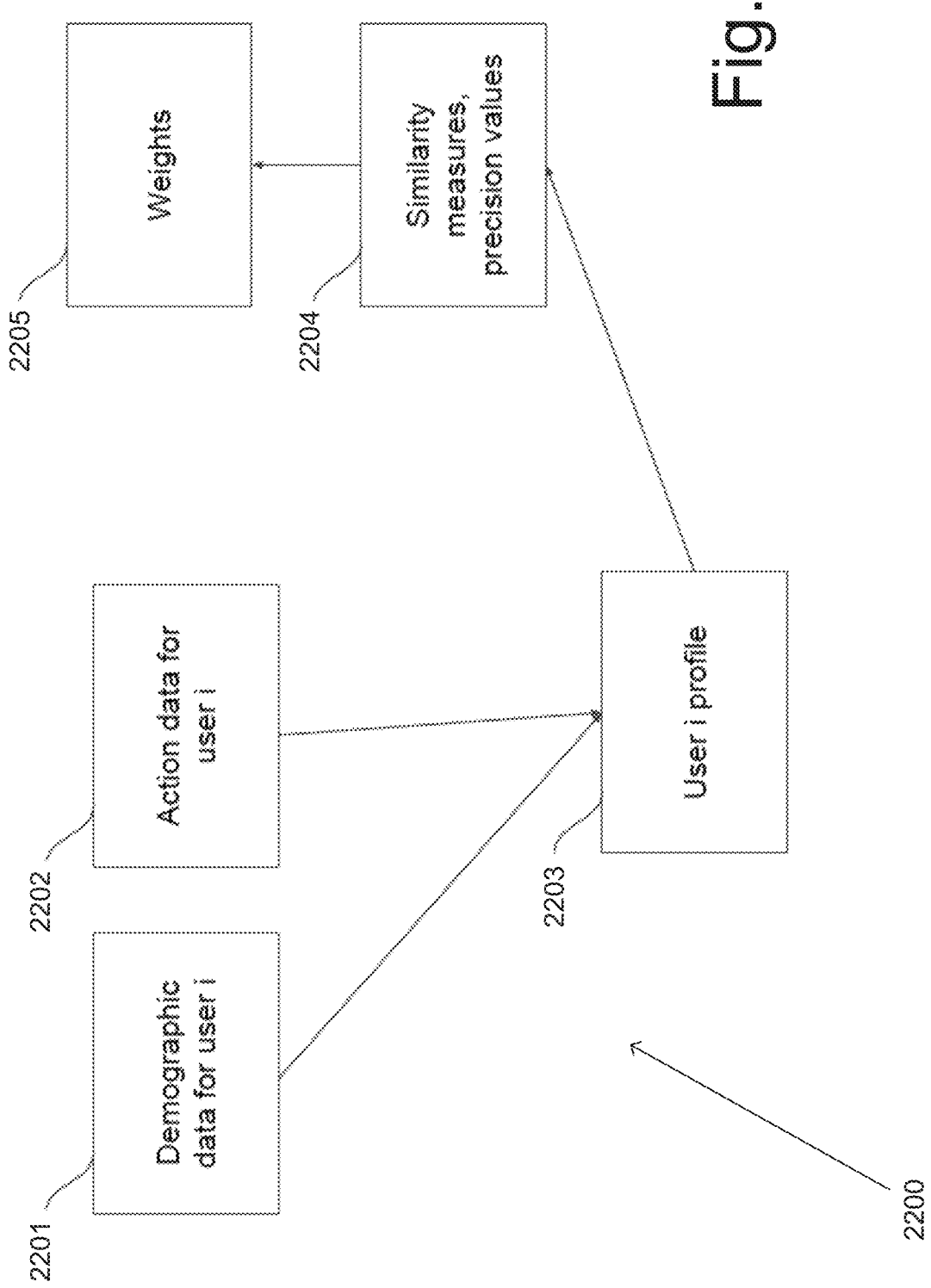
FIG. 22 conceptually illustrates a process for determining weights based upon a user profile in accordance with an embodiment of the invention.

As discussed above, the extent to which specific user's opinions are relevant to the generation of a recommendation can be utilized in weighting the extent to which a specific user's actions contribution to the resulting recommendation. A process for determining weights based upon a user profile in accordance with an embodiment of the invention is conceptually illustrated in FIG. 22. In the illustrated process 2200, demographic data for a first user (2201) is obtained. Some of this data may be implicit, such as gender estimates based on clicks and purchases, whereas other data may be explicit, such as shipping addresses. Action data for the first user (2202) can also be obtained, where the obtained action data may overlap with demographic data for the first user (2201), but does not have to. For example, action data for the first user may include (but is not limited to) clicks, scrolls and relative rendering times indicating the time a user spent on a particular webpage; recorded purchases; and/or the contents of received recommendations coming from the first user. Some of this may be explicit, such as the recorded purchases, while other may be implicit, such as estimates of interest levels based on the time a user spends on a webpage or using a given app. Systems and processes that can be utilized in the gathering of such action data in accordance with various embodiments of the invention are discussed further below.

From demographic data for the first user (2201) and action data for the first user (2202), a user profile (2203) can be generated by the system. Variant approaches for generating the user profile (2203) can be used, as will be appreciated by skilled artisans. Based on the user profile (2203) for the first user and additional user profiles, at least one similarity measure and one precision value is generated (2204) and stored. Based on at least one weight and one precision value (2204), at least one weight (2205) can be generated. In several embodiments, the weight describes how to use data of the additional users to determine recommendations for the first user. Various examples of processes for determining recommendations that can utilize weights generated in this manner are described above with references to FIGS. 18-20. Furthermore, the disclosed system can use techniques disclosed in U.S. Pat. No. 10,993,082, titled "Methods and apparatus for device location services", U.S. Pat. No. 10,951,435, titled "Methods and apparatus for determining preferences and events and generating associated outreach therefrom", U.S. Pat. No. 10,936,749, titled "Privacy enhancement using derived data disclosure", and U.S. Pat. No. 10,887,447, titled "Configuration and management of smart nodes with limited user interfaces", all of which are incorporated by reference.

While specific processes are described above with respect to FIGS. 21 and 22 for generation of user profiles and the weighting of the contributions of specific users to the generation of recommendations based upon factors including (but not limited to) user profile information, any of a variety of processes can be utilized to generate user profiles and/or determine weightings to be applied to particular actions of a given user in the generation of a recommendation by a recommendation platform as appropriate to the requirements of specific applications in accordance with various embodiments of the invention.

Generating Recommendations Based Upon Resource Characteristics

Recommendation platforms in accordance with several embodiments of the invention provide recommendations with respect to one or more resources, such as physical items, services, or digital items, including NFTs, based upon factors including (but not limited to) their origin, their format, and the appreciation (or lack thereof) of the resources and related resources (including other resources from the same origin, or other resources liked by the same users). For limited resources, such as NFTs, services that do not scale well and physical items with some limitation in terms of production quantities, an assessment is made of the extent to which the resource will increase in value based on scarcity, resulting in a scarcity score for the resource. This may be achieved using recommendation scores for related resources, e.g., of the same type or from the same origin, price trends of related items; actual scarcity of related items, etc. For all resources, an assessment is also made related to the likely desirability of the resource among users in general. This may be achieved using recommendation scores for related resources, e.g., of the same type or from the same origin. This results in a desirability score that indicates how much the resource is expected to be appreciated. Both the scarcity score and the desirability score are indicators of likely future value. Items that are scarce are often perceived as desirable. Therefore, a correlation between scarcity and desirability is common. However, many items are desirable and not scarce. Fuel for a vehicle is desirable, yet fuel is a plentiful commodity. Music is also desirable, yet songs are infinitely downloadable and inexpensive. Scarcity alone is an insufficient measure for the machine learning system, otherwise it might recommend one very ugly but unique piece of artwork. Because of the human emotional trait to desire scarce items, the combination of desirability and scarcity scores is a uniquely important aspect of determining future trends.

In many embodiments, recommendation platforms generate recommendations by assessing a product's feature vector. For example, a particular product, whether real or virtual has characteristics, as may the product's current or potential owner. These characteristics may include, but not limited to, age, zip code, interest of the user, risk factors, user profile data, reviews from the users, origin, format, resources, appreciation index, etc.

In certain embodiments, the features of a product are expressed as an N-dimensional feature vector. A specific N-dimensional feature vector can be created for each item including (but not limited to) an NFT or Virtual Product. The elements of the feature vectors or feature sets may include information that describes the item itself (e.g., an artwork), for example if it is a music file, it uses features that describe tempo and pitch, whereas if it is visual art, it uses features that include color, hue and light. A collection of items may be represented in a smaller dimensional space (e.g., a 2 or 3 dimensional space), simplified using dimensionality reduction techniques including (but not limited to) Principal Component Analysis (PCA) of the N-dimensional features sets. In several embodiments, each item, such as (but not limited to) an NFT or Virtual Production, maintains the knowledge of its full N-dimensional Feature Vector within a collection. In certain embodiments, the feature vector can be encoded within the bytecode of a smart contract recorded on an immutable ledger encoding the NFT or Virtual Production and the feature vector can be accessed by a recommendation platform. In a number of embodiments, the feature vector is recorded on a permissioned blockchain that restricts access to feature vectors as appropriate to the requirements of specific applications.

In certain embodiments, a collection of items (e.g., NFT or Virtual Production) may be transformed using machine learning or artificial intelligence to self-organize using each item's N-dimensional feature vector to result in a low dimensional (e.g., 2 or 3 dimensional) self organized map of the collection of items. A skilled artisan will recognize that variations on these methods can also be used for self-organization including with an artificial neural network using backpropagation or Bayesian learner. The same methods and tools may identify trends based upon changes to the feature vectors with time. In several embodiments, the system may organize items (e.g., virtual artwork) by genre and use Euclidean distance or K-nearest neighbor to recommend a similar item to a prospective buyer. As can readily be appreciated, the specific manner for expressing the characteristics of resources and the manner in which that information is accessible to and utilized by recommendation platforms in accordance with various embodiments of the invention is limited only by the requirements of particular applications.

Processes for Generating Pricing Estimates

Recommendation platforms in accordance with a number of embodiments of the invention incorporate a valuation predictor that assesses the likely future value of the product based on one or more assumptions or beliefs, such as the continued scarcity of the product or service or a general increase or decrease of appreciation of products or services of the category over the time of the prediction. These two components, together, strengthen each other by providing assessments of likely enjoyment, value and valuation, as well as other parameters described herein. One application of the use of valuation predictors is the identification of NFTs and/or other virtual products that are good fits for a potential acquirer, whether the acquisition is of exclusive or non-exclusive access rights, and whether the assessment is primarily for purposes of individual (or purchasing entity-based) use; for purposes of investment; or a combination thereof.

The scarcity of an item, whether real or digital can be computed based upon supply and demand. For example, the market price of a cryptocurrency is generally based upon the supply of freely available coins, which may be the total number of coins in existence less those that are held tightly for investment purposes, and the market demand for the coins. If there are few coins freely available for trade, but there is a lot of demand, then the item may be considered scarce and the price is likely to rise. In one embodiment, the system may perceive the scarcity to be the rate of change in availability, such as one might find in the lodging industry. As an illustrative but non-limiting example, when hotels are full, scarcity is scored high, say at a level of 1. When hotels are half-full, the level is 0.5. When the system detects construction of an unopened hotel, or the advent of a new competing service such as home rentals, the scarcity score is likely to drop. Demand for an item is often a result of the item's desirability.

An item's desirability may have a dramatic influence on demand and pricing. In one embodiment, the system may perceive a value of desirability based upon the volume of trades during a period versus the total number of items in existence. For example, an artist may have created 100 works of glass-blowing art during his career. If, in a normal year, only 5 of those trade hands, but the past year has seen 20 trade hands, maybe because of the death of the artist, the desirability score will increase. In this example, a score may be computed from the number of annual trades divided by the number of works of art which, for the past year would result in a value of 0.2, significantly higher than the 0.05 typical of prior years. In several embodiments, the system may perceive a desirability score based upon price trends for an item, or even a combination of exchange volumes and pricing changes. If the same artwork is selling for 10 times the price as compared to prior years, the system may determine the desirability score has increased dramatically.

In this instance, the system might compute a desirability score from the number of annual trades divided by the number of works of art times the ratio of the price from the past year versus prior years.

The scarcity score and the desirability score, combined, can be used to determine a likely assessment of an item. For example, a digital art object in the form of an NFT with a very high scarcity score (such as 0.9 out of 1) and a rather high desirability score (such as 0.65 out of 1) will likely appreciate in value more than another item, such as a Honda Civic, with lower scarcity score (such as 0.21) and lower desirability score (such as 0.19), assuming they are both priced appropriately. Therefore, it is also beneficial for the system to determine what the appropriate price of an item is, which is done based on the sales of related items, the prices of related items, and the attention paid to such items. For example, an item with a lot of views but no purchase is likely to be priced too high, whereas an item that was bought very rapidly is less likely to be priced too high. A related item may mean an item from the same originator, such as the same artist, or of the same genre, such as a photo of a cat, but may also be determined based on the preferences of users likely to appreciate the item based on their past history, and the likely actions of such users. For example, some users may be more likely to purchase items, whether based on having stronger preferences, more disposable funds, or being more excitable. The system determines the appropriate price of an item and then observes the price that the seller sets, as well as what actions (e.g., searches, views, placing in shopping basket, complete purchase) that were associated with the item. By comparing the estimated appropriate price and the set price in light of the actions, the system can fine-tune the weights used to determine the appropriate price, as well as the weights for the desirability score computation. Similarly, weights used for the computation of the scarcity scores are modified based on demonstrated scarcity of items that are related. One score may indicate the scarcity of items from the same originator (such as artist), and another may indicate the scarcity of items of the same genre (e.g., puppy videos). Some scarcity scores, such as items of a genre, may be indicative of the desirability score as low sustained scarcity in combination with solid sales are indicative of a high desirability, just as high sustained scarcity in combination with rising prices is. Similarly, a low sustained scarcity is likely to indicate that prices may not be increasing in the near term.

In several embodiments, the scarcity score, the desirability score, the similarity score and the precision score are all computed using machine learning (ML) techniques, using the described features above as inputs, such features including but not being limited to: demographic data, action data, opinion data, appropriate prices and actual prices, and data related to temporal aspects of such features (such as how rapidly actions take place). These ML models are used to predict the above-listed scores, and are improved by turning the weights as observations are made and compared to the predictions based on the scores.

Figure 23:
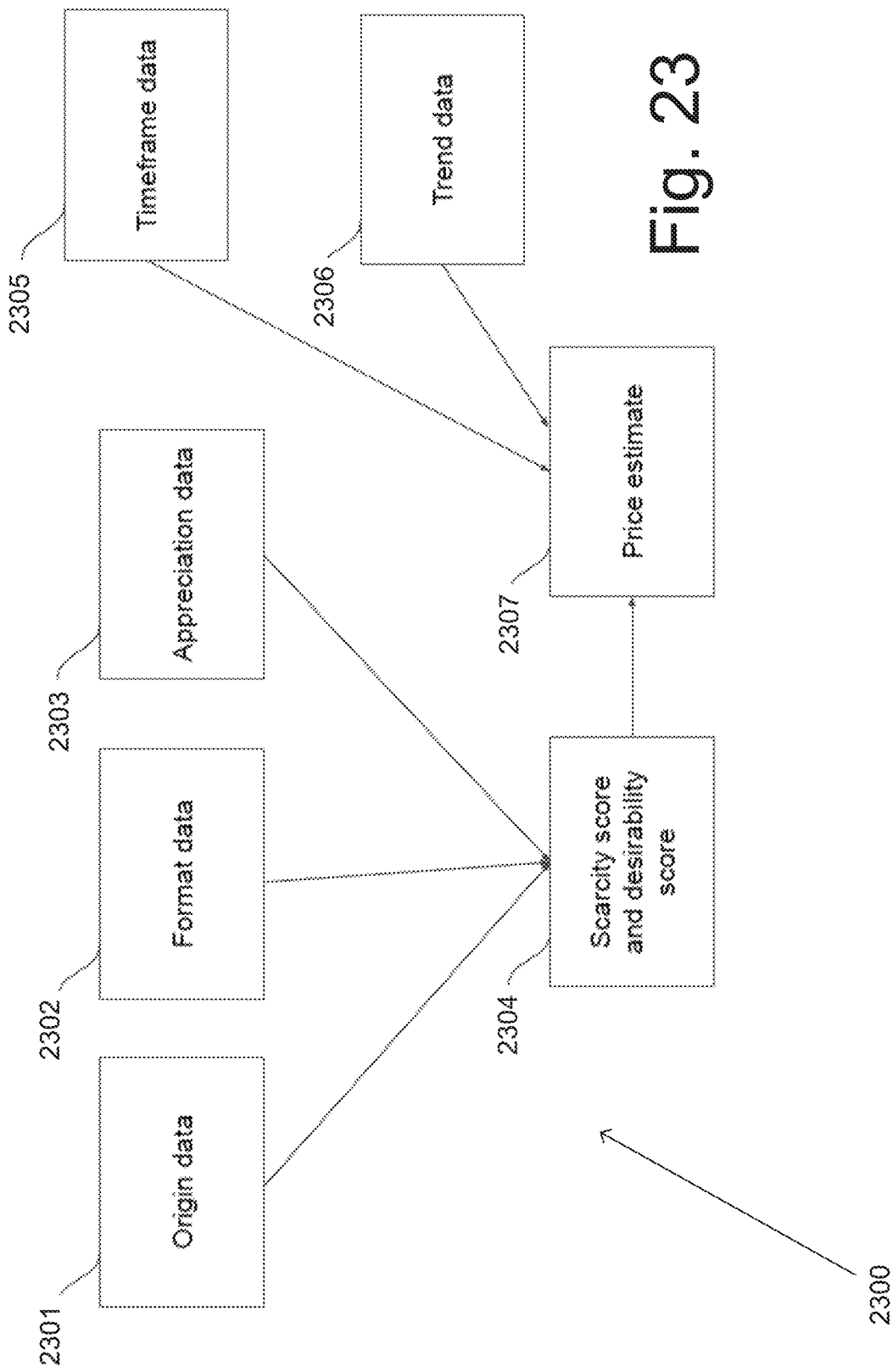
FIG. 23 conceptually illustrates a process for generating price estimates in accordance with an embodiment of the invention.

A process for generating price estimates in accordance with an embodiment of the invention is conceptually illustrated in FIG. 23. In several embodiments, a recommendation platform can perform the process 2300 by obtaining data including (but not limited to origin data (2301), format data (2302) and appreciation data (2303). In many embodiments, the recommendation platform also generates a scarcity score and/or a desirability score (2304).

Example origin data for a first item may be (but is not limited to) that the first item, such as a song, may have been produced by artist A, who releases one record every year on average. Example format data (2302) can include information that indicates that the first example item is a sound file, which can be bought by any number of users from a variety of marketplaces for music. In certain embodiments, the format data may also include additional metadata such as (but not limited to) an indication of the genre of the song, or more generally, of the items produced by artist A. Example appreciation data includes data indicating the popularity of the indicated genre, and, if known, the popularity of the first song, as indicated by data related to sales and accesses. A second example item may have origin data (2301) that indicates that the item is produced by artist B, who releases two products every three months. The associated format data (2302) can indicate that the second item is a jpg image file available for purchase as an NFT, and that there are 100 numbered NFTs available that each enable the purchase of the jpg image file. The format data may also specify the size of the jpg image file, the color palette of the image contained within the image file, and what applications are allowed to render it, if such a limitation exists. The appreciation data (2303) of the second item may indicate the transaction history for previous sales created by artist B, e.g., how much the items were sold for, whether any have been resold, how long items were on the market, whether there were competing bids, and more. Appreciation data (2303) may also specify similar data related to items from other origins (e.g., other artists) that are deemed closely related, whether by a human expert, an automated rule-based expert system or by an ML-based classifier.

In certain embodiments, the scarcity score and desirability score (2304) are generated from the inputs (2301), (2302) and (2303). In several embodiments, the scarcity score and desirability score (2304) may use a rule-based algorithm, an ML based algorithm, or a combination thereof. The scarcity score for the first example item may indicate no scarcity as any number of items can be purchased at the same time, while the desirability score may be 38 out of 100 in general and 62 out of 100 for users who enjoy rock music. The scarcity score for the second item may be 34.2 out of 100, and may include a precision value, such as 2.67; the scarcity score may increase as the items sell and based upon the sales velocity; the associated desirability score may be 17 out of 100.

In many embodiments, price estimate (2307) is computed. The computation of a price estimate can use (but is not limited to) at least one of the scarcity score and the desirability score (2304), timeframe data (2305), trend data (2306), and may also use as input an asking price (not shown). In several embodiments, timeframe data (2305) can indicate for what time period a price estimate is to be computed, e.g., "right now," "in three months", "for the next 24 months", and so on. In certain embodiments, the trend data (2306) indicates price trends, appreciation data trends, scarcity trends, etc., for other items in general; for other items of the same genre; for other items by the same origin, and/or for other items with related format data. In several embodiments, recommendation platforms compute price estimates using one or more or a combination of statistical methods, ML methods, and methods similar to (but not limited to) the approaches described above with reference to FIG. 20.

While specific processes are described above for generating price estimates are described above with reference to FIG. 23, any of a variety of processes can be utilized to generate price estimates and/or data accompanying price estimates indicating the precision and/or the confidence of price estimates as appropriate to the requirements of specific applications in accordance with various embodiments of the invention. Accordingly, processes for generating price estimates should be understood as not limited to specific types of input data and/or the various inputs described above can be utilized alone, in different combinations and/or in combination with additional sources of input data as appropriate to the requirements of a given application in accordance with certain embodiments of the invention. Furthermore, the various processes described above for generating price estimates can be utilized in any of the various recommendation platforms described herein including (but not limited to) those described above with reference to FIGS. 18-20 and the discussion of the analysis of item feature vectors.

As can readily be appreciated, the ability to estimate price can be useful in generating recommendations. Information concerning goods and/or services that are likely to become scarce and/or appreciate in value can also be highly useful. Recommendation platforms that provide trends spotters with the ability to influence recommendations in accordance with various embodiments of the invention are discussed further below.

Trend Spotters

In a number of embodiments, an entity that can be referred to as a trend spotter can make a prediction of one or more of the parameters discussed above, such as the scarcity score, the desirability score, the similarity score and/or the precision score, or related to the price point of one or more resources at a specified time in the future. The trend spotter may be a human expert, or software, or a combination thereof. It is different from the ML-based methods disclosed above in that it is at least in part externally hosted from the recommendation platform, and that the exact approach for determining a prediction may not be known to the recommendation platform. The trend spotter can be associated with an identity, and the identity can be associated with a reputation that indicates the quality of past predictions. This quality measure can be used to assign a weight value to a given prediction. The trend spotter may also set precision values related to the prediction of one or more of the parameters; this precision value can also be used, in combination with the quality value, to determine the weight.

In several embodiments, the reputation score of the trend spotter is determined based on this accuracy of its predictions, and how well others also predicted a trend. If two trend spotters are equally accurate when it comes to determining a future value of a parameter, but one of the trend spotters is far off from other predictions (whether trend spotters or automated prediction methods such as those disclosed herein) then the one that is far off—but still accurate—is more valuable, and the associated increase of reputation of this trend spotter is greater. Thus, the reputation value can describe both the accuracy of the prediction (including both the quality and the precision) and the extent to which the trend spotter was an outlier among trend spotters and automated prediction methods.

In certain embodiments, trend spotters can be rewarded in a variety of manners, including analogously to how bounty hunters are awarded for their efforts, as disclosed in U.S. patent application Ser. No. 17/806,065 "Systems and Methods for Maintenance of NFT Assets", which claims priority to U.S. Provisional Patent Application No. 63/208,366 titled "Perpetual NFT Assets", the disclosures of which are incorporated in their entireties by reference.

In many embodiments, an entity that can be referred to as an influencer makes a recommendation of one or more, but not limited to, assets, products, services, or artists. The influencer can act to influence their followers, instigate a trend, and, indirectly, the desirability score of the item. Influencers are traditionally consumers; however, it is anticipated that computer algorithms will mimic the actions of influencers in the future. Whether human, algorithmic, or a combination of both the intent is to influence purchases and, or, investments. Similar to the trend spotter, it is different from the ML-based methods disclosed above in that it is at least in part externally sourced, and that the exact approach for determining an item to promote may not be known to the system.

In a number of embodiments, the influencer is associated with an identity, and the identity is associated with a reputation that indicates the success of prior influence campaigns. This quality measure is used to assign a weight value to a given influence. If two influencers are equally successful when it comes to influencing a future value of a parameter, but one of the influencers is promoting a competing item, then their influences may partially offset. Detecting, tracking, and managing the external influencers is disclosed in the co-pending U.S. Provisional Patent Application Ser. No. 63/066,087 entitled "Security Enhancements using Atomic State Change Management", the disclosure of which is hereby incorporated by reference in its entirety.

While specific mechanisms for implementing automated trend spotters and/or influencers are described above and for generating recommendations based upon information sourced from trend spotters and/or influencers, recommendation platforms in accordance with various embodiments can rely upon any of a variety of sources of information including information provided by users and/or remote systems, where the origin of the information may be unknown but the reliability of the information can be estimated, as appropriate to the requirements of specific applications. Additional sources of information that can relied upon by recommendation platforms are discussed further below.

Betting-Based Recommendation Platforms

Recommendation platforms in accordance with a number of embodiments of the invention can utilize a betting-based recommendation process to generate recommendations. For example, a recommendation platform can collect recommendations such as "This is a great quality product", and it can also be used to collect predictions such as "This is a product that will be in greater demand in three months" or "This is a service that is becoming harder to get due to scarcity".

In a number of embodiments, an ML component receives bets as input and generates an output indicating the likely valuation for a given time period, and an associated precision that is related to factors including (but not limited to) the size of the marketplace, the number of bets being placed, and/or the average interarrival time of bets, where a low interarrival time means an active exchange whereas a high interarrival time means a less active exchange. A less active exchange is indicative of a polarization of opinions. The track record of the providers of bets can be of value when determining the meaning of a polarized marketplace in terms of estimated value and precision, and can be determined using standard ML mechanisms trained on past observations.

In several embodiments, recommendation platforms may take the estimated value and the precision as input parameters, along with other parameters as described above, and generate assessments including (but not limited to) assessments of value, risk and/or more. Parameters can also be computed using algebraic methods from bets. One simple way is a voting based approach where the funds bet for one opinion represent a number of votes for yes, the number corresponding to the funds value; while the funds bet for the other and diametric opinion correspond to no votes, the number of which correspond to the amounts invested. This may be a windowed approach in which old investments are given a lower weight than newer investments. The resulting votes can indicate whether the marketplace believes an event will occur or not. In several embodiments, the price trend curve for the bets is used to indicate changes of popular opinion over time, and this change can be used to determine weights used for weighing of other inputs, which may be obtained externally, such as (but not limited to) from a traditional recommendation system where users indicate whether a product should be rated using one, two, three, four or five stars. Here, the number of stars is the recommendation, and this recommendation may be weighed based on the trend curve, so that low recommendations with a falling trend curve for bets are further reduced whereas high recommendations with an increasing trend curve are further increased. A skilled artisan would recognize that there are many variants of this approach, and would see the benefit of using the trend curves for improving the assessments of parameters as disclosed herein. Similarly, trends for other types of user-provided actions may be used to generate weights for other quantities, or as inputs to ML algorithms that in part perform such weighting.

By way of further example, a first user may be interested in investment-grade NFTs that are expected to increase in value within one year, and where the investment is relatively low-risk. The low risk may be supported by high quality predictions and high-precision predictions, or a large number of medium-quality or medium-precision predictions that are supporting the value increase; and the relative absence of indications of a likely price decline where these indications also correspond to high quality predictions or high-precision predictions. The user may be a human user who uses an interface to indicate preferences related to risk tolerance, appreciation objectives, and detailed indicators such as the identities of preferred trend spotters or ML methods used for making predictions. The user may also be an algorithm that is run by an investment company, where the algorithm obtains parameters related to value predictions, such as the parameters discussed above, as well as predictions from ML engines and trend spotters, and/or where the algorithm combines these using potentially proprietary methods to make assessments of what investments are most favorable. The user, whether a human or an algorithm, may then obtain information relating to NFTs (or more generally, resources) with the highest investment potential according to the configurations and computations, and make one or more bids or purchases. The greater the volume of use in this way, the more stable the predictions will be, which is beneficial for investors with low tolerance for risk.

Whereas bids, as will be described herein, provide a link between the expression of an opinion and a financial opportunity/risk, many of the processes utilized by recommendation platforms implemented in accordance with various embodiments of the invention also apply to endorsements, which provide a link between an expression of an opinion and a reputation opportunity/risk, where the reputation is associated with an identity or pseudonym of the provider of the opinion. Thus, influencers may affect recommendations not by risking financial value but reputational value (which may then have financial repercussions). Thus, the mechanisms we disclose to process the bids also apply to endorsements, for these reasons, and as will be apparent to a person of skill in the art. The system implementation may consider requiring influencers and users who have made a public recommendation, such as a product review, to either disclose the purchase, the recommendation, or to be prevented from making a bid, or relinquishing a previous bid to prevent abuse. Similar abuses may require prevention such as those by employees and representatives of a product or those with a financial interest beyond the bid system. Accordingly, the specific manner in which bids and/or endorsements or other actions are relied upon in the generation of recommendations is largely dependent upon the requirements of specific applications.

Figure 24:
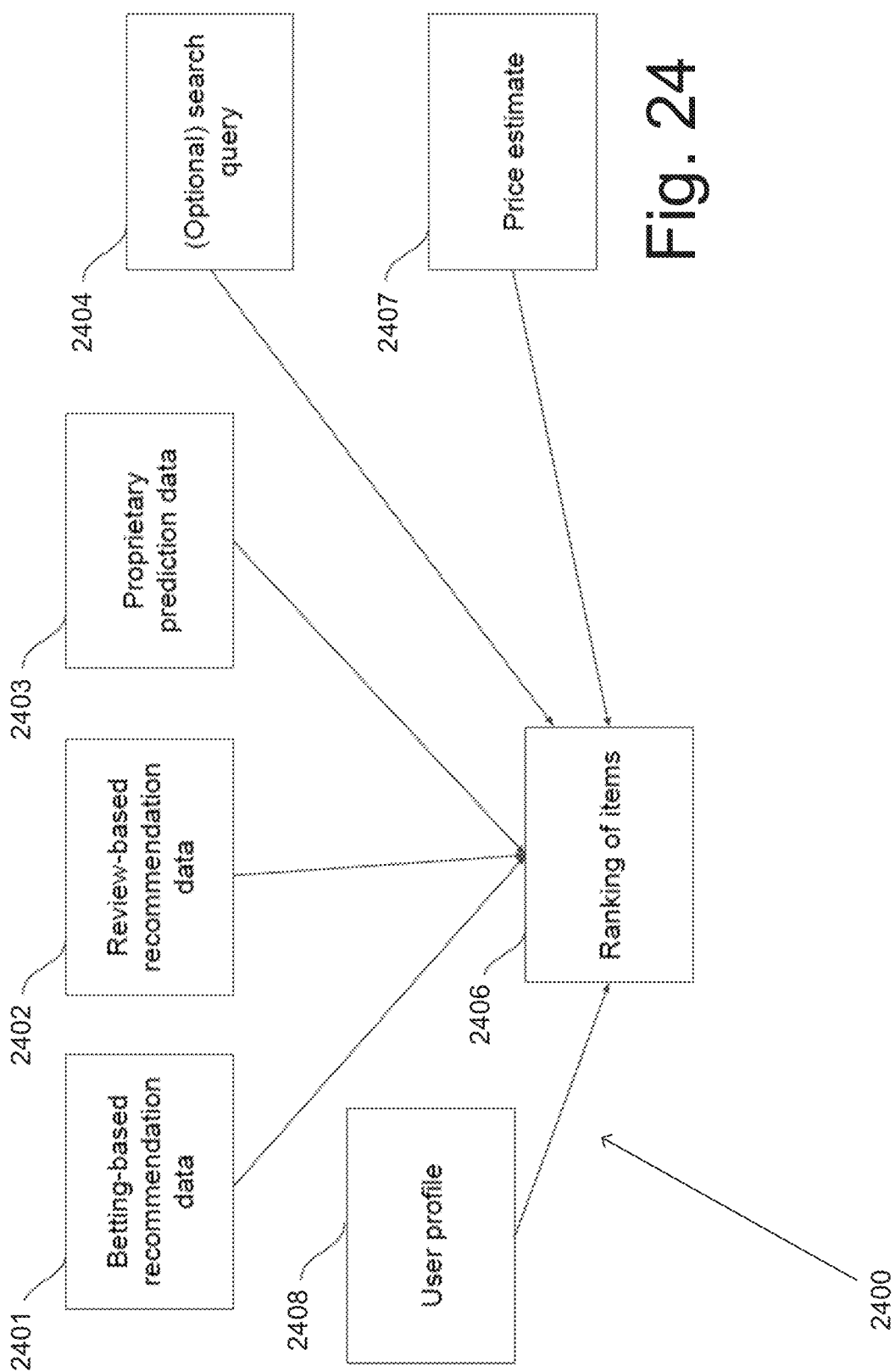
FIG. 24 conceptually illustrates a process for generating a betting-based recommendation in accordance with an embodiment of the invention.

A process for generating a betting-based recommendation in accordance with an embodiment of the invention is conceptually illustrated in FIG. 24. In the illustrated embodiment, the recommendation platform receives a user profile 2408 for a user for whom the recommendation is to be generated. In addition, the recommendation platform performs a process 2400 in which it receives data including (but not limited to) one or more of betting-based recommendation data (2401), review-based recommendation data (2402), and/or proprietary prediction data (2403). In several embodiments, the proprietary prediction data (2403) may be produced by an expert, by an algorithm that may not be known to the system, or a combination thereof. As can readily be appreciated the specific information obtained during the process 2400 is largely dependent upon the requirements of a specific application.

In addition, the recommendation platform can obtain an optional search query (2404) that indicates the interests of the user. When a search query (2404) is not available, the recommendation platform can generate a general recommendation not based on any particular request, or generates one or more recommendations based on previous requests associated with the user. In addition, the recommendation platform can use one or more values that are a price estimate (2407) and that may be compared with information related to user profile (2408) to determine whether the associated product or resource is likely to be of relevance to the user, e.g., based on past purchases or activities. In several embodiments, the recommendation platform generates a ranking of items (2405). In a number of embodiments, the generation of the ranking of items (2405) may use an ML based algorithm whose weights are fine-tuned in response to information about how the user reacted to the ranking of items, e.g., by clicking to get more information on one or more of the items indicated in the ranking of items, by performing one or more purchases, searchers, or by accessing any associated resources. Thus, the accuracy of the prediction algorithm that produces the ranking of items can be improved in response to observations related to the user and her actions.

While specific processes are described above with reference to FIG. 24 for generating recommendation based upon betting-based recommendation data, any of a variety of processes can be utilized to generate recommendations based upon information derived from betting information as appropriate to the requirements of specific applications in accordance with various embodiments of the invention.

By way of an additional example, a user can invest in NFTs that, in addition to having reasonable investment potential with respect to some time frame, also satisfy some personal criteria of the user. For example, the user may invest in music-based NFTs and movie scripts for sci-fi movies, but not in JPG-based NFTs or any NFT that does not come from a source that is certified to be an equal opportunity employer. Thus, this second user inputs, whether using a GUI for a human user or an API for an algorithm user, a search configuration, obtaining in response a collection of potentially ranked resources. The ranking may be performed using one or more dimensions, such dimensions including estimated 12-month appreciation, estimated 48-month appreciation, risk level, and the precision of estimates associated with the precision of the underlying inputs to the ML algorithm that determines likely appreciation. Other example parameters related to which the ranking can be performed are also possible, as will be appreciated by a skilled artisan. The second user may be provided with suggestions of bids that are likely to be accepted where there is no fixed price set, and can provide a bid for one or more of the items. In some instances, the user may wish to buy a given combination of resources, and only if he or she will obtain all of them. This is well handled using a smart contract that specifies the conditions of the purchase. This can be matched to a first resource and to a second resource at the essentially same time or in serial, and if both match, and the purchase terms are acceptable to the sellers, then both purchases take place essentially at the same time, and only when both resources are available.

In a third example, a user is interested in investing in futures in service provision or merchandise, and may wish to purchase the right to having a meal for 12-18 people delivered for Thanksgiving, relative to a particular geographic area, from a particular vendor. The user thus may pay an agreed amount, such as $450, for this right. The real price of the service may be $1800, and the remaining $1350 that are not paid would be due a week before delivery. This is beneficial for the provider of the resource (in this example, a Thanksgiving meal for 12-18 people) as it enables planning and investment in ingredients, and it is also beneficial for the user as it enables planning ahead, and also financial benefit. Namely, if the user is not interested in taking delivery of the service, he can resell the contract before the time of delivery. If the provider is a recognized chef of a restaurant, the user may be able to resell the right to delivery, for which he paid $450, for $900 a month before delivery. The buyer of the contract would then pay $1350 to the service provider a week before delivery. If a user with the right of delivery does not pay the final instalment at the specified time, the contract would not be binding to the provider of the resource, who could then either downscale its effort or sell the contract to another party. Like NFTs, it is possible to predict the value of resources such as these based on historical data and analysis of providers, scarcity, and more. Similarly, just as the chef may be the seller of a resource, he or she can also be the buyer of another resource, such as one or more ingredients. Thus, an agent of the chef may automatically generate a contract for purchasing raw turkey upon the sale of a Thanksgiving meal. This automation simplifies the processing, and also extends the benefits of planning ahead down the chain, e.g., to farmers and other providers of resources consumed by the check or other service provider. An agent here is a software program or a software program with some user input and configuration.

In a number of embodiments, a company can bid up the value of bids related to positive reviews of their products and services, essentially holding all such contracts at buoyed prices, thereby hoping to artificially increase the recommendations associated with their product or service. However, recommendation platforms in accordance with many embodiments of the invention can also consider the price of negative reviews. If these are also high, that is indicative of two groups of investors with diametric views on value, or of a self-interested party support-buys the positive opinions.

Either will be identified as indicators of risk to the recommendation computation entity, which will identify high positive prices and low negative prices with a positive recommendation that can be relied on, and low positive prices and high negative prices with a negative recommendation that can be relied on. High prices of both these contracts reduces the extent to which the associated recommendation can be relied on, thereby reducing the associated weight of the associated recommendation score. The self-interested party cannot suppress the prices of negative reviews by buying and holding these contracts, as holding contracts means setting a price higher than others are willing to pay, and their assumed goal is to set a lower price. Setting the lower price will cause the sale of the contract, which would then only be resold at a higher price by the purchaser. A very high turnaround of the negative reviews therefore indicates subsidized selling followed by increased-cost buying by the self-interested party. Apart from this being very costly to maintain for the self-interested party, the pattern of high turnaround for negative opinions and limited turnaround for positive opinions is indicative of such a subsidizing effort of negative opinions, and bloating of prices of positive opinions. The recommendation computing entity can therefore identify patterns such as these and reduce the weight associated with situations that are indicative of attempts to artificially affect the prices of the contracts.

Recommendation platforms in accordance with a number of embodiments of the invention utilize techniques disclosed in "Financial Instruments in Recommendation Mechanisms", by Markus Jakobsson, published in FC 2002: Financial Cryptography pp 31-43, and hereby incorporated by reference in its entirety. We refer to this as the FIRM recommendation. The FIRM recommendation technique has benefits but also shortcomings and flaws, and can be extended and improved as disclosed herein, and incorporated within recommendation platforms in multiple ways. For example, in one instance, a recommendation platform can be configured to request from the bet providers bets related to the value of the related product in 12 months, whereas in another it is configured to request the value in 24 months. In one instance, a bet provider can choose to place bets both for a 12 month outcome and a 24 month outcome. The cost of placing these bets will be computed based on the marketplace of bets up to the time of a given bet. A bet provider may be told that one bet relates to the value of a resource rising by at least 110% of the current value in 12 months, and that the cost of this bet is $0.33 per unit of bet, whereas the bet relating to the value falling to no more than 90% of the current value in 12 months may cost $0.5 per unit of the bet, indicating that the current consensus indicates that a rise in value is more likely than a fall in value. At the same time, the costs for the 24 month prediction may be $0.1 per unit of the bet for an increase to 120% of the current value in 24 months, and $0.8 for a reduction to below 80% of the current value in the same time period. This indicates that the long-term consensus is an even stronger growth in value for the resource for the longer (24 month) term than the shorter (12 month) term. In one other instance, the user is asked instead to make bets related to the relative value of two products, e.g., a bet that product A will increase more in value within 12 months than product B will. Here, a product may represent a basket of items, or just one item, where the item may be a physical good, a virtual good, or a service. Bets can also be made on other properties, such as market fluctuations, precision, the accuracy of a given one or more recommendations relative to another one or more recommendations, and other variations, as will be understood by a skilled artisan.

As time passes, and more insights are gained about the product or service in question, these prices would change. That means that a bet that cost $0.33 when made may suddenly become worth $0.5, which is indicative of the person making the $0.33 bet was right in the eyes of the developing trends. A person who has made a bet in the past will then be able to resell the bet to somebody else, like a futures contract is resold. Not just existing bets are used for the recommendation mechanism, but also bets that have been resold in this manner. Based on the duration of time the user held the bet, a different weight may be assigned to a resold bet, where a bet that was held for a long time would be given a greater weight than a bet held for a shorter period of time, but at the same time, a lesser weight than a bet that is currently held. A bet that becomes worth less over time, e.g., goes from $0.5 to $0.21 is indicative of a view that became debunked. A person with this view, if he still has the view, may want to buy more bets at that lower price, or hold on to the existing bet, but may want to sell the bet if he or she thinks that the value is going to fall still more, corresponding to a situation in which the user thinks that the product or service will become less and less appreciated onwards. A decentralized marketplace for recommendation bets that includes optional user privacy is disclosed in U.S. Provisional Patent Application No. 63/046,556 titled "Privacy Preserving Matchmaking", which is incorporated in its entirety by reference.

As can readily be appreciated based upon the above discussion, bids and/or bets provide important signals regarding the potential values and/or scarcity of resources. Recommendation platforms in accordance with many embodiments of the invention can use bids and/or bets alone or in combination with any of a variety of information sources including (but not limited to) those described herein to generate recommendations as appropriate to requirements of specific applications in accordance with various embodiments of the invention. Specific techniques for generating recommendations using smart contracts encoded on one or more immutable ledgers in accordance with various embodiments of the invention are discussed further below.

Recommendation Platforms Implemented Using Smart Contracts

In the context of blockchain-based NFT platforms, smart contracts can be utilized to implement a betting mechanism similar to any of the mechanisms described above. At a first time, there may be neither positive nor negative expressions of opinion for a product. These can be created, pairwise, by a party that is enabled to issue such documents. These can then be sold at market prices by this party. This may operate similarly to an Initial Coin Offering (ICO) in which a collection of smart contracts are minted by an originator, and then sold to others, the price of each being determined by a marketplace, e.g., initially sold using an auction. The smart contracts can be written to an immutable ledger and the smart contracts can be transferred between user accounts.

In several embodiments, the right to generate smart contracts can be conferred on a miner that solves a problem, such as a proof of work or proof of space related problem. Thus, some number of pairs of such smart contracts can be generated like a coin, and be given value by being sold at market prices, by the miner. In certain embodiments, the miner can sell one but not the other member of a pair, or can sell both. In several embodiments, these prices are public, with the purchases recorded on ledgers. As can readily be appreciated, knowledge of the prices, and trends in prices, can enable a recommendation platform to generate recommendations informed by prices and their trends.

In many embodiments, the coins are smart contracts that are associated with a user by the user purchasing one or more smart contracts of this type. As a user at a second time selects what contracts to buy and at what price, this is an implicit recommendation as a user who thinks a product is undervalued will buy positive expressions of opinion for the product, but not negative. At a third time, the user decides to sell one or more of these documents. These correspond to the bets described above, and can be implemented as smart contracts, which in turn may have a similar structure as coins.

Figure 25:
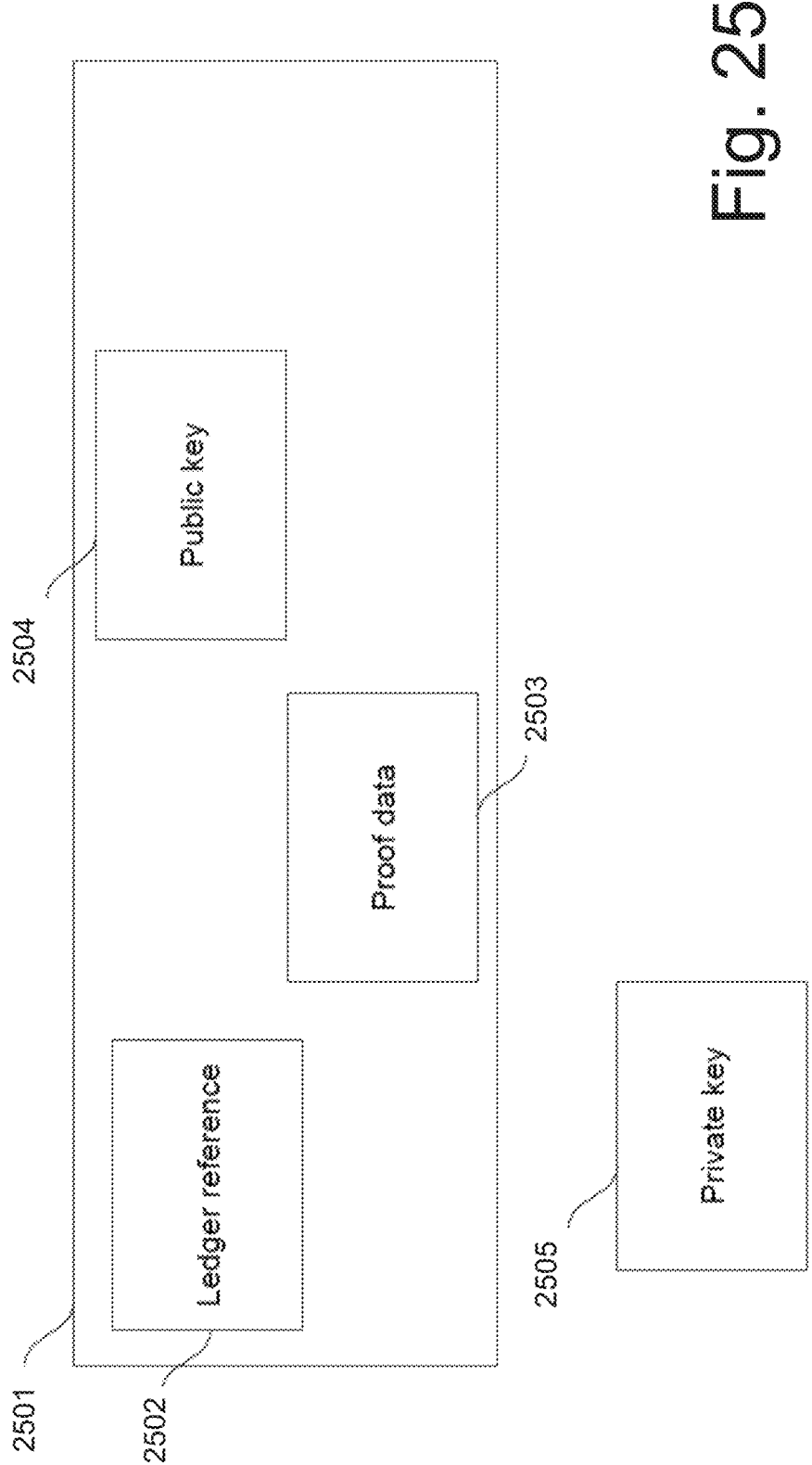
FIG. 25 conceptually illustrates a prior art cryptographic coin.

FIG. 25 describes a prior-art coin 2501 including a ledger reference 2502, such as an indicator of what ledger element is being closed, or a challenge associated with that element. It also includes proof data 2503, which may correspond to a proof of work or a proof of space, where such proof is relative to a challenge associated with the ledger being referenced by ledger reference 2502. Proof data 2503 is a function of ledger reference 2502 and public key 2504, and therefore ties these two elements together. Public key 2504 is used to verify digital signatures made using a corresponding private key 2505 (also sometimes referred to as secret key). Such a digital signature (not shown herein) may transfer a portion of the value associated with coin 2501 to a party other than the holder of private key 2505, e.g., by signing a second public key associated with a second private key, where the second private key is known to the recipient of funds, but preferably not to others.

Figure 26:
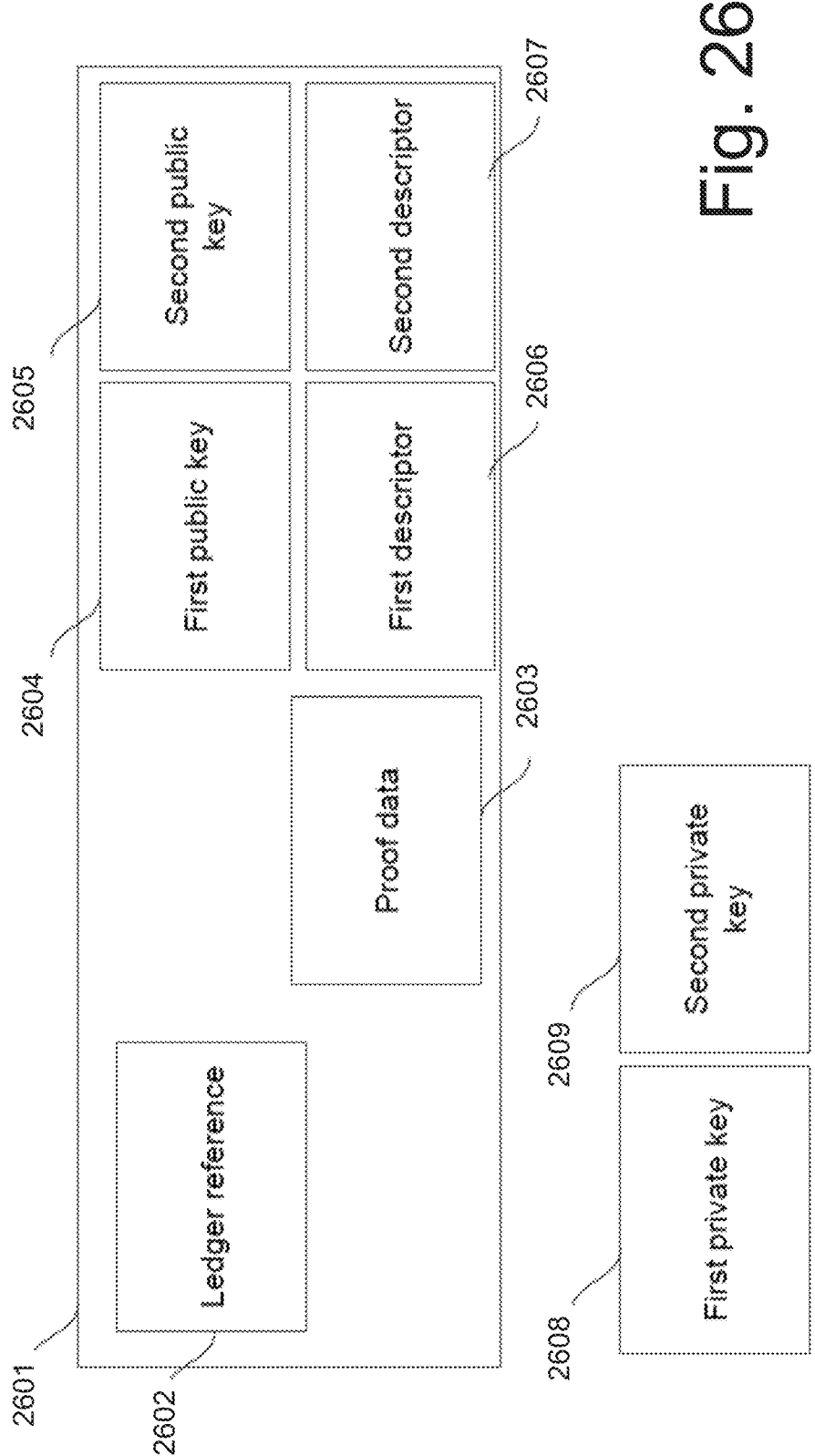
FIG. 26 conceptually illustrates a cryptographic token that can be used to mint smart contracts enabling the buying and selling of recommendation opinions in accordance with an embodiment of the invention.

A coin that can be used to mint smart contracts used to buy and sell recommendation opinions in accordance with an embodiment of the invention is conceptually illustrated in FIG. 26. The coin 2601 can be used to mint documents used to buy and sell recommendation opinions. Coin 2601 includes a ledger reference 2602 similar to ledger reference 2502. Coin 2601 also includes a first public key 2604, second public key 2605, first descriptor 2606 and second descriptor 2607. Proof data 2603 is a function of ledger reference 2602 as well as first public key 2604, second public key 2605, first descriptor 2606 and second descriptor 2607, and therefore tie these elements to each other and to the coin 2601.

In many embodiments, the first public key 2604 is associated with the first private key 2608. In addition, the second public key 2605 is associated with the second private key 2609, similar to how public key 2504 is associated with private key 2505. In a number of embodiments, first descriptor 2606 describes a set of terms such as (but not limited to) a given number of units of the opinion "Product X will be better than average among products in product basket Y in time Z", and opposing second descriptor 2607 describes a set of opposing terms such as (but not limited to) a given number of units of the opinion "Product X will be worse than average among products in product basket Y in time Z". As can readily be appreciated, the selection of X, Y and Z can be arbitrary, may be a function of the challenge associated with ledger reference 2602, and/or be generated on a rotating schedule based on a sequence number of the coin 2601.

In certain embodiments, first descriptor 2606 and second descriptor 2607 (and associated public and private keys) make up a pair. The coin 2601 is shown with one such pair, but may include multiple such pairs. The first public key 2604 can be used to verify digital signatures made using the corresponding first private key 2608, and second public key 2605 can be used to verify digital signatures made using the corresponding second private key 2609. Such a digital signature (not shown herein) may transfer a portion of the unit described by the first descriptor 2606 (when the first private key 2608 is used) or a portion of the unit described by the second descriptor 2607 (when the second private key 2609 is used). To purchase a bet associated with the terms of the first descriptor 2606, for example, a user would pay an amount based on the market rate associated with the first descriptor 2606, and in return get a digital signature using the first private key 2608 on a message that includes a public key associated with the buyer/user, and for which the buyer/user knows the corresponding private key. As the opinion of products change over time, the market value of these bets, corresponding to first descriptor 2606 and second descriptor 2607, will change.

In several embodiments, the coin includes, in addition to the components shown in FIG. 26, a public key similar to public key 2504 that can be used to verify the transfer of portions of the coin value, including all of it. By contrast, the first public key 2604 and second public key 2605 of the coin are used to verify the transfer of rights associated with first descriptor 2606 and/or second descriptor 2607, as described above. This combines the functionality of a prior-art coin, such as described above with reference to FIG. 25, with the bet-management component as described above with reference to FIG. 26.

Figure 27:
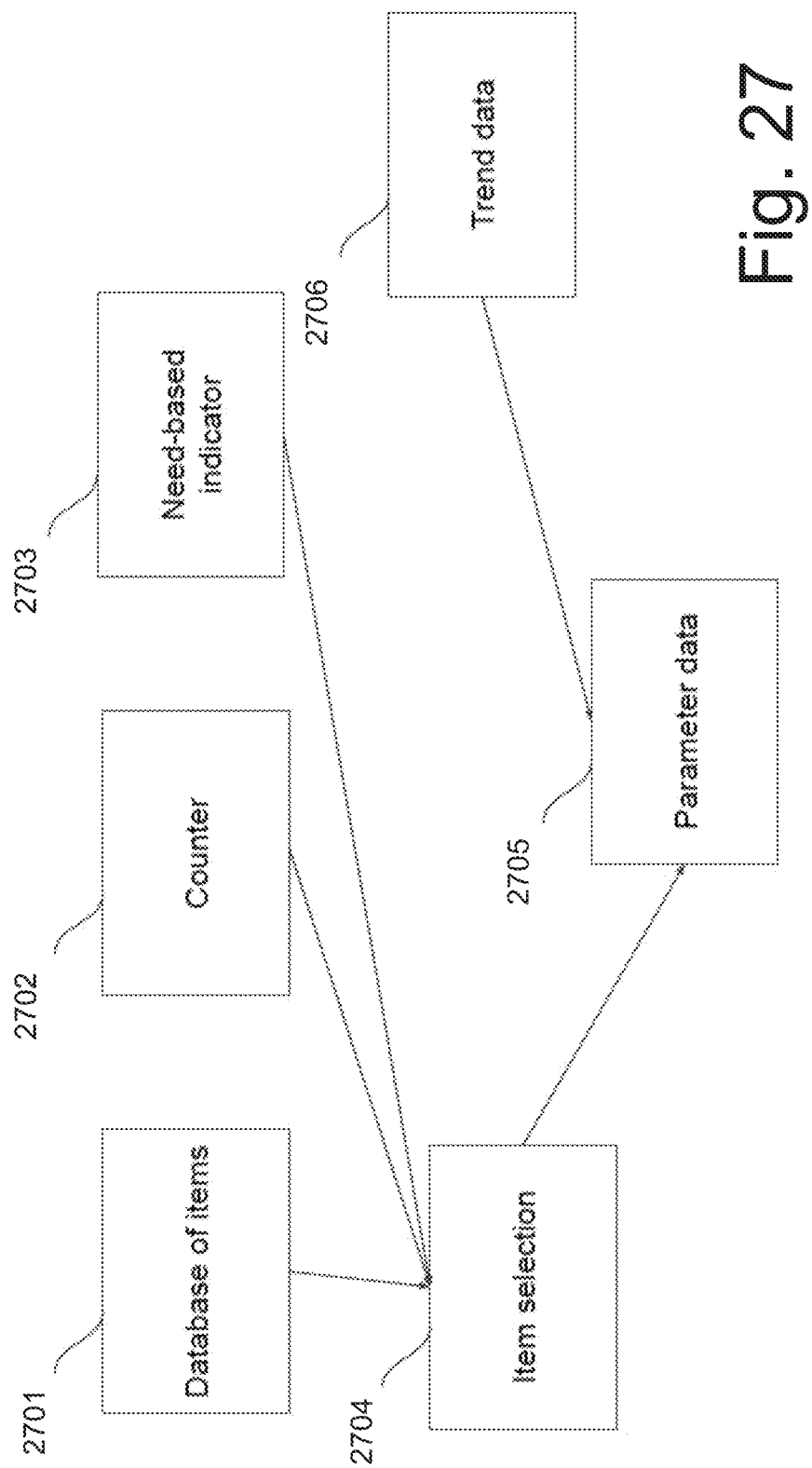
FIG. 27 conceptually illustrates a process for selecting items in accordance with an embodiment of the invention using a smart contract similar to those described above with reference to FIG. 26.

A process for selecting items in accordance with an embodiment of the invention using a smart contract similar to those described above with reference to FIG. 26 in accordance with an embodiment of the invention is conceptually illustrated in FIG. 27. Database of items 2701 includes at least two service descriptions. An example service description is "Acme Apple juice tastes better than Aardvark Apple juice" and its mate "Aardvark Apple juice tastes better than Acme Apple juice". Another example service description is "Acme Apple juice will be better than average among products in product basket of juice products with apple taste in three months starting at the date of creation of the coin containing this statement" and its mate "Acme Apple juice will not be better than average among products in product basket of juice products with apple taste in three months starting at the date of creation of the coin containing this statement".

Each service description in the database of items 2701 can have a position value, indicating its index, for example. This position value can be explicitly stored in the database of items, but does not have to be in some embodiments. Counter 2702 is a value that indicates a position in the database of items 2701, corresponding to the next term or set of terms to be used when a coin with a bet-like structure is next generated. The counter may be updated in a round-robin manner, i.e., increase by two, modulo the length of the database of items 2701, every time a new counter 2702 is needed. An even number of terms, where the number of these is a configuration parameter, are selected for inclusion in a coin, the starting point indicated by the counter. For example, when the counter is 0, which is the beginning of the database, the three first pairs may be selected to be included, where the first paid may be "Acme Apple juice tastes better than Aardvark Apple juice" and its mate "Aardvark Apple juice tastes better than Acme Apple juice". In a number of embodiments, these correspond to the first descriptor and the second descriptor of a coin similar to the coins described above with reference to FIG. 26. Alternatively, instead of counter 2702, a need-based indicator 2703 may be used to determine what pair or pairs to select, e.g., based on what pairs have seen the greatest change in market value since a time period corresponding to the minting of the last one hundred coins associated with the ledger to which the coin to be minted is associated, where a counter 2702 is used whenever there is a tie to be broken, for example. This results in an item selection 2704, including at least one pair of terms to be used for descriptors such as first descriptor and second descriptor of a coin similar to the coins described above with reference to FIG. 26.

Some items in the database of items may have configurable components, such as a term "Product Acme Apple juice will be X % better than average among products in product basket apple juice in time Z" where X and Z are parameter data 2705 selected based on trend data 2706. For example, if trend data 2706 indicates an increase of interest for a product of X'=12% over a 24 h period, X may be selected as X=2*X'=24%. Similarly, the time Z may be modified based on the need for short-term vs. long-term assessments, e.g., based on volatility in the marketplace. Other types of parameters can be selected including (but not limited to) parameters based on trend data 2706 and other inputs (not shown), as will be appreciated by a skilled artisan. Since the selection method is deterministic, all parties, including miners and verifiers, can determine what the next terms are to be selected for the next coin to be minted. To make this stable over time, any inputs to the algorithm can be related to a recent but not current point in time, such as an average of relevant values observed in the previous (e.g., 1 h) time period. This also reduces the extent to which the selection process may be volatile, and reduces problems related to different market perspectives due to limited real-time knowledge among miners and verifiers.

Figure 29:
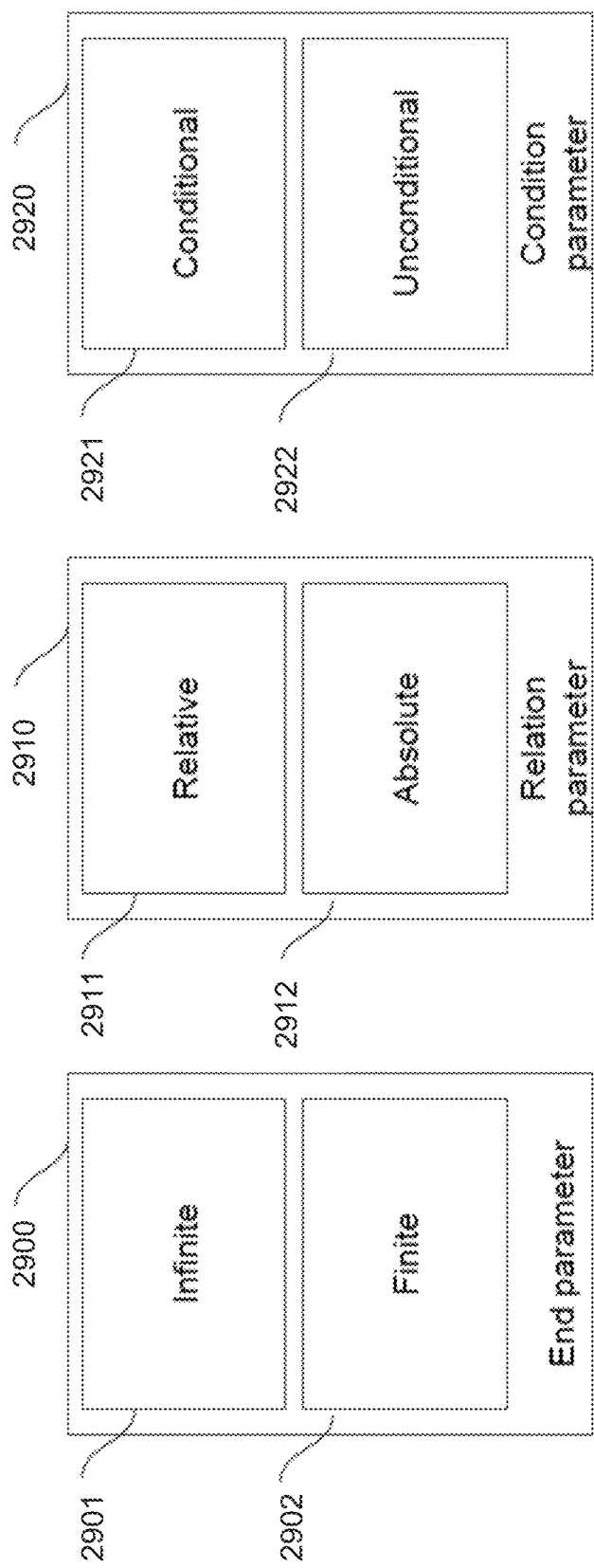
FIG. 29 illustrates parameters of a betting-related contract structure.

With specific regard to betting-related contract structures, FIG. 29 illustrates parameters of a betting-related contract structure. Aspect 2900 of an implementation is whether a bet has an end. For example, "Product A will increase its market share by Dec. 31, 2025" is a term with an end, i.e., a finite 2902 term, whereas "Product A will maintain a market share of more than 25%" does not have an end, i.e., has an infinite term 2901. In many embodiments, bets without an end will remain relevant as time passes.

A first bet that is made ahead of a second bet can be given higher value than the second bet, given equal terms, in order to increase the benefits of early bets that become trend setting. This will make it valuable to hang on to early bets, especially if their value depends not only on a product but also its associated product category. Aspect 2910 describes whether the bet relates to products to each other or not, and is a relation parameter. The term "Product A is better than product B" is a relative term, whereas "Product A is the best social network for teens" is directly not relative to another named product, and is therefore absolute. Aspect 2920 describes whether the term has a condition. For example, the term "Product A is better than product B" has no condition, whereas the following, and more complex, term does: "Product A is better than product B. If product B ceases to exist, then product A will remain (because it is a better product)."

As was described in FIG. 26, each term, such as first descriptor 2606 has an opposite term such as descriptor 2607. For example, if first descriptor 2606 is "Product A is better than product B" then second descriptor 2607 is "Product A is not better than product B". A coin used to create one or more bets, such as the various coins described above with respect to FIG. 26 and below with respect to FIG. 30, can have one or more pairs of descriptors, where each such pair is described by aspect 2900, 2910 and 2920. As can readily be appreciated, the specific implementation of a smart contract that is utilized to generate betting-related recommendations, and/or the number of propositions and/or the number of different sets of propositions is largely dependent upon the requirements of a particular application.

In one embodiment, bets marked with an indefinite termination point have the ability to halt or move to a next phase of a smart contract upon a trigger event, such as (but not limited to) when a coin becomes spendable. The trigger event is likely to be provided by an oracle, such as (but not limited to) one that would determine whether the market share example above has fallen below 25%. Oracles, long considered mostly-trustworthy, but prone to occasional error, can be pre-selected at the creation of the smart contract and policed with a bounty hunter incentivized to detect a fraudulent or mistaken oracle analogously to how bounty hunters are awarded for their efforts, as disclosed in the co-pending application titled "Perpetual NFT Assets", which is incorporated in its entirety by reference. The bet's associated smart contract can be constructed with a policy that enables the coin to become spendable in spite of the indefinite term. Using these or related techniques, the contract could be coded for this example to represent: User betting that the market share of Product A will drop to below 25% as determined by oracle A shall be able to spend 100% of the associated coin if oracle A has documented in an immutable ledger the measured outcome. In the market share example, the oracle Acme Corporation is an independent market-leading market-research company well known for providing quarterly market share reports that the parties agree are the gold standard for this contract. Multiple oracles, which are example service providers, can compete to evaluate a situation or service and provide indications of events where these indications can be used by smart contracts to trigger actions. The same smart contract may provide an incentive to both the oracle and a bounty hunter that polices the accuracy of the oracle's integrity. For example, the smart contract may include a fraction of the coin to be issued to the oracle for quarterly, annual, or trigger event, such as a drop below 25% market share by Product A, for services rendered. In one embodiment, the smart contract may include a policy to ensure sufficient delay in spending availability such that bounty hunters have an opportunity to review the integrity of the outcome and documentation. The smart contract policy may be to shift ownership of the fractional coin to be issued to the oracle would shift in part, or in total, to the bounty hunters. In the event that a bounty hunter is able to prove a false outcome. As can readily be appreciated, oracles and bounty hunters can serve a variety of roles in a blockchain-based NFT platform that includes a recommendation platform implemented using smart contracts in accordance with various embodiments of the invention. Accordingly, the specific triggers incorporated within smart contracts utilized by the recommendation platform and/or the information derived from oracles and/or bounty hunters used in the triggering of the smart contracts is only limited by the requirements of specific applications.

The bet-based recommendation mechanism is related to the notion used in futures contracts, but is not the same. For example, futures contracts always have a delivery date, i.e., is finite (see end parameter 2902 of FIG. 29). However, recommendations typically do not have a delivery notion associated with them. A bet-based contract such as what is disclosed herein, if finite, can assume a value that is determined by the market price of the associated type of contract at the time of the expiration date, at which time the associated structure becomes a coin of the currency with a number of units associated with the market price. For example, if the term of the bet is "Product A will be the market leader on Jun. 15, 2028", then Jun. 15, 2028 is the expiration date. If an associated set of terms, which may be specified in the contract of the term of the bet, is the collection of all bets that are positive of product A (or otherwise indicated by one or more binary indicators in the associated contract), and the average market price of these at the expiration date is $38.25, then the coin associated with the bet "Product A will be the market leader on Jun. 15, 2028" will be assigned a value that correspond to the number of units of an associated currency that has the value $38.25. Thus, at this point, in spite of the expiration having passed, the coin still has a value. This value, though, will not fluctuate based on product A, but only based on being spent by its owner. The non-fluctuating portion of the value can be spent as other coins without associated bet-enablement. The bet-component can be sold. After the bet-component has converted, when applicable (such as at the expiration of the terms) then this component becomes a non-fluctuating portion, and can be spent as a regular coin is spent.

Similar to above, if a condition parameter specifies that there is a condition, then there may be a similar assignment of value based on such condition. For example, if a bet of a coin specifies that "Product A is better than product B. If product B ceases to exist then the value of this bet becomes the value of a basket of indicated bet types." then a similar conversion may take place. When a bet is converted in this way, that does not imply that it is not considered anymore when determining a recommendation from the bet. This determination is policy based, and may in some instances use both expired and non-expired bets.

Figure 30:
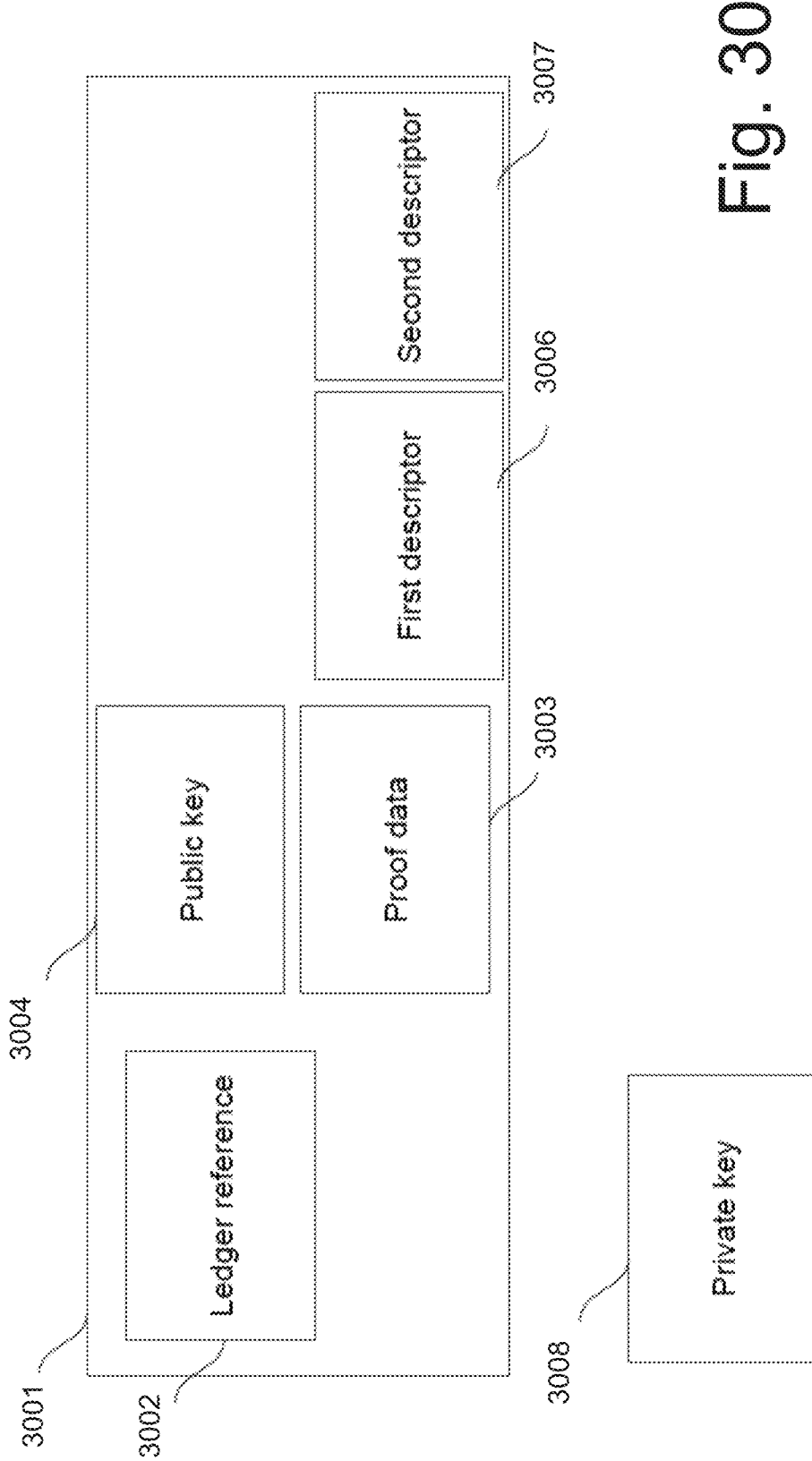
FIG. 30 illustrates a cryptographic token that can be utilized to mint smart contracts used to buy and sell recommendations in accordance with another embodiment of the invention.

A coin that can be utilized to mint smart contracts used to buy and sell recommendations in accordance with an embodiment of the invention is conceptually illustrated in FIG. 30. The coin 3001 can be used to mint documents used to buy and sell recommendation opinions, which is a variant of the coin 2601 of FIG. 26. However, instead of one public key for each descriptor (such as a first public key 2604 associated with first descriptor 2606 and second public key 2605 associated with second descriptor 2607), coin 3001 uses public key 3004 for verification of any smart contract associated with descriptors, including first descriptor 3006 and second descriptor 3007. In many embodiments, the proof data 3003 can be a function of ledger reference 3002 and the public key 3004. In several embodiments, the first descriptor 3006 and second descriptor 3007 can be tied to the public key 3004. In a number of embodiments, this can be achieved by having the private key 3008 associated with the public key 3004 sign the first descriptor 3006 and the second descriptor 3007. In certain embodiments, the descriptors can be tied to the public key 3004 by having the proof data 3003 be a function of the first descriptor 3006 and the second descriptor 3007.

As with coin 2601 discussed above with reference to FIG. 26, coin 3001 may have additional descriptors (not shown). In addition, the public key 3004 may also be used to represent values not related to the first descriptor 3006 and the second descriptor 3007, and used to verify transfers of value in a similar manner to public key 2504 (with corresponding private key 2505 used to generate digital signatures that encode said transfers of value). Thus, coin 3001 may have two functions: carrying a monetary value associated with the successful mining of the coin 3001, as is traditional, and carrying a value associated with the origination of bets, encoded by first descriptor 3006 and second descriptor 3007. Coin 3001 can also includes additional descriptors, according to a format specified for the coin 3001, one aspect of which is described above with reference to FIG. 27.

Figure 31:
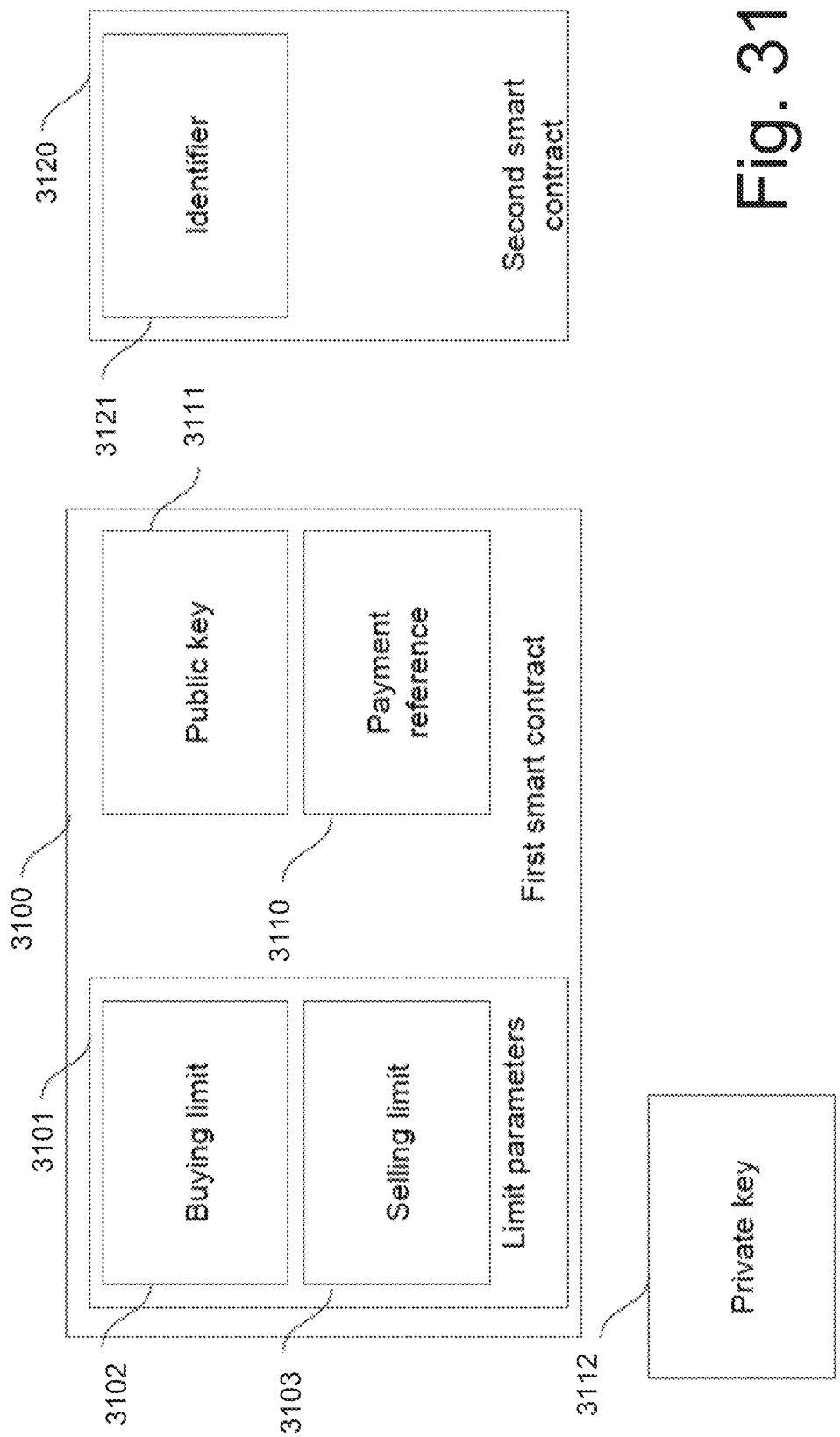
FIG. 31 conceptually illustrates two smart contracts that can be utilized for automated trading.

Two smart contracts that can be utilized for automated trading are conceptually illustrated in FIG. 31. A first smart contract 3100 includes limit parameters 3101 including buying limit 3102 and selling limit 3103, public key 3111 associated with private key 3112.

While specific constraints are described above with respect to smart contracts that implement bet-based recommendations within a recommendation platform, smart contracts that are relied upon in the implementation of recommendation platforms in accordance with various embodiments of the invention are by no means limited to use with respect to bet-based recommendations and can be utilized in a variety of applications including bet-based recommendations, where the smart contracts are configured to gather information and/or trigger in response to events in a way that enables the recommendation platform to specific recommendations that and/or more precise recommendations. While much of the discussion above references recommendations made to users with respect to the purchase, interaction, and/or acquisition of a resource, recommendations can also relate to the acceptance of offers to sell, dispose, allow interaction with a resource, and/or provide services. Processes for generating offeror recommendations in accordance with various embodiments of the invention are discussed further below.

Offeror Recommendations

In several embodiments, the recommendation processes described herein have usefulness to an offeror (e.g., an artist such as (but not limited to) a tattoo artist). Identifying trends and appropriate price predictions leads buyers to good deals; however, the same technique can be applied by the offeror to identify prices, discounts, advertising/promotion, and/or special deals to maximize total profit or popularity, regardless of whether the item is trending up, down, or stable. For example, a tattoo artist in Atlanta has developed artwork coinciding with a 20th anniversary celebration that he would like to offer as a digital image represented by a non-fungible token. The artist offers 100 limited time images and the NFT format data specifies the size of the jpg encoded image, the color palette, whether the image may be reproduced by a tattoo artist, and what applications are allowed to render it, if such a limitation exists. In circumstances in which sales of the 100 limited time images begin to stall after 25 sales. A recommendation platform in accordance with an embodiment of the invention, having identified a slowing trend may trigger a small price decrease, or alternatively, a payment to a popular influencer to revive sales. An account associated with the influencer may optionally be included in a smart contract enabling the release of influencer documentation once the algorithms have identified the appropriate sales trend. In another example, Company A competes with Company B in the automobile air freshener market. Company B has an unfortunate chemistry problem causing their air fresheners to go stale within 3 days of use. Consumers, finding fault with Company B rapidly shift to Company A's product hoping for better quality. A recommendation platform in accordance with another embodiment of the invention, noticing unexpected opposite shifts in desirability score between Company A and Company B, can alert Company A to both increase production and product pricing to maximize profit. As can readily be appreciated, the processes described above enable the generation of recommendations with respect to any of a variety of aspects of any number of different resources. Accordingly, a person of ordinary skill will readily appreciate that the specific recommendations provided to offerors by recommendation platforms implemented in accordance with various embodiments of the invention are only limited by the requirements of specific applications.

Figure 28:
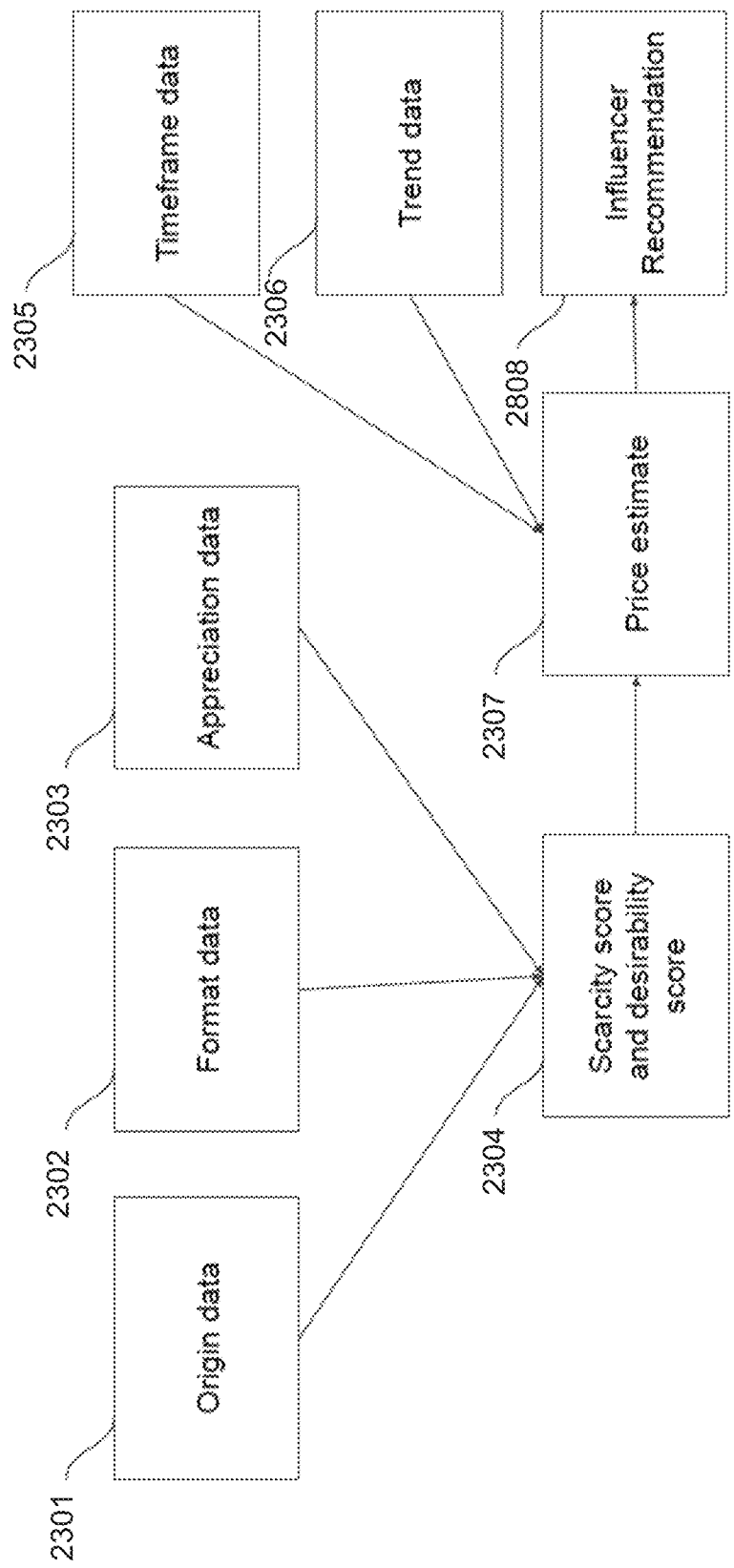
FIG. 28 conceptually illustrates a process for generating recommendations for an offeror in accordance with an embodiment of the invention.

A process for generating recommendations for an offeror in accordance with an embodiment of the invention is conceptually illustrated in FIG. 28. As in FIG. 23, the system obtains origin data 2301, format data 2302 and appreciation data 2303, and generates a scarcity score and a desirability score 2304. The scarcity score and desirability score 2304 can be generated from the inputs 2301, 2302 and 2303, and may use a rule-based algorithm, an ML based algorithm, or a combination thereof. The desirability score between two competing products is likely to shift with time as identified by the trend data 2306. For example, two neighboring fuel stations may sell the exact same commodity product, but word is starting to spread about fuel station A having a credit card skimmer problem at the pump. As the popularity of one product, fuel station B, increases, while fuel station A decreases. The price estimate 2307 can change triggering a recommendation to one or more of the offerors to adjust price, or in this case, to issue an influencer recommendation 2808 to combat the skimmer news.

In the illustrated embodiment, the computation of the price estimate uses at least one of the scarcity score and the desirability score 2304, timeframe data 2305, trend data 2306, and may also use as input an asking price (not shown). As can readily be appreciated, the specific data that is utilized to generate a price estimate is largely dependent upon the requirements of the specific application. The timeframe data may indicate for what time period a price estimate is to be computed, e.g., "right now," "in three months", "for the next 24 months", and so on. The trend data 2306 may indicate price trends, appreciation data trends, scarcity trends, etc., for other items in general; for other items of the same genre; for other items by the same origin, and for other items with related format data. The price estimate may be computed using a combination of statistical methods, ML methods, and methods such as those described above.

While specific processes are described above for generating recommendations for offerors with reference to FIG. 28, any of a variety of processes for generating recommendations for offerors separately from and/or in combination with generating offers for users interested in receiving/accepting offers can be utilized within recommendation platforms implemented in accordance with various embodiments of the invention as appropriate to the requirements of specific applications. Furthermore, such recommendation platforms can be utilized in any of a variety of blockchain-based NFT platforms including (but not limited to) the blockchain-based NFT platforms and rich media platforms described above with reference to FIGS. 1-17. A number of other useful applications for smart contracts within recommendation platforms are discussed further below.

Grouping Items

Recommendation platforms in accordance with many embodiments of the invention determine the similarity or dissimilarity of resources and/or items as part of the process of generating recommendations. In a number of embodiments, information concerning the similarity of resources and/or items can be utilized to ascertain likelihoods that user actions with respect to a particular resource and/or item is informative with respect to another resource and/or item. In several embodiments, recommendation platforms utilize resource and/or item characteristics to determine similarity and/or create collections. In a similar way, resource and/or item characteristics and/or the shared characteristics of collections of items can be utilized in the training of machine learning models that can be utilized in the determination of resource and/or item similarity and/or in the generation of recommendations as appropriate to the requirements of specific applications.

Figure 32:
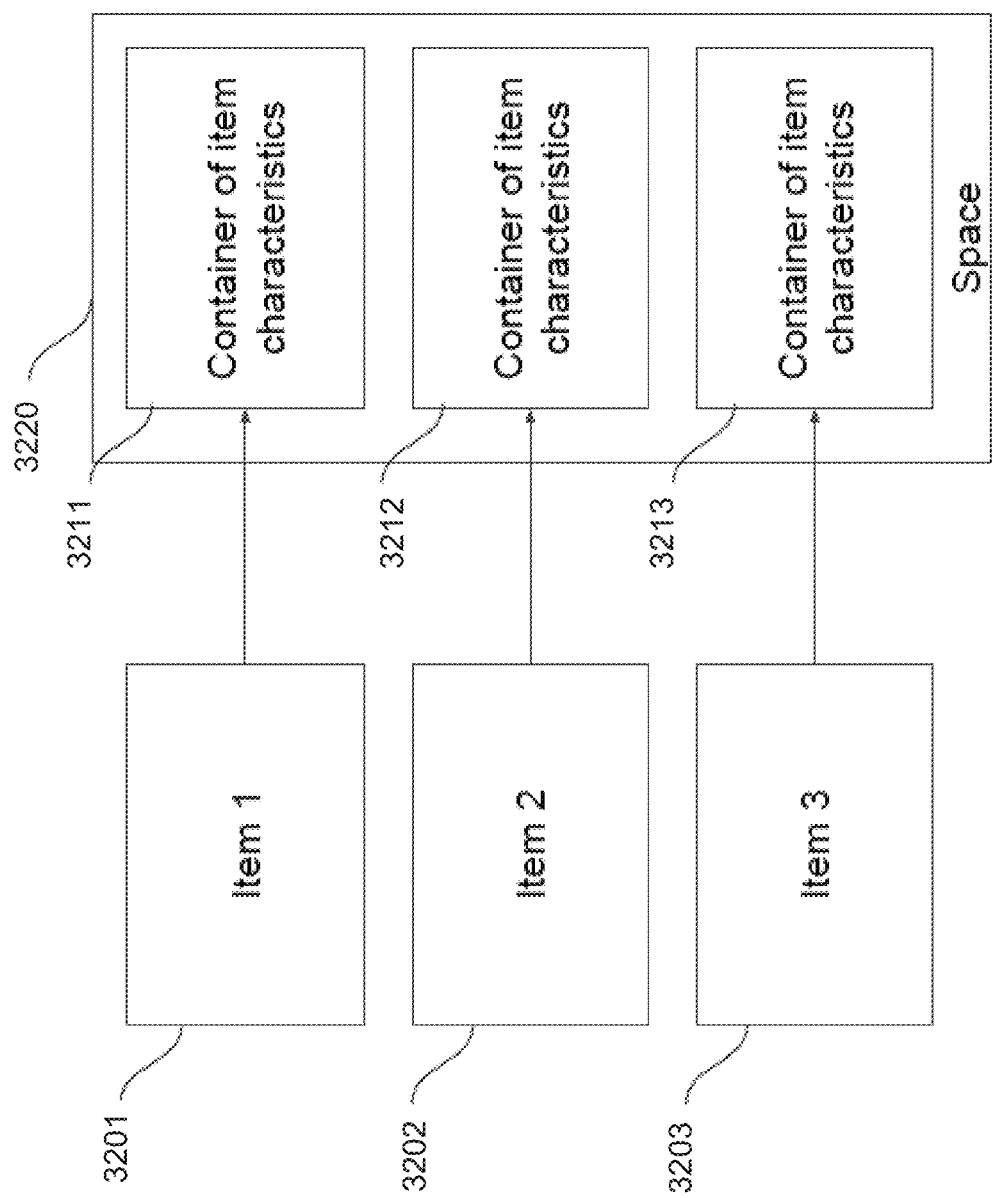
FIG. 32 conceptually illustrates a process for grouping items with the intent of forming a recommendation in accordance with an embodiment of the invention.

A process for grouping items with the intent of forming a recommendation in accordance with an embodiment of the invention is conceptually illustrated in FIG. 32. Items 3201, 3202, and 3203 are similar virtual or real items such as (but not limited to) songs, motorcycles, and artwork. In this example, items 3201, 3202, and 3203 represent tattoo artist artwork with customized renderings of the flag of the United States of America. Each item, from one or more artists includes important characteristics such as coloring, size, restrictions on reproductions, etc. These characteristics, which may be indexed with the item, can be placed in a container of item characteristics 3211, 3212, and 3213 corresponding to items 3201, 3202, and 3203. In a number of embodiments, these item characteristics are formatted as feature vectors in the manner described above. In certain embodiments, the feature vectors are formatted to be utilized as inputs to a machine learning/artificial intelligence model. A space 1520 can be created to contain the collection of item characteristics to be used by the machine learning/artificial intelligence algorithms including (but not limited to) those described above. The illustration depicts three items for simplicity of explanation, but it should be readily understood that a large number of items can be utilized in the training of machine learning models.

In many embodiments, the representation illustrated in FIG. 32 can also be utilized within a process for abuse detection whereby Item 1 3201, Item 2 3202, and Item 3 3203 are users that may be abusing the system and container of item characteristics 3211, container of item characteristics 3212, and container of item characteristics 3213 may represent the various behaviors and characteristics of potential abusers such as (but not limited to) the number of transactions per hour or minute, change in value of total assets of the user within the system, changes in value of the items the user is browsing, positive reviews, negative reviews, bet frequency and size, and user profile information, along with IP address switching, number of bank accounts, number of credit cards, number of windows open accessing a portal at the same time, number of devices from a single IP address, number of times changing password, number of times failed to login correctly, number of times change user profile information.

Figure 33:
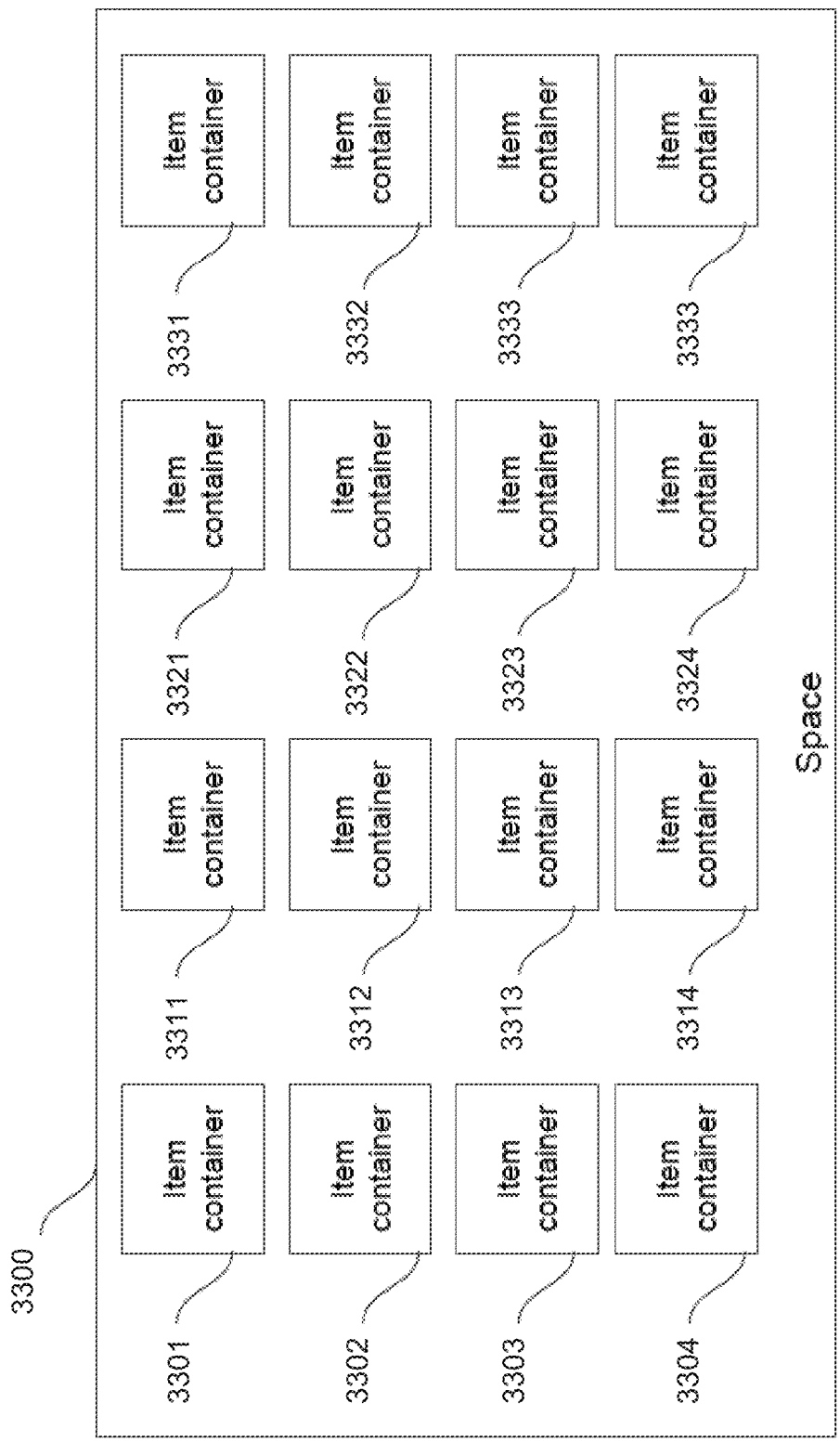
FIG. 33 conceptually illustrates a space with a collection of 16 items and their corresponding characteristics in accordance with an embodiment of the invention.

Referring now to FIG. 33, a space with a collection of 16 items and their corresponding characteristics in accordance with an embodiment of the invention is illustrated. The expansion of space 3220 of FIG. 32 to 16 items in space 3300 of FIG. 33 leads to a remapping of the item containers in FIG. 34. Space 3300 contains 16 item containers which, for example, may simply be an expansion of the US flag tattoo collection described above. The collection includes item containers with characteristics 3301, 3302, 3303, 3304, 3311, 3312, 3313, 3314, 3321, 3322, 3323, 3324, 3331, 3332, 3333, and 3334. The ordering of these items may be random or intentional. In several embodiments, the collection of item containers can be simplified using dimensionality reduction processes including (but not limited to) principal component analysis (PCA), whereby each item, in this case an NFT representing the flag tattoo, still maintains knowledge of the full N-dimensional feature vector.

Figure 34:
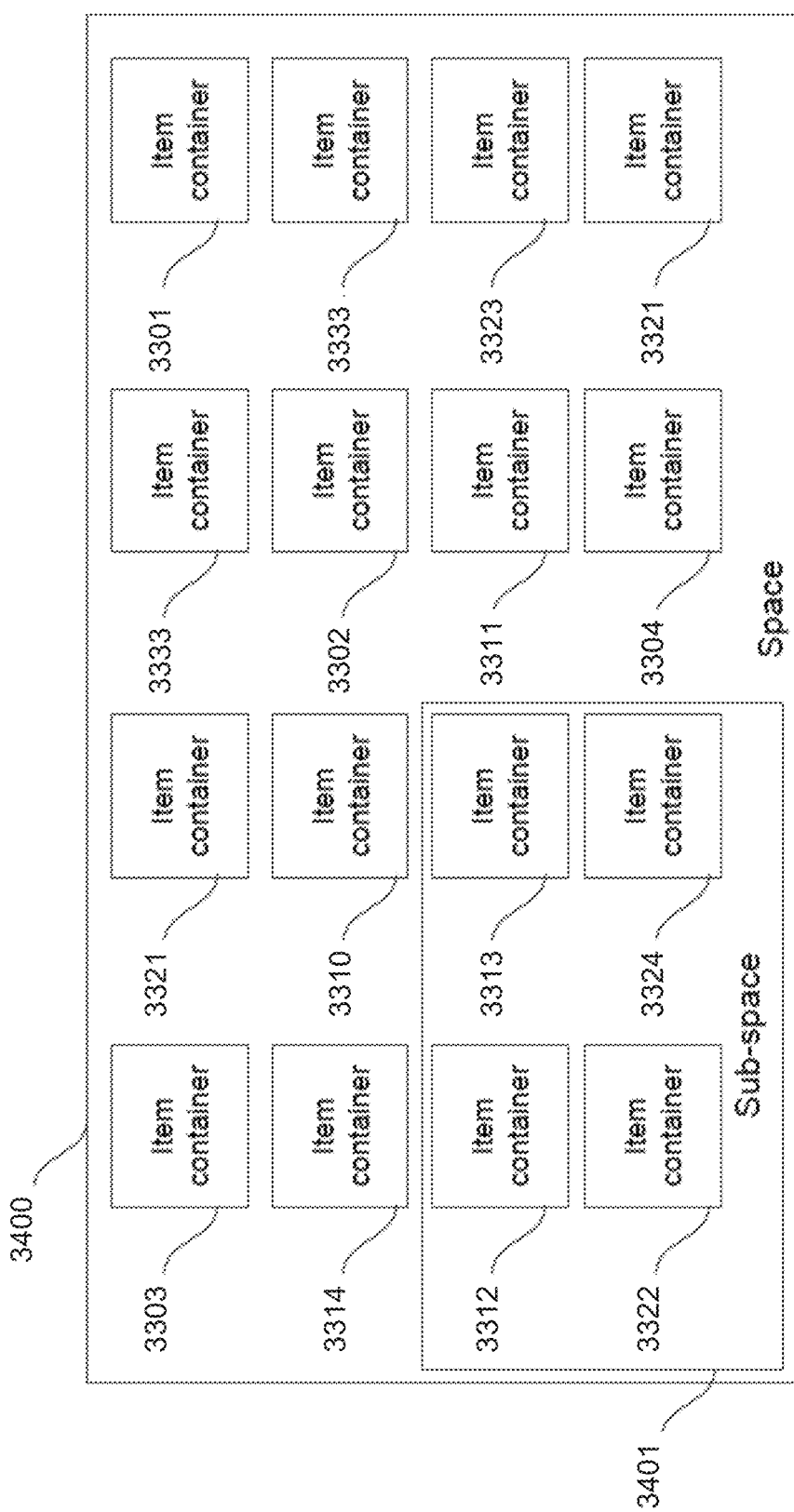
FIG. 34 conceptually illustrates the collection of items shown in FIG. 33 reorganized utilizing a self-organizing map in accordance with an embodiment of the invention.

With specific regard to FIG. 34, a space 3400 with a collection of the same item containers from FIG. 33 (i.e., 3301, 3302, 3303, 3304, 3311, 3312, 3313, 3314, 3321, 3322, 3323, 3324, 3331, 3332, 3333, and 3334) is illustrated. The collection is transformed using machine learning/artificial intelligence to self-organize the NFTs using each item's N-dimensional feature vector to result in, what may be, but not limited to, a lower dimensional (e.g., a 2 or 3 dimensional) self-organized map, of the collection of items. A skilled artisan will recognize that variations on these methods can also be used for self-organization including with an artificial neural network using backpropagation or Bayesian learner.

In the illustrated embodiment, sub-space 3401 identifies the items that correlate to the desirable or undesirable characteristic, whichever the case may be. In this example, item container 3312 is a reference item considered desirable based upon the characteristics being evaluated and item containers 3313, 3322, and 3324 are similar based upon use of algorithms to recommend a similar item including (but not limited to) Euclidean distance and K-nearest neighbor. Item container 3331 might be considered to be least similar. As can readily be appreciated, any of a variety of techniques for identifying similar item containers can be utilized as appropriate to the requirements of specific applications.

The same methods and tools described above may identify trends based upon changes to the feature vectors with time. In several embodiments, the system may organize virtual art work by genre and use a measure such as (but not limited to) Euclidean distance or K-nearest neighbor to recommend a similar item to a prospective buyer. In certain embodiments, a recommendation platform can continually learn by periodically (e.g., daily) running the algorithms within the space to monitor for changes in characteristics toward an effort to produce refined output recommendations. The recommendations made by users, reviewers, influencers and/or other parties may be weighted or filtered for authenticity or genuineness as described with respect to FIG. 35 below.

Another example of grouping items based upon item containers and/or feature vectors is the characterization of music for the purposes of making a recommendation. In a music example, the sub-space 3401 might reflect the hip-hop genre, while other sub-spaces, not shown, within space 3400 may reflect blues, heavy metal, and jazz.

While various approaches for grouping items into collections of similar items/separating items into groups of dissimilar items and utilizing groups to train machine learning models are described above with reference to FIGS. 32-34, any of a variety of processes can be utilized to group collections and items, describe items based upon their characteristics and/or train machine learning models can be utilized as appropriate to the requirements of specific applications in accordance with various embodiments of the invention. The use of machine learning models (and other processes) to determine opinion relevancy and/or detect abuse within recommendation platforms in accordance with various embodiments of the invention is discussed further below.

Determining Opinion Relevancy and Detecting Abuse

Recommendation platforms in accordance with a number of embodiments of the invention can employ processes for determining opinion relevancy and/or detecting abuse (e.g., paid reviewers providing inauthentic recommendations and/or reviews). In several embodiments, abuse detection can be performed using self-organized map infrastructure and/or using a human-tuned model based upon feature vectors. The feature vectors for detecting abuse can include (but are not limited to) items such as the number of transactions per hour or minute, change in value of total assets of the user within the system, changes in value of the items the user is browsing, positive reviews, negative reviews, bet frequency and size, and user profile information. An artificial neural network can create the N-dimensional space and processes such as (but not limited to) principal component analysis can be used to create a lower dimensional space (e.g., a 3 dimensional space). In this lower dimensional space, the recommendation platform can search for anomalies and/or trends. Once a first abuse is found, it is likely that other abuses reside within the K-nearest neighbor range. It should be readily appreciated that feature vectors can be analyzed in this way using a variety of machine learning and/or statistical modelling techniques and that the processes utilized by recommendation platforms in accordance with various embodiments of the invention are not limited to the use of artificial neural networks or principal component analysis.

In several embodiments, processes for abuse detection rely upon a user-specific self-organized map that is based solely on users themselves as nodes. The feature vectors can include (but are not limited to) items of behavior of the user (e.g., IP address switching), number of bank accounts, number of credit cards, number of windows open accessing a portal at the same time, number of devices from a single IP address, number of times changing password, number of times failed to login correctly, number of times change user profile information. In a number of embodiments, this specialized self-organized map uses artificial neural networks to automatically cluster the feature vectors, and allows the recommendation platform to find abuse, and in the same area where abuse is found, there is likely surrounding users that are abusing as well. This allows both individuals and a group or subset of users to be flagged for review and, or action. As can readily be appreciated, the specific manner in which feature vectors and/or self-organized maps are utilized to detect abuse is largely dependent upon the patents of abuse that are prevalent within a particular blockchain-based NFT system. Furthermore, processes that can be utilized to identify users that are taking actions that are likely to generate misleading recommendations can also be utilized to generate users that are taking actions that are likely to form the basis of highly relevant recommendations.

Figure 35:
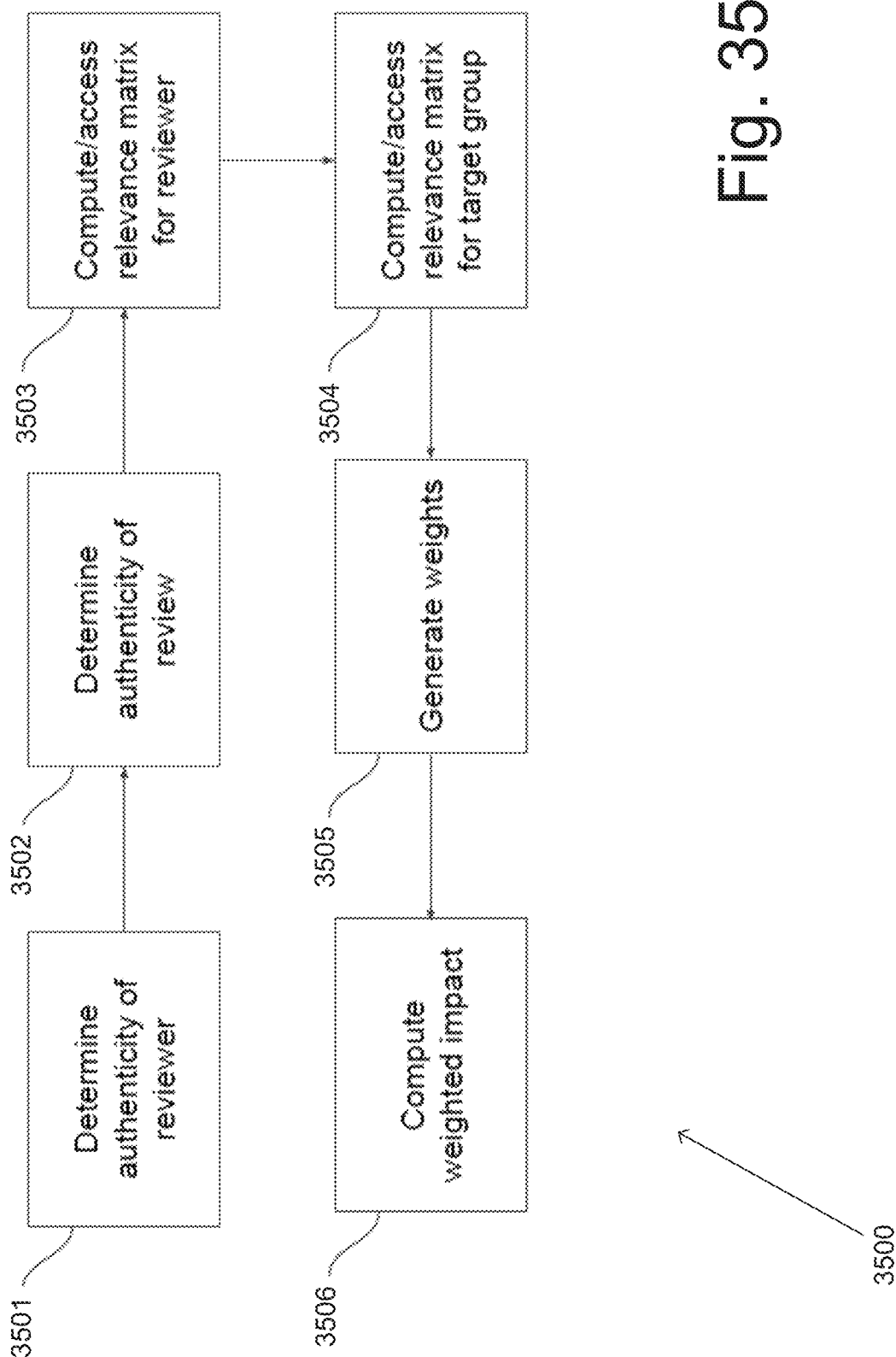
FIG. 35 illustrates a process for computing suggestions, rankings, recommendations, and similar in accordance with an embodiment of the invention.

A process for computing suggestions, rankings, recommendations, and similar in accordance with an embodiment of the invention is illustrated in FIG. 35. The process 3500 includes determining (3501) the authenticity of a reviewer. For example, if the account of the reviewer is newly created and has an unusually large volume of reviews, e.g., exceeding a threshold T that may be set to 100 for a time of t, that may be set to 96 hours, then the reviewer is determined to likely be inauthentic. In certain embodiments, each reviewer or other source of data can be given a score S, where S=100 may indicate that the party is very credible, S=0 indicates that the party is not at all credible, and S=75 indicates that the party is more credible than most. A variety of approaches to scoring these parties can be used.

The authenticity of an individual review associated with the reviewer can be determined (3502). For example, a review including both of text and one or more scores can be assessed based on the text. If the text includes many words that are indicative of a lack of hands-on knowledge, such as vague expressions of enjoyment or lack thereof, then the text may be given a low authenticity score. If the same text has been used for other reviews, especially by the same reviewer, or the text is substantially similar to those of other reviews, that also affects the authenticity score of the review negatively. As can readily be appreciated, specific processes that can be utilized for evaluating the relevancy of content associates with a user's review is largely dependent upon the requirements of specific applications.

In several embodiments, a relevance matrix can be computed (3503), or if it has already been computed and stored, retrieved from memory. The relevance matrix can indicate topics that the reviewer is knowledgeable about, as determined by factors including (but not limited to) having many reviews related to, by having reviews with high authenticity scores, and by having reviews that consuming users or automated agents rate as helpful or not helpful. This can also be implemented using standard reviews tied to user names and/or other identifiers, or by bid-based structures, as disclosed herein. Thus, feedback in a review is a review by itself, and the same techniques disclosed herein can be used to adjust the relevancy score of a review based such feedback. In addition, feedback of this type can be implemented by having bounty hunters identify reviews and other related expressions of opinions that are likely to be fake or not helpful, where the veracity and value of the feedback provided by a bounty hunter is determined by the trends that follow the report. Thus, if a bounty hunter files a report stating that a given positive recommendation is not helpful or is not representative of the likely future trends, and later the value of the associated opinion falls, e.g., by at least 10%, then the bounty hunter was correct and is provided a reward that may depend on how many other bounty hunters provided the same feedback, or the bounty hunter may choose to bet against the product or service in order to receive a financial reward for having detected a disingenuous recommendation. An automated agent can assess that a review is helpful when the review makes a prediction, e.g., that a service will be increasingly appreciated onwards, and the automated agent determines that this prediction was correct.

Thus, relevance may be monitored with time, particularly if a "was this review helpful" outcome necessitates a re-ranking. The relevance matrix may indicate that a given reviewer is knowledgeable of audio equipment (with a relevance score of 0.92 out of 1 for reviews related to audio equipment), rather knowledgeable of jazz music (with a relevance score of 0.6 for reviews of jazz musicians and jazz songs), but not very knowledgeable of restaurants (with a relevance score of 0.21 for reviews of restaurants, e.g., due to a common failure to correctly assess trends in restaurant preferences). In step 1804, a relevance matrix is computed for a target group of users, such as a user requesting a recommendation or a collection of users corresponding to the users attending a social gathering. This, like the relevance matrix, may also be retrieved, if already computed, and indicates what areas of knowledge the target group has. As can readily be appreciated, any of a variety of techniques can be utilized for generating a relevancy matrix based upon information including (but not limited to) user profiles, content associated with actions (e.g., reviews), and/or information derived from external sources (e.g., bounty hunters) as appropriate to the requirements of specific applications in accordance with various inventions.

A set of weights can be computed (3505) from relevance matrices. In many embodiments, the set of weights can indicate similarity between a source of a recommendation and a target group, where a high similarity results in a large weight and a low similarity results in a small weight. For example, the weight for one topic may be the relevance element of that topic associated with the recommendation source, times the relevance element of that topic of the target group. As can readily be appreciated, any of a variety of processes can be utilized for generating weights as appropriate to the requirements of specific applications in accordance with various embodiments of the invention.

In many embodiments, an impact can be computed (3506). In several embodiments, the impact is a function of a recommendation or other data associated with the source, and of the weight. If the reviewer rates a restaurant as having score s=9 out of 10, and the weight is a value w=0.8, then the impact may be (s−m)*w+m where m is the midrange of the score range, i.e., m=5 in this case. Thus, the computed impact in this example is (9−5)*0.8+5=8.2, corresponding to a high score. In the case of a negative review corresponding to score s=2 and a low weight w=0.1, the resulting impact is (2−5)*0.1+5=4.7. This second impact score is much closer to the average value m, and therefore is less important than the review with an impact score of 8.2, since this affects the deviation from average much more. An alternative of this approach is to let the weights affect the probability that the review will be included in a Monte Carlo simulation in which reviews are drawn at random and a score is computed from iterated simulations. As can readily be appreciated, any of a variety of processes can be utilized to determine impact based upon recommendation data and/or other sources of data as appropriate to the requirements of specific applications in accordance with various embodiments of the invention.

Figure 36:
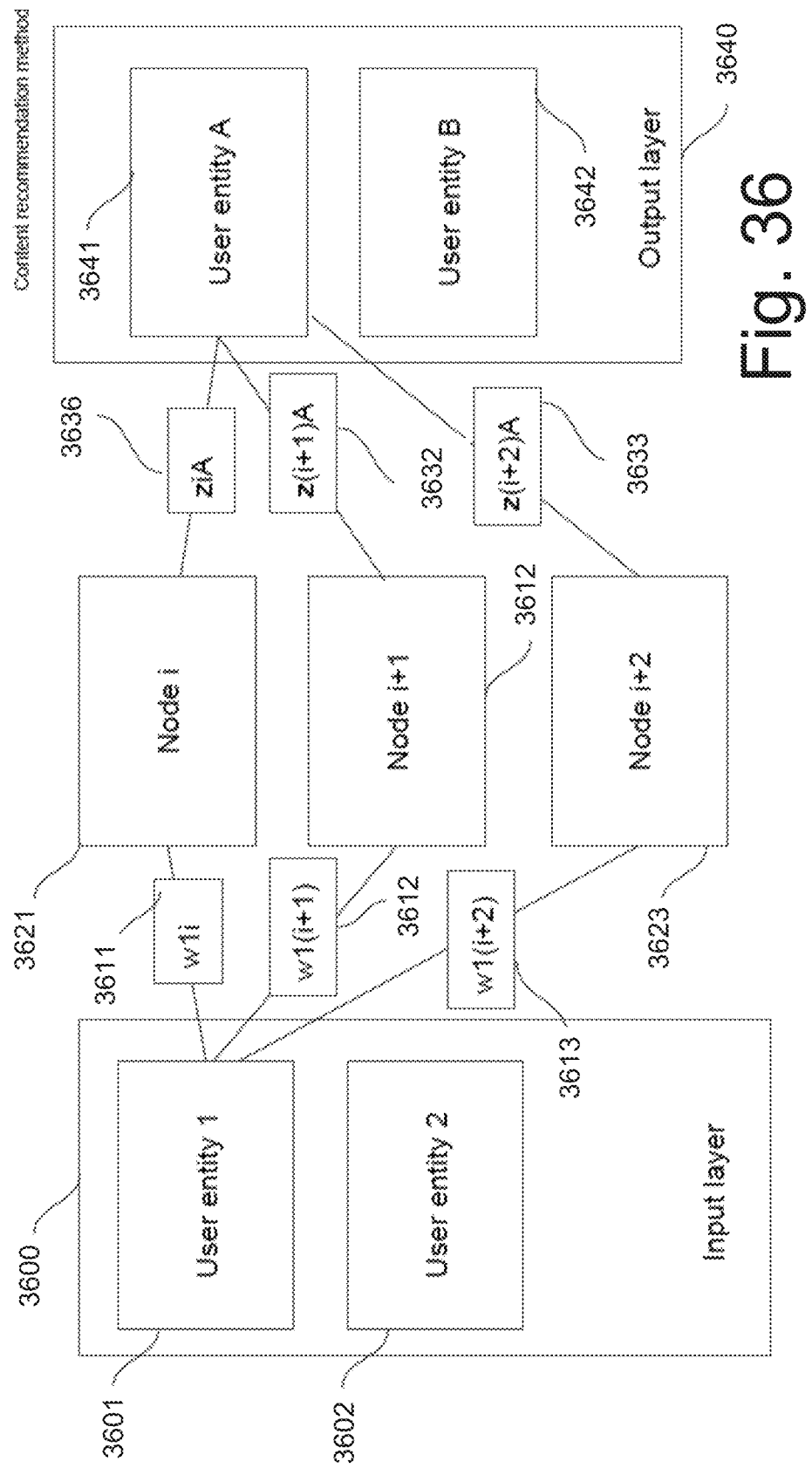
FIG. 36 conceptually illustrates a process for generating recommendations based upon opinions expressed by different user entities.

FIG. 36 illustrates the opinions expressed by user entity 1, 3601, e.g., using an endorsement or a purchase of a contract related to an opinion, and by user entity 2, 3602, both of which are part of the input layer 3600. These opinions affect the values of node i 3621, node i+1 36922 and node i+2 3623, where node i 3621 may correspond to a concrete notion such as "audio equipment" or an abstract notion that does not directly correspond to such a concept but which is meaningful in a machine learning context. Based on weights between user entities, such as user entity 1 3601 and user entity 2 3602, and the nodes, such as node i 3621, node i+1 3622 and node i+2 3623, the opinions of the user entities affect the values of the nodes. The extent to which this is done is expressed by weights such as weight $w1_i$ 3611 between user entity 1 3601 and node i 3621; weight $w1_{(i+1)}$ 3612 between user entity 1 3601 and node i+1 3622. Weight $w1_i$ 3611 may, for example, be generated (3505) in the manner outlined above or using a related process; or be generated from the relevance matrix (3503) of the reviewers, as described above.

Each user entity can be associated with each node using a weight, although in some instances, the weight may be set to zero, meaning that there is no influence. The nodes acquire values that are based on the values of the opinions of the user entities such as the opinions expressed by user entity 1, 3601, and of the weights, such as weight $w1_i$ 3611. This value for the nodes may, for example, be computed as a sum of the weighted opinions, or using another combination function. The internal nodes such as node i 3621 express the collective opinions of the user entities, which may be reviewers, for example. There may be multiple layers of connected internal nodes, although only one such layer is shown here for denotational simplicity. The values of the internal nodes can affect the values of the recommendations given to the output layer 3640, which may contain identifiers corresponding to the same entities as in input layer 3600, or a portion of these. The output layer 3640 can correspond to recipients of recommendations, whereas the input layer 3600 can correspond to providers of opinions. Output layer 3640 can include user entity A 3641 and user entity B 3642. The elements of the output layer can be connected to the interior nodes such as node i 1921 using weights, such as $z_iA$ 3631, $z_{(i+1)}A$ 3632 and $z_{(i+2)}A$ 3633, which have a similar functionality as weight $w1_i$ 3611, weight $w1_{(i+1)}$ 3612 and weight $w1_{(i+12)}$ 3613, and which are used to weight the inputs from the internal nodes, such as node i 3621. This way, recommendations can be computed from opinions. A person of skill in the art will recognize that there are many variations of this approach that are possible.

Figure 37:
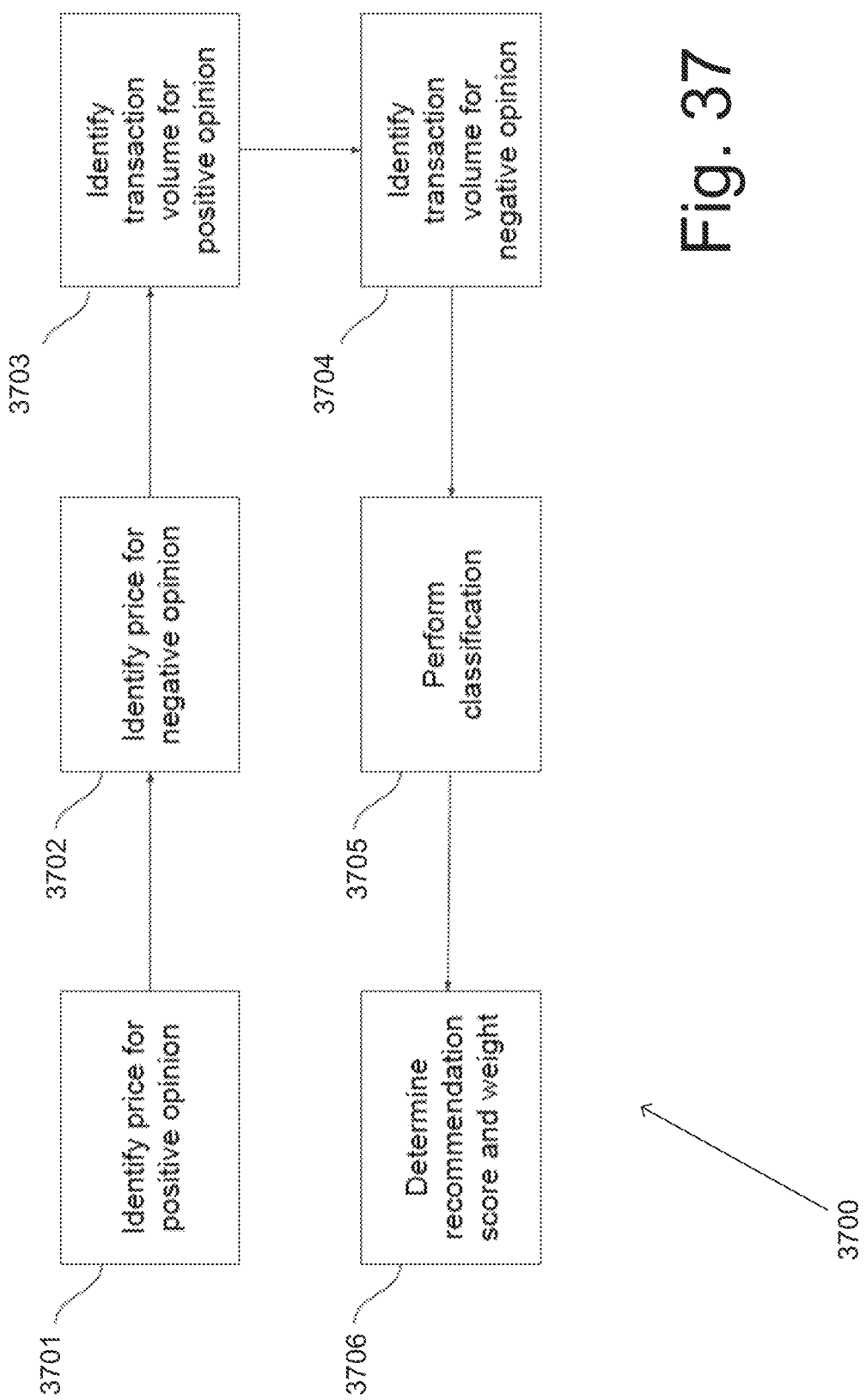
FIG. 37 illustrates a process for identification of potential abuse associated with bid-based recommendation mechanisms in accordance with an embodiment of the invention.

A process for identification of potential abuse associated with bid-based recommendation mechanisms in accordance with an embodiment of the invention is illustrated in FIG. 37. The process 3700 includes identifying (3701) the market price for a positive opinion (e.g., a contract associated with a coin, where the contract contains a term that expresses a positive view of a resource, such as a product). The market price for a negative opinion related to the same resource can also be identified (3702).

A transaction volume for the positive opinion can be determined (3703), where this volume is relative to a predefined time interval, such as the last 10 minutes or the last 24 h. The transaction volume for the corresponding negative opinion can also be determined (3704). In addition (not shown), measurements related to trends and variations in price may be determined, as well as information, when known, related to the identity or pseudonym of buyers and sellers of the associated contracts. Based on the collected information, a classification is performed (3705). This classification may be, for example, "positive recommendation trending up, high trust", which may in addition correspond to a precise recommendation score value and a large weight value indicating high trust. The classification may also be an indication of risk, such as "risk for self-interested buying, low trust", which may result in no new recommendation value being generated, and a low weight is output. The classification may also be that there is a bifurcation of opinions held, and indications of what groups like the resource versus do not like the resource are output, e.g., based on identity or pseudonym information. For example, this classification may indicate a recommendation score of 7 out of 10 for entities with strong correlation with node i 3621, as indicated by a large weight value for $z_iA$ 3631, as well as a lower recommendation score of 2.1 for entities with a strong correlated with node i+1 3622, as indicated by a large weight for $z_{(i+1)}A$ 3632, for example. This determination (3706) of the recommendation score and associated weight can then be performed.

Figure 38:
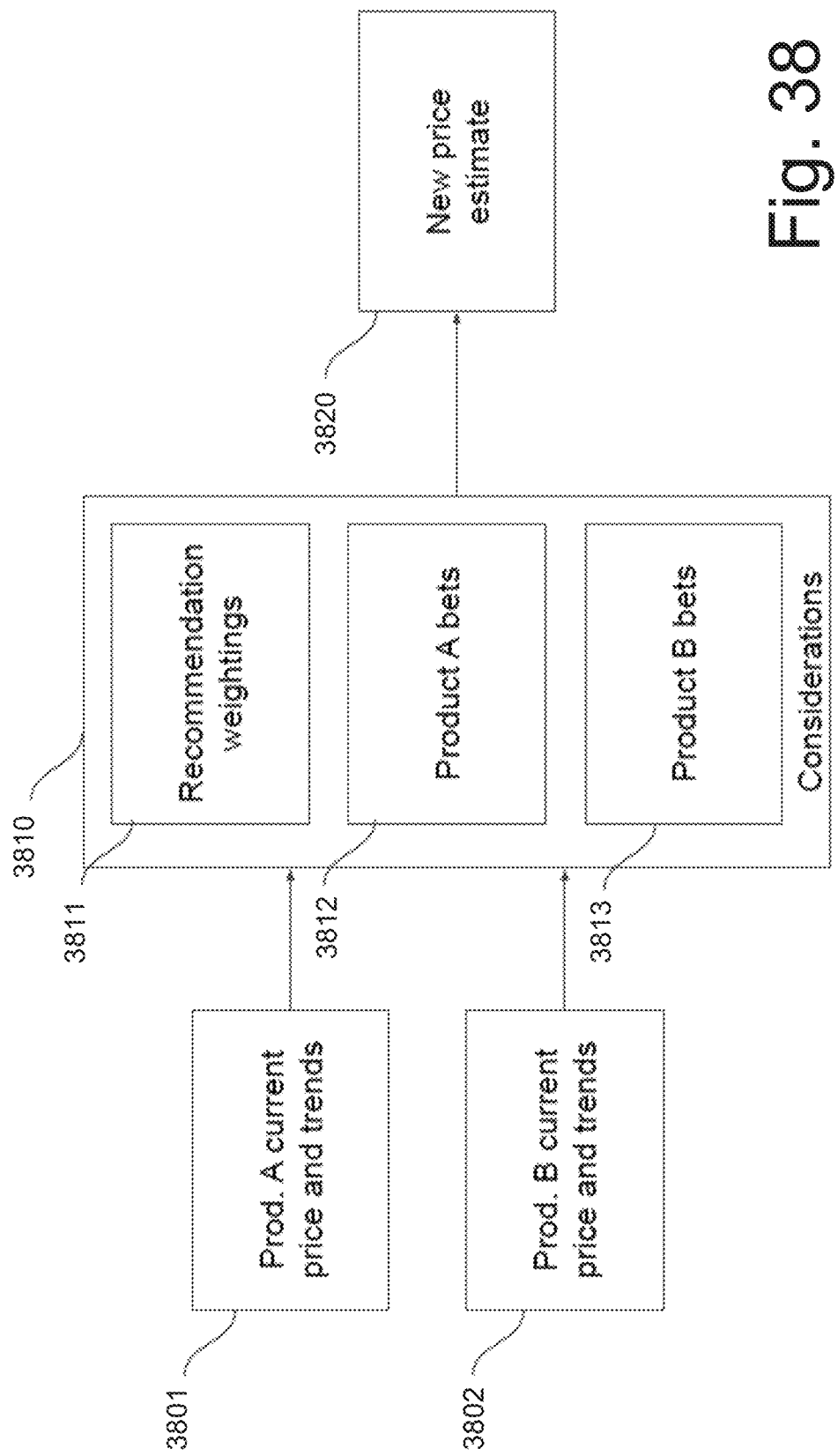
FIG. 38 conceptually illustrates a process for identification of expected or suggested market pricing in accordance with an embodiment of the invention.

A process for identification of expected or suggested market pricing in accordance with an embodiment of the invention is conceptually illustrated in FIG. 38. In several embodiments, the recommendation platform may estimate a new current market price for an item on its own or in comparison to one or more similar competing products. FIG. 38 illustrates a comparison of two products, product A and B. Product A current price and trends 3801 represents the previous market pricing for product A along with its historical trends. Product B current price and trends 3802 represent the previous market pricing for product B along with its historical trends. The prices and trends are considerations 3810 along with, but not limited to, recommended weightings 3811 (such as, but not limited to, those described above with respect to FIG. 37), Product A bets 3812, and Product B bets 3813 toward the generation of a new price estimate 3820 for one or more products, in this example Product A or B, or both.

While a variety of processes are described above for determining the relevancy of recommendations and/or detecting abuse with reference to FIGS. 37 and 38, any of a variety of processes can be utilized to determine the extent to which a user action is irrelevant and/or indicative of abuse as appropriate to the requirements of specific applications in accordance with various embodiments of the invention. Furthermore, recommendation platforms in accordance with many embodiments of the inventions can utilize external sources of information such as (but not limited to) bounty hunters in the evaluation of recommendations as is discussed further below.

Evaluating Recommendations Based Upon Information from Bounty Hunters

Information provided by bounty hunters may be utilized by recommendation platforms implemented in accordance with various embodiments of the invention to impact the weight of recommendations for products and services, whether real or virtual. In certain embodiments, information provided by bounty hunters is utilized by recommendation platforms to modify the rankings of reviewers based upon their recommendations, which serve as predictions to be assessed at a later time.

Figure 39:
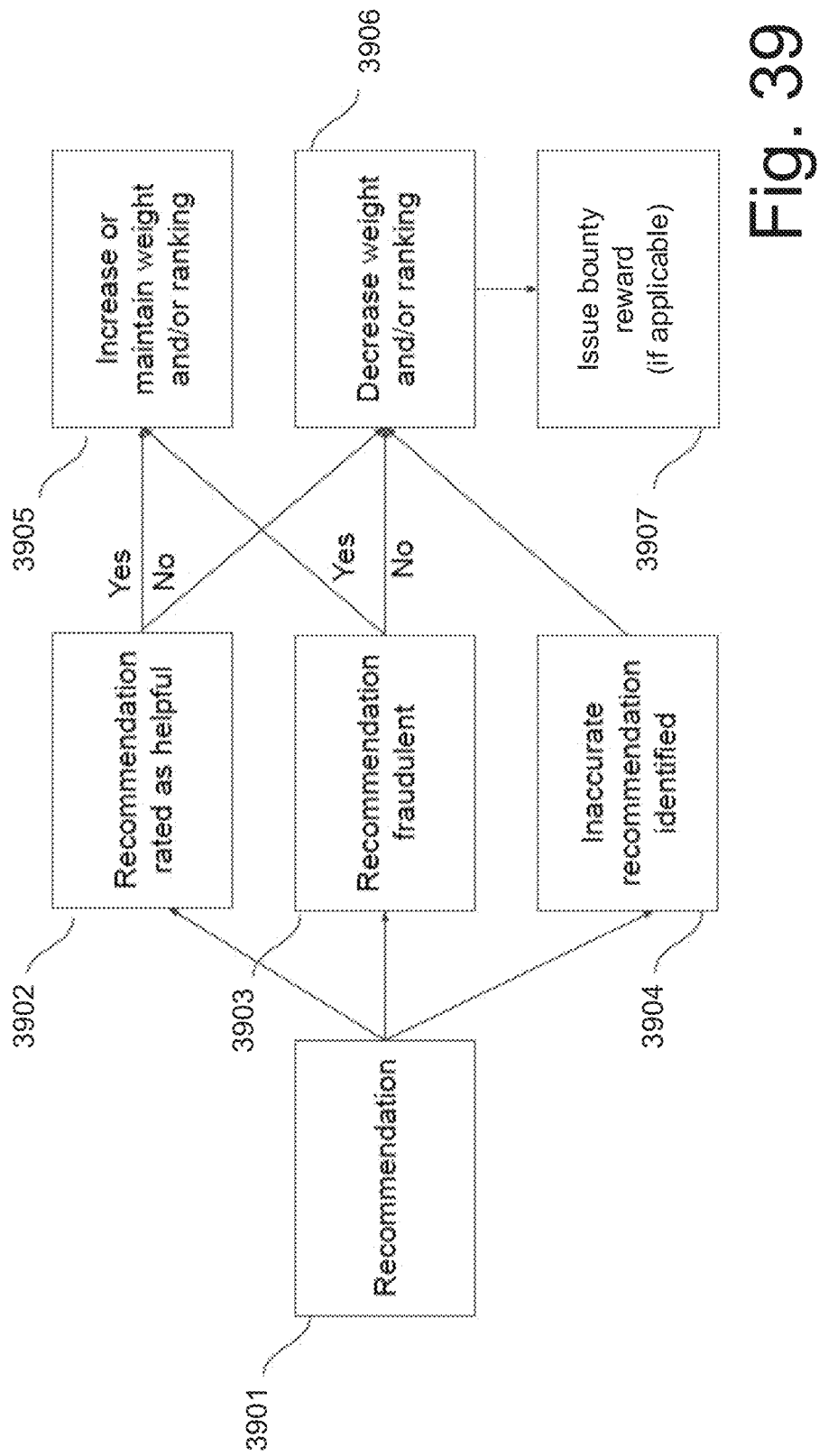
FIG. 39 conceptually illustrates A process for evaluating recommendations based upon information received from bounty hunters in accordance with an embodiment of the invention.

A process for evaluating recommendations based upon information received from bounty hunters in accordance with an embodiment of the invention is conceptually illustrated in FIG. 39. In the illustrated embodiment, a recommendation 3901 is made, whether by an individual, influencer, user, reviewer, organization, etc. The review may be categorized (3902) by readers of the recommendation as helpful or not helpful. A bounty hunter may find the recommendation fraudulent (3903) or an inaccurate recommendation identified (3904). A determination (3905) can be made to increase or maintain a weight and/or a ranking based upon a helpful or non-fraudulent recommendation; while a determination (3906) may be made to decrease a weight and/or a ranking based upon the outcome of a fraudulent or inaccurate recommendation.

In a number of embodiments, the process may issue (3907) a bounty reward (if applicable) to a bounty hunter. In certain embodiments, feedback, such as (but not limited to) an indication "Recommendation rated as helpful" (3902) can be limited to users that have a good reputation; can be limited to one feedback per user and target product and service; can be limited to a maximum number of feedbacks per day; or can be set to ignore feedback that is anomalous in quantity, distribution or type. This is done to avoid malicious users polluting the system with fake feedback. Another way is to associate the feedback with a bet against the underlying product, or a bet against the reputation of reviewers in line with the recommendation. In many embodiments, a ML system is used to create a weight that indicates the truthfulness of the feedback provider based on trends following the time at which the feedback was given, where the truthfulness score is used when other decisions are made, and may affect the purchase price of opinions. Units with low truthfulness score, e.g., below a certain threshold, may be penalized by not being allowed to participate in some aspects of the distributed functionality of the system.

While various processes are described above for utilizing information provided by bounty hunters and/or incentivizing bounty hunters to identify unreliable and/or reliable actions such as (but not limited to) reviews are described above with respect to FIG. 39, any of a variety of processes can be utilized by recommendation platforms based upon information provided by bounty hunters and/or to provides incentives to bounty hunters as appropriate to the requirements of specific applications in accordance with various embodiments of the invention.

As discussed in detail above, recommendation platforms in accordance with several embodiments of the invention utilize user profiles. As is discussed further below, the generation of user profile information in blockchain-based NFT systems can be challenging. Accordingly, a number of processes for automatically aggregating user information and building user profiles in accordance with various embodiments of the invention are described herein.

Systems and Methods for Automatically Generating User Profiles

The ability to provide relevant recommendations and/or effectively target advertisements and promotions is often reliant upon availability of information regarding the interests and/or preferences of particular users. Blockchain entries contain valuable, but indirect, information about user preferences and token ownership. However, these are not currently useful for purposes of determining preferences and improving content recommendations. Recommendation platforms in accordance with a number of embodiments of the invention generate user profiles associated with identifiers, such as public keys associated with ownership records. In several embodiments, a user profile describes not just a current state, such as what the user associated with the public key currently owns, but also past ownerships, both in terms of crypto currencies and tokens, such as non-fungible tokens (NFTs). NFTs can be associated with genres, such as visual arts, movies, music, non-music audio. They can also be associated with likely acquisition reasons, such as investment, consumption, and creation for the purposes of sale or renting. They can further be associated with the origin of the NFT, e.g., whether it was generated by a famous musician, by an underground musician, or by the user who owns the NFT.

In many embodiments, recommendation platforms use information regarding transactions between accounts recorded in an immutable ledger to infer information regarding relationships between individual users. An interaction between wallets can indicate potential social relationships or recurring acquisition patterns, e.g., whether a user associated with a first public key has acquired several NFTs from a person with a second public key. The profile of the second user, associated with the second public key, may therefore provide information about the profile of the first user, associated with the first public key. In some instances, the patterns of transfers may indicate that the two users are the same, and that the two public keys correspond to two aliases of the same user. In other instances, the patterns of transfers may indicate a familiar relationship, e.g., where several highly sought after NFTs are acquired by one user from another user.

Analysis of the recorded price of tokens can identify whether a user associated with the tokens is likely to select tokens for purposes of investment or not, and whether he or she beats the market in terms of these investments. The timing of acquisitions can also indicate whether a user is an alpha adopter or not, e.g., if tokens from a creator that later trended were purchased by a given user. These are indications that determine the user's likely preferences, e.g., whether the user wants things that have already been proven valuable by the actions of others, or if the user has a good understanding of what is likely to later become valuable. It can be described as a trendiness indication of the user.

Estimates of flows of financial assets, along with current ownership, indicates the likely disposable income of the user, and how this is changing over time. This helps identify what type of expenses may be tolerable to the user. Analysis of content associated with owned and previously owned assets, such as NFTs, indicate preferences, e.g., whether a user prefers visual arts to music or vice versa. It also may indicate genres of preference, e.g., whether the user prefers rock to jazz. As can readily be appreciated any of a variety of pieces of relevant information can be inferred by reviewing transaction information from immutable ledgers associated with public keys in accordance with various embodiments of the invention. Recommendation platforms and processes that utilize transaction information recorded in immutable ledgers to generate user profiles in accordance with various embodiments of the invention are discussed further below.

Automated Profile Generation

Recommendation platforms in accordance with many embodiments of the invention build profiles and generate associated characterizations based upon information including (but not limited to) transaction data recorded in immutable ledgers. An example characterization may have (but is not limited to) a demographic component, a financial component, a genre component, and a trend-setter component, each one of which may be represented by one or more scores. Demographic components, e.g., indicating likely age and gender, can be built by correlating ownership to known preferences of various demographic groups, e.g., a liking for a given K-pop artist may indicate that the associated user is likely to be a teenage girl. A liking for Formula-1 racers known to be popular among wealthy middle-aged men indicates a likely demographic group that corresponds to wealthy middle-aged men. Combinations of demographic assessments may strengthen such predictions by corroborating one using the other. Combinations of demographic assessments may also indicate that a given profile corresponds to multiple users with a high likelihood. As noted above, the specific characterizations that can be determined based upon transaction data recorded within an immutable ledger are largely only limited to the specific transaction data recorded within the immutable ledger and the requirements of a given application.

Figure 40:
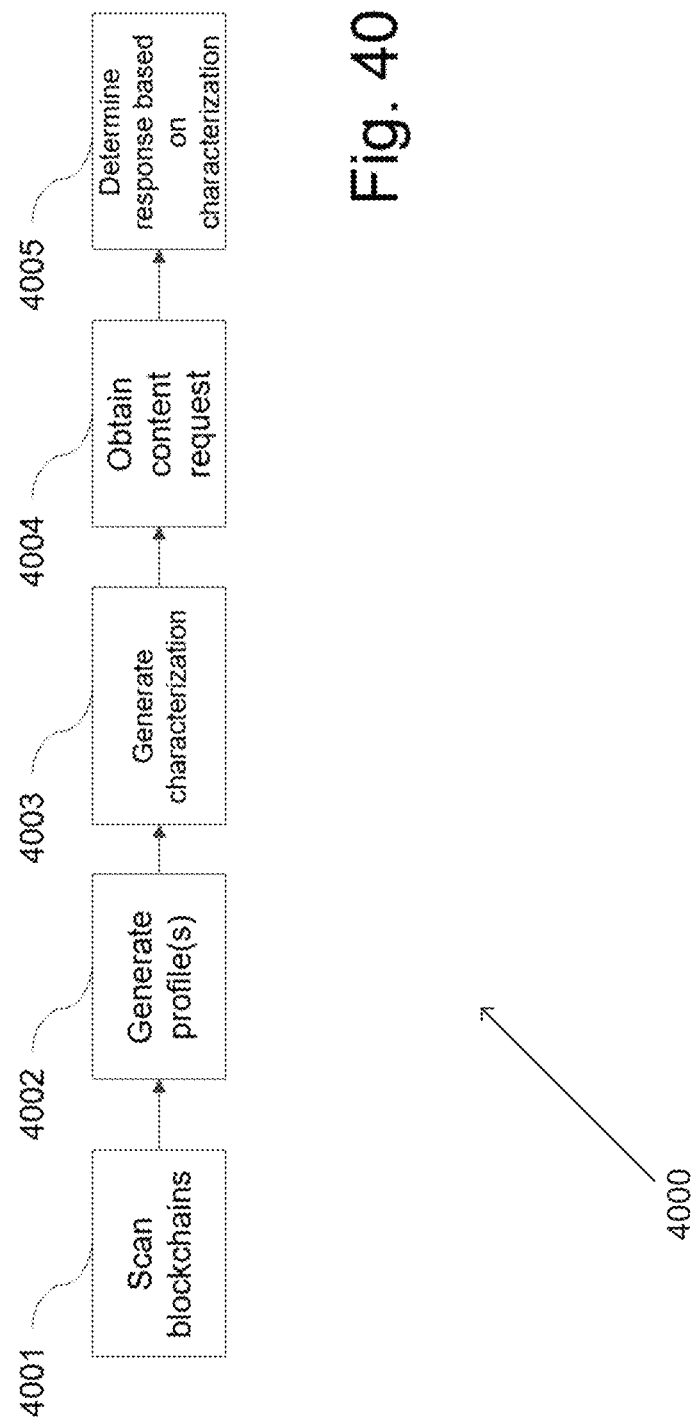
FIG. 40 illustrates a process for mining data from one or more blockchains to build and/or update user profiles in accordance with an embodiment of the invention.

A process for mining data from one or more blockchains to build and/or update user profiles in accordance with an embodiment of the invention is illustrated in FIG. 40. The process 4000 includes scanning (4001) blockchain entries and recording data associated with public keys. Data include tokens, such as non-fungible tokens (NFTs) and crypto funds, as well as transactional indications such as who obtains such elements from whom. In addition, but not shown in the figure, non-blockchain data may be scanned, e.g., from social networks. As can be appreciated, any of a variety of data recorded in immutable ledgers and/or sourced from additional external sources of data may be utilized as appropriate to the requirements of specific applications.

One or more profiles can be generated (4002) based on clustering the obtained data. One way of clustering data uses public keys associated with the data. Such public keys can also be correlated with other identifiers, such as social media handles, and data associated with the identifier included in the profile as well. As can readily be appreciated, any of a variety of techniques and/or sources of data can be utilized to perform clustering as appropriate to the requirements of specific applications in accordance with various embodiments of the invention.

In addition, one or more characterizations (4003) can be generated for the profiles. A characterization may indicate (but is not limited to) one or more interests or ownership descriptions of a user associated with a profile, a demographic description of the user, a prediction of an interest, or a combination of such attributes. The one or more characterizations may be stored as part of the profile, or associated with it.

In many embodiments, a request is received (4004) related to an identifier associated with a user profile and a response to the request can be determined (4005) based on the identifier and with one or more characterizations related to a user profile associated with this identifier.

In addition to utilizing transaction data recorded in an immutable ledger to build and/or maintain user profiles. Applications that interact with the relevant blockchain(s) can also directly provide information to recommendation platforms in accordance with several embodiments of the invention. In many embodiments, a wallet application on a user device generates notifications corresponding to one or more templates, as disclosed in co-pending application titled "Biometric Authentication using Privacy-Protecting Tokens" by Markus Jakobsson, and transmits the notifications to the entity creating and maintaining user profiles. These notifications are associated with the profile with the same identifier, such as public key. The notifications may include demographic information, or select information about user interests.

While specific processes for automatically generating and/or maintaining user profiles are described above with reference to FIG. 40, any of a variety of processes can be utilized that gather information from transactions recorded in immutable ledgers and/or received from applications that interact with immutable ledgers and build and/or maintain user profiles in accordance with various embodiments of the invention. Furthermore, the processes described herein can be utilized in any of the recommendation platforms described above with reference to FIGS. 18-39 as appropriate to the requirements of specific applications. Processes that can be utilized to infer additional information from user profiles in accordance with various embodiments of the invention are discussed further below.

Automatically Inferring User Profile Information

The creation of characterizations from profiles can be done using rule-based logic and statistical techniques based on correlation between observed behaviors and known behaviors of various groups of users. It can also be performed using artificial intelligence (AI) methods, such as machine learning (ML) methods.

Correlation between ownership records enables the determination that two different users, represented by their associated public keys, have similar behavior, which may indicate that they know each other or that they have similar preferences. Timing based behavior may indicate that two users are likely to be in the same time zone. IP logs associated with records associated with the public keys may be used to determine more specific locations, such as cities and even neighborhoods, with which users are associated. Data not placed on the blockchain can be used to determine social network connections, e.g., whether one user tweets that he bought an NFT and another user retweets it; this demonstrates a social connection between the two users. Also, such external profiles, such as twitter data associated with a given user, can be used to augment user profiles with which the data can be correlated or associated. For example, a user who transmits a tweet stating that he is selling a given NFT, linking to the NFT in a marketplace, makes it likely that the twitter profile is associated with this user. Such information can be made part of the associated profile and the one or more characterizations that are produced from this profile. Accordingly, information that connects users can be utilized in a variety of ways to infer characteristics of individual users in accordance with many embodiments of the invention.

In many embodiments, the characterizations are utilized to make predictions related to likely preferences. A user whose wallets contain a large number of in-game artifact is likely a gamer; a user whose wallet contains NFTs associated with famous artists is likely to be passionate about art; a user whose wallet contains NFTs of pixelated whales are likely buying these due to the novelty or the potential investment opportunity. The sophistication of a user in terms of distinguishing high quality items from lower-quality items in one genre can be determined by the portion of items of the corresponding types in the user's wallet. The wallet is associated with a public key that is linked to records on the blockchain, enabling the system to determine current and past ownerships associated with a given wallet, as well as determining the purchase and sales prices. By having heuristics to assess the quality or type of items, the user interests can be assessed based on past and current ownership records.

The characterizations can also be used to select actions to take. One example action is the generation of a recommendation. Another example action is the selection of an NFT to be gifted to a user. A third example action is the selection of a promotional token to be provided to the user in the context of a content request from the user. User requests may be generated, for example, by a user wallet, e.g., to help its owner identify new content of relevance and avoid the user having to search for new content, e.g., using a search engine. A fourth example action is the selection of content to be generated as disclosed in U.S. Provisional Patent Application No. 63/275,713 titled "User-Specific Evolution, Spawning and Peeling" by Markus Jakobsson and Perry R. Cook. Another example action is the customization of a platform, such as a marketplace, based on the likely preferences of a user, wherein content of types that are likely to be preferred is highlighted.

Figure 41:
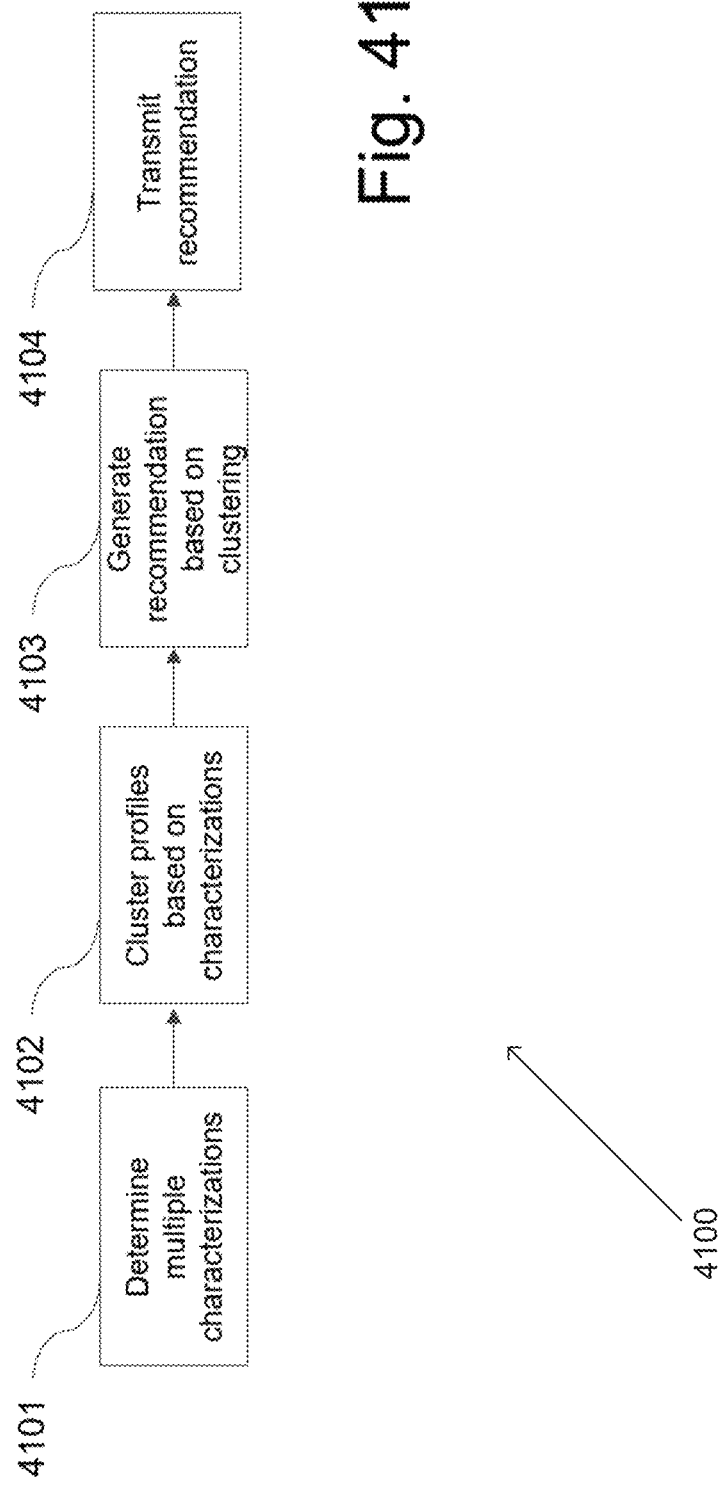
FIG. 41 illustrates a process for determining user similarity in accordance with an embodiment of the invention.

A process for determining user similarity in accordance with an embodiment of the invention is illustrated in FIG. 41. The process 4100 includes generation of multiple characterizations related to multiple users, e.g., as described above with respect to FIG. 40. The user profiles can be clustered (4102) based on the characterizations and at least one recommendation can be generated (4103) based on the clustering. Example recommendations include but are not limited to: introductions of users to each other; a suggestion for one user to follow another user; based on a first action of a first user, suggest a second action to a second user, where the first and second users are associated with each other in the clustering and wherein the second action is related to the first action. One example action is a purchase of an NFT of a particular content creator. As can readily be appreciated the specific recommendations that are generated are only limited by the requirements of particular applications.

At least one recommendation can be transmitted (4104) to a user, where example transmissions include (but are not limited to) promotional content associated with requested content, rendering of suggestions in response to a search request, gifting of tokens, generation or selection of content for evolution, spawning or peeling. Processes for identifying and distributing promotional content is disclosed in U.S. Provisional Patent Application No. 63,210,040 titled "Content Recommendation Method" by Markus Jakobsson, Stephen C. Gerber, and Ajay Kapur, and in U.S. Provisional Patent Application No. 63/234,086 titled "Tokenization and Promotion of Authored Content" by Ajay Kapur, Stephen C. Gerber, Markus Jakobsson, and Madhu Vijayan. Evolution, spawning and peeling is disclosed in U.S. Provisional Patent Application No. 63/275,713 titled "User-Specific Evolution, Spawning and Peeling" by Markus Jakobsson and Perry R. Cook.

While specific processes are described above with reference to FIG. 41 for making recommendations based upon the similarity of user profiles associated with users, any of a variety of processes can be utilized to determine similarity and/or generate recommendations based upon user profiles in accordance with various embodiments of the invention. Further processes for augmenting user profiles using additional sources of data in accordance with various embodiments of the invention are discussed further below.

User Profiles Incorporating Partitions

In several embodiments, a user profile can also be based on a user's assessments of data. For example, a user that rates an item, such as content that is related to or matches content in an NFT, may be associated with the corresponding NFT, independently of ownership, where the association includes the rating, the like/dislike, or an assessment of preference derived from a comment or a tag added by the user, e.g., using natural language processing (NLP) techniques, or sentiment analysis tools. The username associated with a social networking account may commonly be associated with a wallet, e.g., by identity claims made in a wallet or a social media profile. The ratings and other assessments made by the user in a social media setting can then be used, in manners analogously to what is described above, to generate profile entries.

When a user borrows or rents content, e.g., in the form of an NFT, he or she may leave reviews of the associated content, e.g., on review sites, or using derived tokens that refer to the NFT and which contain a review, a rating, or a statement. An influencer, for example, may do this for purposes of promoting content, and non-influencers may do it to share insights with their friends. Entries related to such assessments will be included in the profiles of the associated profiles. A user profile can be partitioned into what the user says, e.g., retweets or otherwise promotes, and into what the user owns. Sometimes, this may reveal different aspects of a user. It may also reveal multiple users associated with a given wallet. The partitions can be referred to as different personae associated with a given wallet. In several embodiments, user characterizations are made relative to one or more such partitions corresponding to a persona, and actions taken according to one or more personae associated with the wallet.

In many embodiments, temporal changes of interests are detected, e.g., by generating characterizations spanning different time periods, which may be overlapping, and determining whether there are new interests added, old interests fading, or whether the characterization, e.g., related to disposable income, changes over time. Such temporal sequences of profile assessments can be performed and used to understand the dynamics of end users, and/or to determine a user's current interests. They can also be used to predict likely future interests, e.g., using trend prediction tools that correlate the evolution of interests among typical users and a given user in order to determine likely candidate future interests of a given user. Drastic changes of interests may sometimes indicate a risk that a wallet has been taken over, e.g., if a user suddenly and rapidly starts transferring ownership of large numbers or very valuable items in a wallet, without previously having performed such transactions. Whereas this may also indicate that the user simply wishes to do some profit-taking, that would commonly be associated with corresponding purchases or investments. Sale of items at below-market prices is another indication of risk, especially when observed for a multiplicity of wallet items. A user may subscribe to alerts from services that monitor his or her wallet for indications of risk.

In certain embodiments, a user subscribes to information about new content that the user may be interested in based on observed profile data, and optionally, on user-provided goal characterizations, such as indications of intent and risk tolerance. One example intent is to purchase NFTs that are likely to substantially outperform a given index within a 12-month period. The risk tolerance may indicate whether a user would rather hedge by buying multiple NFTs from different creators, and of different types, or the user may be willing to make a smaller number of less certain purchases for which the assessment is that there will be particularly strong growth. These assessments may be determined based on trend-models, e.g., trained on wallet data as described above, and which identify likely future trends for large numbers of users, thereby assessing the likely market moves.

Characterizations may indicate (but are not limited to) a demographic group, such as male 20-25 years old; an interest, such as an interest in anime dogs; a socio-economic identifier, such as "likely college educated, annual income approximately $75,000"; a location, such as Seattle; and an objective, such as "interested in flipping investments". Content may be selected based on characterizations, and/or based on bids relative to such characterizations. The selected content may be provided free of charge, combined with other content such as user-requested content, or provided as part of a service.

While specific processes are described above for automatically generating profile data by analyzing transactions recorded in immutable ledgers and/or gathering data from publicly available sources, recommendation platforms in accordance with many embodiments of the invention can communicate with applications utilized by users to interact with one or more immutable ledgers to gather user data. Recommendation platforms that communicate with end-user applications to gather user data in accordance with various embodiments of the invention are discussed further below.

Gathering User Profile Data Using End-User Modules

In several embodiments, an end-user module, such as an application, observes user behavior and generates a profile including one or more classifications of interest, and a log of events such as conversion events and other notable events. Behavior, events and actions can be collectively referred to as events. One example conversion event is the purchase of a product following the advertising of the product to the user. An example of a notable event is an expression of preferences that may not be in response to an advertisement, such as a purchase that is not related to a previously displayed advertisement. Another example of a notable event is the establishment of a membership by a user associated with the end-user module. For example, such a membership may be an account with a given service provider, such as a publisher of news. Aspects of the notable event may also include configuration parameters, such as particular news preferences a user may set upon having subscribed to the online newspaper in this example. In several embodiments, one or more classifications of the user profile may identify the user based on user-provided information, such as demographic information that the user provides. This may include age, gender and zip code, for example. The classifications may also identify the user based on his or her observed actions, where example actions include what websites the user visits, how often, how long, and at what time of the day. A classification may identify a person as likely to be interested in purchasing a car, for example, based on such behaviors.

In certain embodiments, the end-user module is part of a user wallet application, an application such as a social media application that includes functions like a wallet, a browser, or be part of the operating system of the end-user device. End-user modules may coordinate across multiple devices, e.g., coordinate the classification and logging efforts associated with a given user as this user first performs actions on a laptop and later performs actions on a smartphone associated with the laptop. This association can be determined, for example, by the capability to access a resource, such as a financial account or a wallet for non-fungible tokens (NFTs) from both the laptop and the smartphone. The association can also be determined by explicit linking, e.g., by the user, of the two devices. One such linking can be performed by scanning, using the smartphone, a QR code displayed using the laptop, e.g., while the user is logged in to the NFT wallet. In several embodiments, profile data associated with one or more instances of an end-user module may be stored in one or more locations, including on an external device, such as a server that is part of a cloud storage service used by the end-user module. In a number of embodiments, the profile may be periodically updated, e.g., by synchronizing two or more contributing end-user modules with respect to the data they have stored. The profile data is stored in a record associated with the end-user. Multiple users using the same device may each be associated with separate records, where the record may be determined based on login data, biometric information collected by the end-user device, and/or by a user profile selection. Multiple users may also be associated with one and the same profile, e.g., when it is not practically possible to distinguish the users from each other or they are substantially similar to each other.

Figure 42:
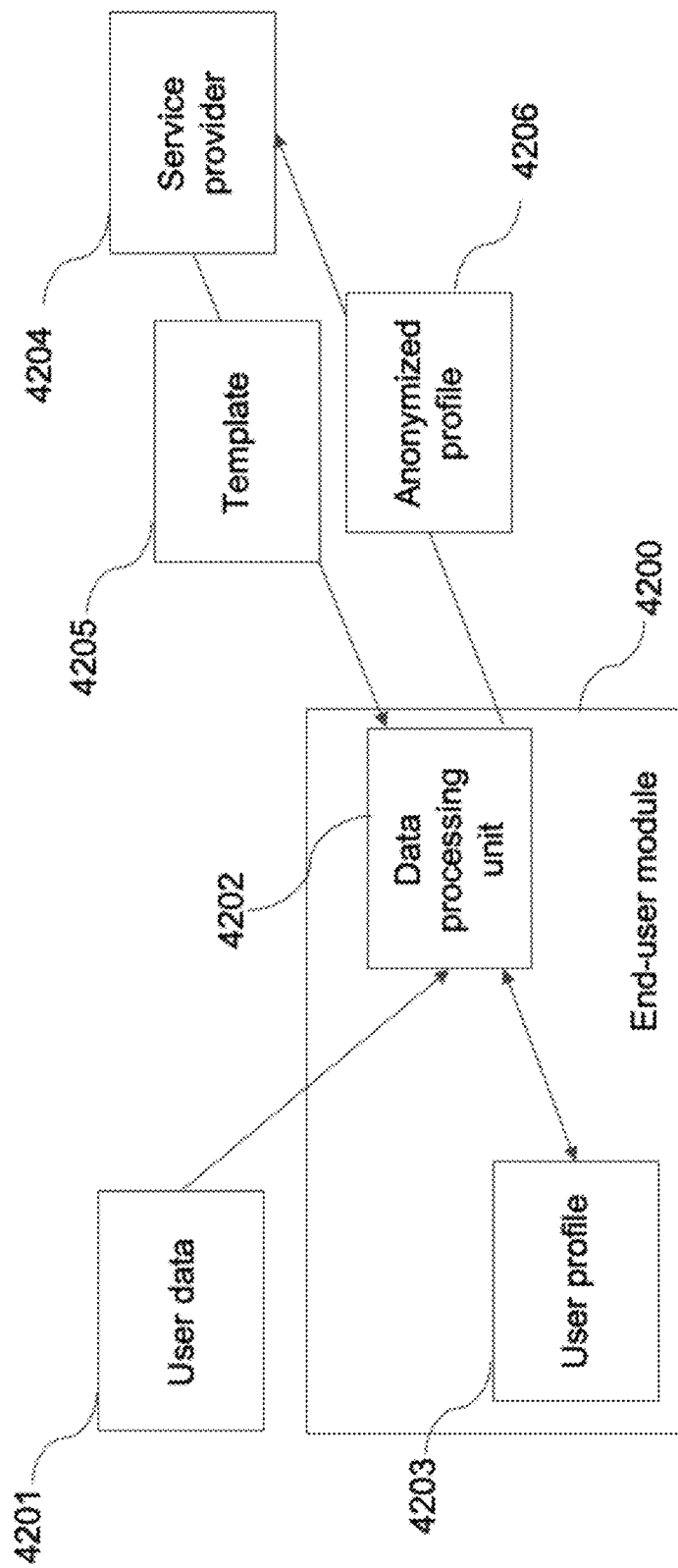
FIG. 42 conceptually illustrates the processing of data by an end-user module implemented in accordance with an embodiment of the invention.

Processing of data by an end-user module implemented in accordance with an embodiment of the invention is conceptually illustrated in FIG. 42. The end-user module 4200 processes user data 4201 using a data processing unit 4202 resulting in the creation of a user profile 4203. The end-user module 4200 receives a request from a service provider 4204, including a template 4205, where the template is conveyed to data processing unit 4202. Data processing unit 4202 accesses user profile 4203 and generates, based on template 4205 and user profile 4203 an anonymized profile 4206 that may be encoded as part of a usage statistics token, and transmitted to service provider 4204.

Figure 43:
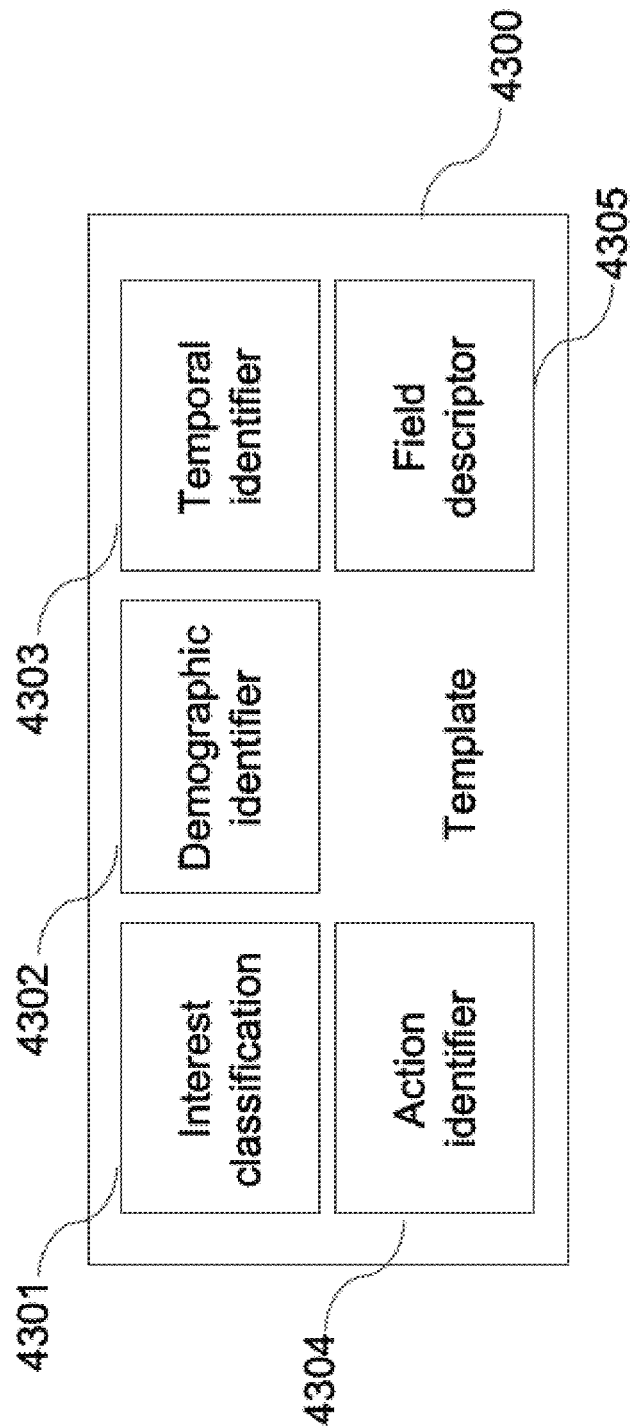
FIG. 43 illustrates an example of a template that can be utilized by an end-user module similar to the end-user module described above with reference to FIG. 42.

An example of a template that can be utilized by an end-user module similar to the end-user module described above with reference to FIG. 42 is illustrated in FIG. 43. The template 4300 includes an interest classification 4301, such as "F1 racing", or "basketball"; a demographic identifier 4302, such as "male, 20-29 years old"; a temporal identifier 4303, such as "within the last 14 days"; and an action identifier 4304 such as "purchased NFT". This corresponds to a template that would be matched by a person with exhibited interests matching interest classification 4301, who belong or is estimated to belong to the demographic group specified by demographic identifier 4302, and who within the period associated with temporal identifier 4303 has performed an action matching action identifier 4304.

These are example fields being described. In one embodiment, a template 4303 would include a field descriptor 4305 that identifies what fields it comprises; examples of these fields include interest classification 4301, demographic identifier 4302, temporal identifier 4303, and action identifier 4304, each one of which may be identified by a set of bits specific to such a field.

In several embodiments, some of the fields of a template, such as interest classification may be a selector that must be matched by the user profile of a user for the data processing unit of an end-user module to generate a response (e.g., an anonymized profile) to the template. In a number of embodiments, other fields may be a request for information such as demographic identifier. For each field, it would be specified whether it is a selector or a request for information. In certain embodiments, all fields are selectors; whereas in yet other embodiments, all fields correspond to requests for information. While specific templates are described herein with reference to FIG. 43, it should be readily appreciated that any of a variety of templates can be utilized as appropriate to the requirements of specific applications in accordance with various embodiments of the invention.

In several embodiments, an anonymized profile may include responses to the requests for information, as applicable, as well as any additional profile data generated by the data processing unit of an end-user module. Such additional profile data may be (but is not limited to) usage statistics, such as the number of NFTs in the wallet; the estimated value of the crypto currency associated with the wallet; the name of the most used application executing on the device on which end-user module runs; etc.

While a variety of end-user modules and approaches to generating anonymized user profiles in response to templates are described above, a variety of processes can be utilized to gather user data using end-user modules and to build user profiles and/or anonymized user profile data as appropriate to the requirements of particular applications in accordance with different embodiments of the invention. Processes for generating tokens using user data in accordance with various embodiments of the invention are discussed further below.

User Profile Derived Tokens

In several embodiments, the profile data stored in a record can be used to derive one or more tokens. These tokens can include assessments generated from the data in the record. For example, one assessment may be a demographic description of a user that identifies the user as a male in his thirties, with a likely disposable income of $26,000-32,000 per year. Another assessment may be an interest, such as an interest in F1 racing, and a statistical assessment indicating that the interest in F1 racing is based on at least 25 observations, or has been determined to be statistically significant with an estimated error rate of 3%. In certain embodiments, the assessments may be created in response to an input which includes a collection of templates, where each template corresponds to a type of assessment of interest to one or more advertisers or other service providers. For example, in one context, an advertiser may only be interested in users with an interest in one or more products that the advertiser sells, which may span interest ranging from horse riding and dog walking to parasailing and hunting. This advertiser may not have any products related to watersports, and therefore, may not be interested in knowing whether a given user is a windsurfer or not.

In certain embodiments, an end-user module, e.g., in the form of a wallet or a browser plugin, may determine that the user associated with it has one or more interests associated with one or more of the templates expressed by a given advertiser, and generate a token that includes information expressing the user's interest aligned with these templates. This token may be purchased by the advertiser, from the end user module, or obtained in exchange for a service. The token may simply include demographic information in cases where there is no match between interests and templates. If this is so, the service provider may still offer the user a service, but potentially not the same service as the user would receive if there is an expressed match to a template, and/or at a different cost than to a user with an expressed match.

In a number of embodiments, a token is generated by the end-user module to express one or more alignments with templates, and one or more demographic assessments. These can be sufficiently general that they still provide k-privacy, i.e., privacy for the user among k–1 other users with the same description. The generation of a token can be made relative to other tokens to provide privacy assurances such as k-privacy, based on published statistics of the commonality of various profiles.

In a number of embodiments, a service provider may offer a service that is configured based on the contents of a token. If the token expresses a given alignment with a template and a given demographic, for example, then the service provider may select a first promotional offer or advertisement to the user, as part of another service provision, whereas if the token expresses another alignment, or no alignment at all, then the service provider may provide a different service.

Figure 44:
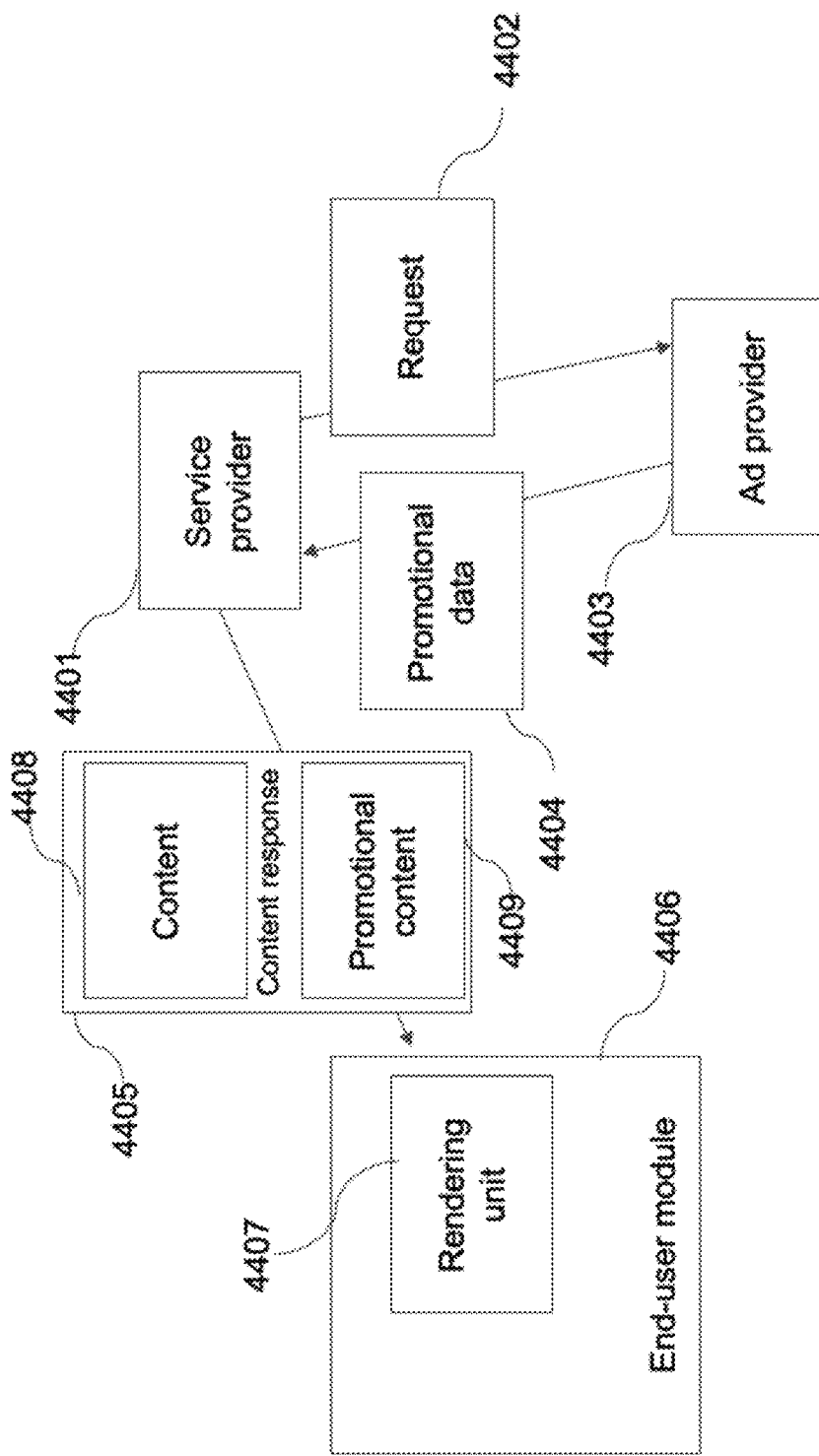
FIG. 44 illustrates the selection and distribution of promotional content.

FIG. 44 illustrates the selection and distribution of promotional content 4405, such as an advertisement, a discount coupon, or gift NFT. In the illustrated embodiment, a service provider 4401, which may be (but is not limited to) a provider of videos, music or other entertainment, for example, has received anonymized profile, and transmits a request 4402 to ad provider 4403. The request may optionally include an anonymized profile, or data generated from an anonymized profile. The ad provider 4403 can respond with a selection of promotional data 4404, where this may be a reference to content. It may also be content, such as audio content. Service provider 4401 generates and transmits a content response 4405 to end-user module 4406, where it is displayed on rendering unit 4407. The content response includes content 4408 and promotional content 4409, which may be the same as promotional data, or selected based on the promotional data. The content response 4405 is received by the end-user module 4406 and sent, at least in part, to rendering unit 4407, which may be a screen, a loudspeaker, one or more processors, etc. In several embodiments, a content response 4405 may include audio, video, scripts and/or other data. Gift NFTs can be selected in the manner described in U.S. Provisional Patent Application No. 63/275,713 titled "User-Specific Evolution, Spawning and Peeling" by Markus Jakobsson, based on a commercial placement request, e.g., by ad provider 4403. In several embodiments, the service provider 4401 and the ad provider 4403 are co-located, and may correspond to different executables running on the same system, for purposes of reducing network lag associated with communication over a network. As can readily be appreciated the specific implementation of systems that perform the functions described above with reference to FIG. 44 are largely dependent upon the requirements of a given application.

Figure 45:
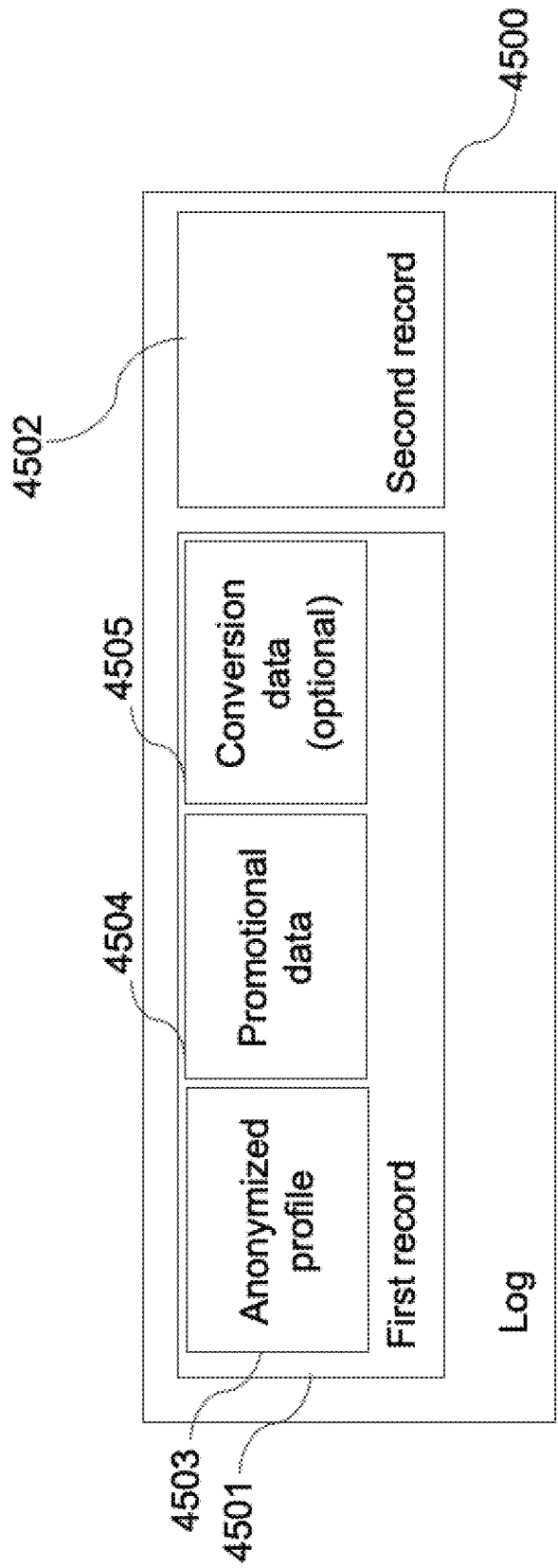
FIG. 45 illustrates a log generated by a service provider as a result of the placement of promotional content for a user associated with end-user module in accordance with an embodiment of the invention.

Service providers in accordance with many embodiments of the invention can generate logs. A log 4500 generated by a service provider as a result of the placement of promotional content for a user associated with end-user module in accordance with an embodiment of the invention is conceptually illustrated in FIG. 45. After transmitting a content response to an end-user module, a service provider can add a first record 4501 to log 4500. It may later add a second record 4502. In the illustrated embodiment, the first record 4501 includes an anonymized profile 4503, or a reference to it; promotional data 4504, or a reference to it; and optional conversion data (4505) that may be received from an end-user module, or a similar transactional system, in response to the rendering of promotional content on a rendering unit, and optionally, based on a detected user action of relevance to the promotional content. Examples of such user actions of relevance can include (but are not limited to) the purchase of an advertised product, the use of a gifted NFT, or the access to a website where the user accessed an article related to promotional content. Information about conversions may be received from the end-user module during the same session or at a later time.

In a number of embodiments, a log may be provided to an entity associated with ad provider, for book-keeping purposes, but also for this entity to determine the conversion rate, optionally based on demographics associated with anonymized profile, the time of the day at which promotional content was rendered, or the context in which the promotional content was placed. An example of such a context is the association with content that was requested by the end-user module, whether due to an explicit end-user request for this content or due to an assessment by the end-user module that the user would want content. Such an assessment can be made based on previous actions of the user (or a set of users), including conversions, as well as based on the user data and the associated user profile. In certain embodiments, a log may be recorded in a public database, such as a blockchain. Entries such as first record may be encrypted, e.g., using the public key of ad provider, or a symmetric key established between a service provider and an ad provider. In addition, the first record may have a non-encrypted indication of the identity of the party that can decrypt an encrypted portion of first record. Furthermore, access to the log data can be permissioned using the techniques described above.

While specific processes for generating anonymized user profile data and generating logs are described above, any of a variety of processes can be utilized in accordance with various embodiments of the invention. Furthermore, user data can be recorded within an immutable ledger using tokens in a variety of additional ways discussed further below.

Another type of element that a token implemented in accordance with an embodiment of the invention may include relates to one or more conversions. Service provider A may receive a conversion notification that indicates that the user may have performed an action that is a conversion with respect to an advertisement shown by service provider B. The conversion notification may be encrypted, at least in part, to hide its nature to any entity other than the service provider it relates to, e.g., service provider B in this example. As service provider A reports on the conversion, service provider A may be provided with a small benefit for the facilitation of the conversion determination, such as a payment of $0.005. The service provider that the conversion relates to may transmit the token, or conversion data of the token, to a third entity, such as a manufacturer. This is entity C, and corresponds to the party whose product was advertised by service provider B, leading to a conversion. As service provider B does this, it may be paid for the provision of the advertising service, e.g., paid $2.50 or another pre-agreed amount. The amount may also depend on the nature of the conversion, e.g., how many units the user purchased. Here, service provider B may be an influencer who may, for example, have provided a product review of the products of entity C.

Usage statistics may be specific to one or more specific artifacts. For example, a wallet or other user-side entity may generate an NFT that specifies actions taken relative to one or more NFTs, such as (but not limited to) NFTs that are contained in a user wallet; NFTs that were sold and transferred away from the wallet within a ten-day period; NFTs that were bought and added to the wallet within a ten-day period; NFTs that a user associated with the wallet bid on but did not purchase; NFTs that the user viewed within a ten-day period; NFTs that the user modified within a ten-day period, where one example modification is a peeling event, as disclosed in U.S. Provisional Patent Application No. 63/275,713 titled "User-Specific Evolution, Spawning and Peeling" by Markus Jakobsson. Other time periods can also be used, as will be appreciated by a person of skill in the art. Instead of disclosing a unique identifier associated with an NFT associated with one of the above criteria, the wallet may instead redact information by instead specifying the number of NFTs of the different types for which the user has taken actions relative to, general classifications related to these NFTs, such as whether they are image-based or audio-based; whether they are classified as art or in-game artifacts; whether there are royalty policies associated with them or not, and so on. Royalty policies are disclosed in U.S. Provisional Patent Application No. 63/281,721 titled "Royalty Sharing Method" by Markus Jakobsson.

Usage Statistics Tokens

In several embodiments, usage statistics tokens may include data related to (but not limited to) the execution environment(s) with which they are associated; the user(s) they are associated with; the actions taken; the contents of and changes of wallets associated with the tokens; and more. Some or all of these may be protected, e.g., encrypted or at least in part redacted. The encryption may be performed relative to a public key of a trusted third party or a symmetric key established with such a party. In certain embodiments, data may be encrypted with a key associated with a buyer of data, such as an advertiser. This can be done to ascertain that only this entity gains access to the data. Redaction corresponds to the removal of at least some data, or replacement of unique identifiers by classifiers, e.g., descriptors of types of data. A username is a unique identifier, for example, whereas the gender or zip code of the user is a descriptor of the user that is not unique. Other types of redactions can be used, as will be appreciated by a person of skill in the art. Yet another anonymizing approach is the use of aggregation. By aggregating multiple data points, such as multiple user actions, to a profile describing the likely needs of a user or other user classification data, the privacy invasion associated with disclosure of detailed information can be addressed. Thus, a wallet can generate a profile describing a user and encode this profile in a token, where the token can be provided in exchange for funds or services, while protecting the privacy of the user since detailed information is not disclosed, nor is personally identifiable information (PII). In a Web 2.0 setting, in contrast, advertisers will get as much data as they could, where such data includes personally identifiable information as well as information that a user may consider sensitive.

In a number of embodiments, usage statistics tokens indicate a degree of change from a previous time, where the previous time may be the time for the most recent transfer of a usage statistics token or a triggering event, such as the display of a specified advertisement to the user of a device associated with the generator of the usage statistics token. This enables the detection of the impact or influence of a given messaging campaign, whether in general or relative to a particular set of selected topics, where an example topic is described by a template provided by a service provider. In many embodiments, a client-side process such as an end-user module transmits, in response to a template, an anonymized profile that includes an indication of a match between the user profile associated with the end-user module and the template. In certain embodiments, the anonymized profile includes data indicated in the template. Thus, the template may include fields with at least two different uses: the first use is a selection of whether the template is matched, based on the profile data, and the other is a request for data of a type indicated by the template. The anonymized profile may be encoded as a usage statistics token, but may also be transmitted without being tokenized. Example methods for tokenizing, as well as disclosures of token types and functionality, are described in U.S. Provisional Patent Application No. 63/213,251 titled "Token Creation and Management Structure" by Markus Jakobsson and Stephen C. Gerber.

In many embodiments, the end-user module can determine conversions and convey these to third parties. The anonymized profile, which may be tokenized, may include one or more conversion data elements. A conversion data element is a reference to a promotional content element such as (but not limited to) a movie, a gift NFT, a visual advertisement, an audio advertisement, or a coupon. The reference identifies one or more such promotional content elements. Furthermore, the conversion data element may include one or more indications of the nature of the conversion. Examples of such indications include but are not limited to indications that a user visited a website, a user performed a transaction such as a purchase, a user interacted with the promotional content element, e.g., played a game associated with it, etc. The conversion data element may also indicate the context of the conversion, e.g., where a purchase was made, the price of a purchase, etc. In some instances, a conversion corresponds to a demonstration of attention by a user to the promotional content, e.g., as determined by determining what the user viewed on a screen, what the user clicked on, whether the user was attentive, etc. The determination of attention can be performed using methods disclosed in U.S. Provisional Patent Application No. 63/219,864 titled "Using Tokens in Augmented and Virtual Environments" by Markus Jakobsson, Stephen C. Gerber, Ajay Kapur, and Madhu Vijayan. An anonymized profile may include data resulting from performing a survey, e.g., as disclosed in U.S. Provisional Patent Application No. 63/256,597 titled "Token Surveys and Privacy Control Techniques" by Markus Jakobsson, and Stephen C. Gerber.

Gathering User Data Via Wallet Applications

In many embodiments, a wallet is combined with or interfaces with an application that manages or is used for traditional credit card transactions. This may be a browser, a browser plugin, or a special-purpose application, including one that is supported by native hardware functionality for purposes of security. The transactions recorded by this application can be stored by the wallet, as part of the user profile. From this, anonymized profiles can be made, e.g., a profile that matches a template requiring the purchase of airplane tickets, which may have been performed using the application. The date of the travel may be information requested by the template, as may the location of the journey. An advertiser may tailor promotional content to the destination of the travel. The cost of the placement of the promotional material may be determined based on how long it is until the trip will commence. A trip that has already concluded may be of lesser value to some advertisers, but higher value to others; therefore, as advertisers bid for the right to have their promotional content transmitted to the user, these types of data may be used as input. As can readily be appreciated, the specific data gathered and the applications from which wallets gather data for incorporation within user profiles is largely only limited by the requirements of specific applications.

While various processes are described above for using end-user modules to gather user data, user data can also be gathered by mechanisms embedded within the operating systems and/or execution environments of user devices. Recommendation platforms that utilize execution environments to gather user data and/or generate recommendations in accordance with various embodiments of the invention are discussed further below.

Recommendation Platform Execution Environments that Gather User Data

Recommendation platforms in accordance with several embodiments of the invention utilize execution environments (EE) that identify end-user needs in order to select meaningful promotional material, where these needs are determined based on end-user actions taken in the execution environment. The actions need not be considered in isolation. For example, a person looking at homes for sale may simply be interested in home decoration ideas, whereas a person looking at homes for sale, and reviewing terms of mortgages is a potential home-buyer. This aggregation of data is not possible in environments where one vendor (such as a realtor placing one advertisement) may not have any way of exchanging data with another vendor (such as a mortgage broker), but is made possible by our approach. After the EE determines a need, it obtains and renders associated material, which may include promotional material. In the example above, a first need may relate to a home of a certain price range in a certain geographic area. After the EE determines another associated need, such as a mortgage of a related amount, it can determine intent to a greater extent than it would have without determining the second need. This intent makes recognizing the actions of the end-user more valuable, and increases the potential value of promoting content to the user. The EE further determines user responses to rendered material to fine-tune the model, such as the apparent attention the user exhibits, the amount of time the user spends on the promotional material, and more. This is also an indicator of intent, as well as a useful observation to determine what types of promotional material a user may be interested in next. Thus, the EE builds a model of the user and her needs, based on observation of actions, attention, and determinations of intent, among other things. Attention can be determined based on an array of approaches, disclosed herein.

Figure 46:
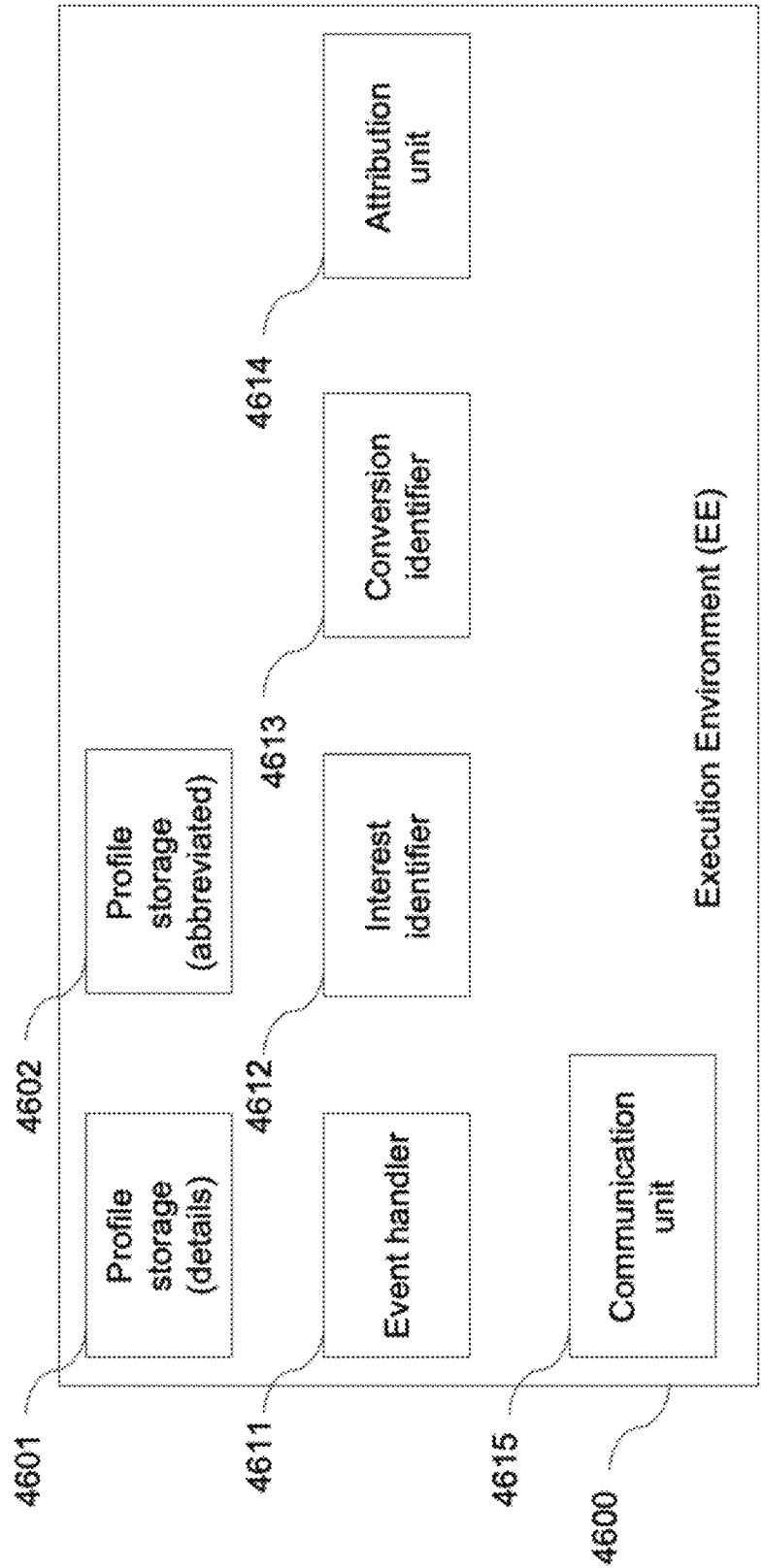
FIG. 46 illustrates an execution environment (EE) that observes and processes events in accordance with an embodiment of the invention.

An execution environment (EE) that observes and processes events in accordance with an embodiment of the invention is illustrated in the FIG. 46. The EE 4600 includes an event handler 4611 that observes or processes events, such as user requests, user actions, and content types. The event handler writes the profile storage (details) 4601, which includes records related to events. In several embodiments, the EE includes an interest identifier 4612 that determines user interests based on events detected by an event handler 4611, or obtained externally, e.g., from other associated EE units.

By way of example, the interest identifier 4612 may determine that a user associated with EE 4600 is interested in trucks costing between $50 k-$60 k, and that the user is likely to have available funds for such a purchase. The interest identifier may also determine what percentage of determined events that result in a conversion, such as a purchase, by obtaining information from the conversion identifier 4613. This percentage provides an indication of the likely strength of an interest. In a number of embodiments, the interest identifier may determine that some interest types have a greater conversion percentage than other interest types. For example, a user's identified interest related to clothing may have a higher conversion rate than a user's identified interest related to consumer electronics. Such detailed characterizations help the interest identifier 4612 generate a prediction of likely conversion based on one or more events observed by event handler 4611 or stored in profile storage (details) 4601. In one embodiment, interest identifier uses machine learning (ML) methods or time-series analysis to determine a predicted conversion probability for one or more types of merchandise and service related to one or more events. The interest identifier 4612 can generate entries including a type descriptor and a conversion probability, and stores such entries in the profile storage (abbreviated) 4602. One such entry may include the pair (("truck", "$50 k-$60 k", "Chevy"), 0.12). Here, the first element of the pair, namely ("truck", "$50 k-$60 k", "Chevy") describes a product, and the second element, namely 0.12, a conversion probability. The first element, in this example, corresponds to a truck of cost between $50 k and $60 k, of the brand Chevy™. The interest identifier may take as input an assessment indicating the attention measurement, such as whether the user observing a given advertisement was looking at the advertisement, based on eye tracking technology, or whether the user turned off the volume during the advertisement. In certain embodiments, the conversion identifier 4613 may take external input, such as an indication that a coupon code associated with the user was used in a purchase, or an indication from event handler 4611 that a user performed an action indicating a conversion.

In a number of embodiments, the conversion unit 4614 determines what promotional and informational content is likely to be the reason for a detected conversion, where this may be (but is not limited to) expressed as scores. One advertisement that is determined to be likely to have caused the conversion may be assigned a score of 67, out of a total of 100, while three other advertisements that are determined likely to have contributed as well are each given a score of 11, all these scores adding up to 100. Attributions such as these are conveyed to manufacturers, resellers and individual influencers, where one example influencer may be the party that created the content assigned 67 points. Scores and attribution data can be communicated by communication unit 4615. This unit also performs backups and synchronizations of profile storage (details) 4601 and profile storage (abbreviated) 4602. These storages may be encrypted and/or authenticated prior to backup or synchronization.

In a number of embodiments, the execution environment 4600 is part of a TEE, a DRM environment, or a DRM running in a TEE. While various EE environments are described above with respect to FIG. 46, it should be readily appreciated that any of a variety of EE can be utilized as appropriate to the requirements of specific applications in accordance with various embodiments of the invention.

While various EEs are described above with reference to FIG. 46, any of a variety of EEs can be utilized as appropriate to the requirements of specific applications including (but not limited to) the various EE implementations discussed below. Processes for enhancing information captured by EEs related to actions by accounting for factors including (but not limited to) influence in accordance with various embodiments of the invention are discussed further below.

Accounting for Influence

EEs in accordance with many embodiments of the invention utilize an accounting method used to determine what influences of relevance have taken place, relative to a particular action or decision by a user. For example, the EE can determine that a user appears to be interested in buying a truck, based on search terms entered by the user, newspaper articles read by the user, attention paid by the user to various promotional content, and finally, actions that the user takes that can be used to correlate to a later transaction. For example, a user may accept a coupon for a free window treatment for a truck the user may be interested in buying, where the sale of the truck later, whether it takes place online or in a brick-and-mortar setting, can be attributed to the coupon, and then, to one or more sessions observed by the EE. The coupon provided to the consumer may be offered by a first influencer. In a traditional system, the understanding would have been that this is the party that caused the sale of the truck, prompting the manufacturer to reward this first influencer for finding a customer. However, that may not be what happened. The consumer may have gone to the site of the first influencer, knowing a coupon could be obtained there, after first having been informed of the benefits of the truck by a second influencer, which may be the party that actually caused the consumer to decide to buy the truck. To properly reward the efforts of influencers, the manufacturer would want to recognize the efforts of both the first and the second influencers. By rewarding those whose actions actually influence decisions, manufacturers and sellers streamline the delivery of promotional material and improve their chances of increasing sales. This is possible in the context of the disclosed system, since the EE will record the actions of the user, and will know, for example, that the user received information from both the first and second influencer. The EE will also be able to determine likely inflection points, such as a time when a user contacts lenders or starts searching for accompanying products, such as bug screens or flatbed covers. These inflection points can help identify when a user tendency or decision appears to have been formed. Whereas it may not be possible to determine that a sale, such as of a truck, will take place just because one of these events is observed, it will be possible to probabilistically and retroactively determine likely inflection points after information of a sale, or other conversion, is recorded. This enables the retroactive attribution of what influencing efforts led to the conversion, which in turn enables a more precise form of rewarding of these efforts.

Attribution information can be communicated to an advertiser, a manufacturer, an influencer, or a retailer, for example. The advertiser and the influencer may wish to know the success of their promotional content, to determine what efforts of theirs are most successful. In several embodiments, an advertiser may also want to know what efforts led to success for purposes of tracking awards. An advertiser may have produced the content, or outsourced the production to an influencer. If the latter, the advertiser can expect to collect an award from the brand that contracted with the advertiser, but also, the advertiser would be expected to pay the influencer. The brand that pays the advertiser and/or the influencer may correspond to a manufacturer, e.g., of mattresses, or a retailer of any type of bed product, including several brands of mattresses. Brands and retailers may want to know what campaigns, advertisers, influencers and/or products are most successful in terms of leading to conversions. Moreover, all the parties receiving information benefit from understanding demographics associated with the conversions, in order to better know their audience and their customers. Thus, these parties may receive a first information related to the rendering of a promotional content element, where the first message includes some demographic information, such as the zip code or geolocation of the viewer. Viewing content in full is a form of conversion. They may also receive a second information related to the purchase of a product advertised in the promotional content element, or a request for more information about the product. These are also types of conversions. The second information may include additional demographic information, e.g., descriptors of the users such as the contents of the profile storage (abbreviated), as illustrated below, as well as location information. Profile data of this type can be one type of demographic data. This second information could be the same as the first information in terms of the type of demographic data that is transmitted. Additional examples of content elements, including personalizable content, and their use are provided in U.S. Provisional Patent Application No. 63/210,042 titled "Dynamic Distributed Digital Rights Management Enabling Composite Content" by Markus Jakobsson.

Restricting Access to Profile Data

Creating and maintaining a localized model of a user and her needs, as described above, thus enables both greater insights into likely user needs and likely inflection points. It also enables a localized safe-keeping of profile data, which protects the consumer against breaches as well as acts to instill trust with the consumer. However, it is desirable to protect this profile information against theft, e.g., by malicious processes running on the computer system including the EE.

In several embodiments, access to profile data on an EE is limited. This can be done by encrypting the profile data, and by managing, using access control mechanisms, what processes are entitled to access the encrypted data. By protecting the profile data, multiple associated EEs can safely consolidate profile data. For example, one user may use a laptop during the day and a tablet computer at night. The EE associated with the laptop and the EE associated with the tablet computer can, after determining that they are associated with the same user, exchange information with each other, thereby enabling improved insights, whether into consumer needs or attributions related to conversions. It is beneficial for such data also to be hosted on cloud servers, in order to facilitate a near-instantaneous personalization of a new device purchased by the user, or temporarily configure an EE of a new device, such as a hotel TV, to select suitable promotional content and to contribute insights to the cloud-hosted profile of the user. As can readily be appreciated, similar mechanisms can be used to synchronized with any of a variety of devices associated with the consumer, such as the consumer's phone or laptop. In several embodiments, synchronization involves a binding of an EE to a cloud profile of a user, whether temporarily or for a longer period of time; this binding can be informed by a user log-in, whether this is based on an identifier and a password, an identifier and a biometric, or an identifier and another form of credential. For temporary bindings, a user may not be comfortable or sufficiently incentivized to enter a password or biometric into a temporary device, such as a hotel TV. However, users may be willing to utilize their phone as an authentication platform, which then conveys an encoded identifier to the temporary platform, which in turn uses this to bind to an associated cloud profile. Automated bindings may also occur based upon wireless technology (e.g. Bluetooth®) beacons, etc. As can readily be appreciated any of a variety of mechanisms can be used for binding as appropriate to the requirements of specific applications. Binding in this way may only enable the uploading of profile data, from the temporary platform to the cloud service, or it may also enable sharing of information in the other direction. The extent of this sharing may be configured by the user, on his phone for example, where one configuration for temporary devices may be used time after time without any need for user effort.

Figure 47:
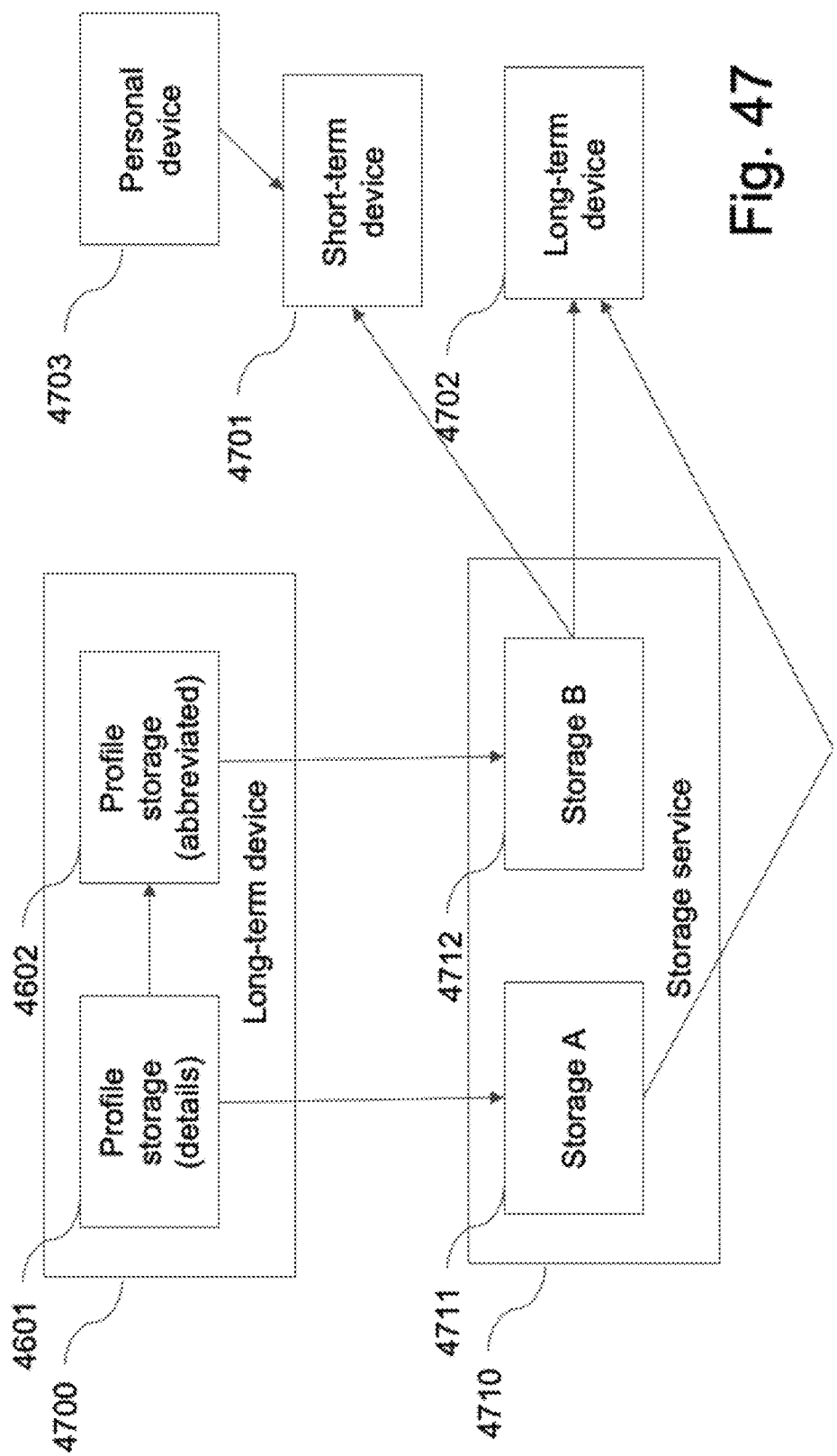
FIG. 47 illustrates a process for synchronization of profile storage associated with an EE in accordance with an embodiment of the invention.

A process for synchronization of profile storage (details) 4601 and profile storage (abbreviated) 4602 associated with an EE in accordance with an embodiment of the invention is illustrated in FIG. 47. The profile storage (details) 4601 and profile storage (abbreviated) 4602, both which are associated with EE (not shown) are hosted on long-term device 4700, which may be (but is not limited to) a laptop, desktop, cellular phone, tablet computer, home remote control or home TV.

Updates to profile storage (details) 4601 can be encrypted (not shown) and transmitted to storage A 4711, which is part of storage service 4710, and which may be a cloud storage service. Alternatively, if long-term device 4700 is a master device that performs aggregation of profile storage (details) 4601, long-term device 4700 does not communicate updates to profile storage (details) 4601, but instead periodically transmits the entire profile storage (details) 4601, in protected format, to storage A 4711. The protection may include encryption and authentication. By doing this, multiple additions made by one or more devices are aggregated into the same ciphertext element instead of multiple independent ciphertext elements. The contents of storage A 4711 can be synchronized with long-term device 4702 associated with the same user as long-term device 4700, but not copied to short-term device 4701 unless the user associated with the data specifically requests this. Long-term device 4700, and associated EE, periodically generates the updated contents of profile storage (abbreviated) 4602 from profile storage (details) 4601, where profile storage (abbreviated) 4602 includes high-level characterizations of user preferences, and profile storage (details) 4601 includes detailed event-based characterizations. Long-term device 4700 periodically updates the contents of storage B 4712 with the contents of profile storage (abbreviated) 4602, which are synchronized with short-term device 4701 as this is being associated with the user associated with profile storage (details) 4601 and profile storage (abbreviated) 4602. This may take place, for example, as a user of personal device 4703 uses personal device 4703 to authenticate to short-term device 4701 in a manner that is associated with an identifier linked to storage B 4712. This link may be expressed as a public key, whether short-term or static, and the authentication may include a digital signature that is verified using the public key.

Figure 48:
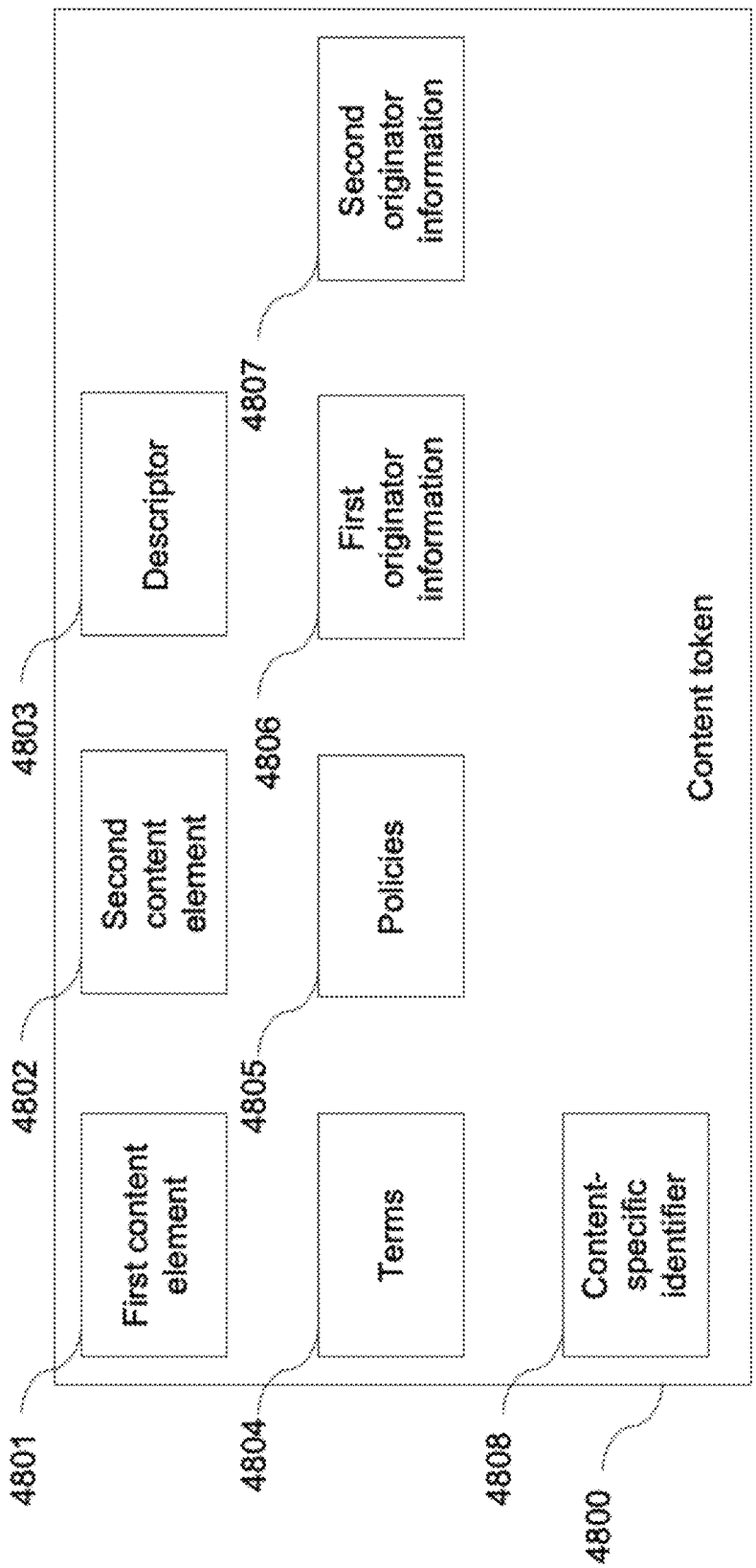
FIG. 48 conceptually illustrates a content token with associated data implemented in accordance with an embodiment of the invention.

A content token with associated data implemented in accordance with an embodiment of the invention is illustrated in FIG. 48. The content token 4800 includes a first content element 4801 and a second content element 4802. For example, the first content element 4801 may be a movie, and second content element 4802 the sound track or subtitles for the movie. Alternatively, the first content element 4801 may be a movie or a song, and second content element 4802 a reference that, when resolved, causes the selection of a commercial to be rendered along with or interspersed in the content of the first content element 4801.

In the illustrated embodiment, the descriptor 4803 includes one of more classifications of first content element 4801 and/or second content element 4802, where example classifications may include labels such as "pre-teen", "horses", "princess", and associations with product categories that may be of interest to viewers, where these product categories may be identified with references or labels such as "anime dolls". The terms 4804 specify the conditions that need to be satisfied for the content of the content token 4800 to be rendered, played or used; example terms may specify geographic boundaries where it is or is not allowed; DRM descriptors identifying required DRM standards for processing the content; TEE descriptors identifying allowed platforms to play the content; subscription identifiers specifying what memberships or payments are needed to use the content, or to provide a discount to access the content.

In certain embodiments, policies 4805 specify the conditions of usage, e.g., only allowed for accounts that are enabled for PG-13 usage, payment policies, and more. In a number of embodiments, first originator information 4806 may identify one or more originators associated with the first content element 4801, and second originator information 4807 may identify one or more originators associated with the second content element 4802. In several embodiments, the content-specific identifier 4808 is a unique identifier associated with content token 4800.

In one embodiment, the EE is running on a trusted execution environment (TEE) or a Digital Rights Management (DRM) supported platform, which may in turn be running in a TEE. The TEE and DRM platform are also used for purposes of delivering content to users in a secure manner, and in accordance with licenses associated with the content. By using the same TEE and DRM of the current disclosure, additional benefits are obtained. For example, as content is delivered, the type of content informs the EE of the interests and needs of the user. The more the EE knows, the better recommendations for content and promotional content it can provide, and the better guidance. As one example of guidance is information of applicable offers related to users of the identified profile, where such offers can provide reductions of costs, such as of loans, and suggestions of potentially interesting vacation locations and deals on travel there. Another example of guidance is information advising the user of unnecessary services, exorbitant costs, phishing attacks, and potentially illegal activity. In contrast to existing targeted advertising platforms, which are not providing content to help the user, but to maximize the profit obtained from the user, the disclosed technologies both address the needs of users and of service providers wishing to promote their merchandise and services. When promotions are more successful due to more appropriate suggestions, a smaller number of promotional items are needed to pay for services provided to the user. For example, instead of displaying four commercials every ten minutes during a movie watched by the user, the system may identify one or two promotional content elements to display during the entire movie. This is less disruptive and more informative to the user, while at the same time creating greater benefits to the advertiser.

While specific EEs, processes for synchronizing data between EEs and/or processes that can be utilized by EEs to monitor interactions with content tokens are described, any of a variety of EE configurations and processes for building profile data using EEs can be utilized as appropriate to the requirements of specific applications in accordance with various embodiments of the invention. Processes for securely appending data and verifying authorization to access appended data in accordance with various embodiments of the invention are discussed further below.

Appending Information to Records

In several embodiments, a cloud platform has two storage areas associated with each user identifier: a first and encrypted area that is not accessible by the cloud platform, and a second area that stores information that is accessible to the cloud platform. The first area can store profile information such as the information described above, which may have considerable amounts of details, some of which may be personally identifiable or sensitive. The second area may include general topics of information that is of interest to the user, but no personal information and/or not sensitive information. For example, the second area may include information specifying that the associated user is interested in new trucks in the price range of $50-$65 k. An EE of a temporary device may be allowed to contribute to the first area, but not access data from it. The first area can be referred to as "append-only" with respect to the temporary device. However, the EE of the temporary device may be provided with information from the second area. Alternatively, after binding to the cloud platform and providing a user identifier, the EE of the temporary device may be provided with promotional material, or references to such material, from the cloud platform, where the selections can be informed by the contents of the second area. These contents can be generated by EEs with access to the content of the first area, such as an EE associated with the user's phone.

In several embodiments, append-only areas can be created by use of a public key associated with the user's EE. In a number of embodiments, the associated private key is not known by the cloud platform or by service providers. The EE of temporary devices associated with the user can have access to the public key, but not the associated private key. In certain embodiments, the EE of these temporary devices can append information to the records in the append-only area by selecting a session key, which can be a symmetric key, and encrypting the symmetric key with the public key associated with the EE of the user. In certain embodiments, the EE uses the symmetric key to encrypt data to be added to the append-only area. Such data can be authenticated using a message authentication code and/or a digital signature. The message authentication code may use the same symmetric key as for the encryption of the data, or another symmetric key that is encrypted with the public key of the EE of the user. A digital signature may be generated using a private key corresponding to a public key of the EE of the temporary device. The data of the append-only area can be stored in a traditional database and/or using distributed methods. Distributed methods that include the use of error-correction and fragmenting of error corrected data, are described in U.S. Provisional Patent Application No. 63/232,728 titled "Secure and Intelligent Decentralized Technology" by Markus Jakobsson, Stephen C. Gerber and Ajay Kapur. As can be readily appreciated any of a variety of mechanisms can be utilized for securely appending and authenticating access to appended data in accordance with various embodiments of the invention.

Figure 49:
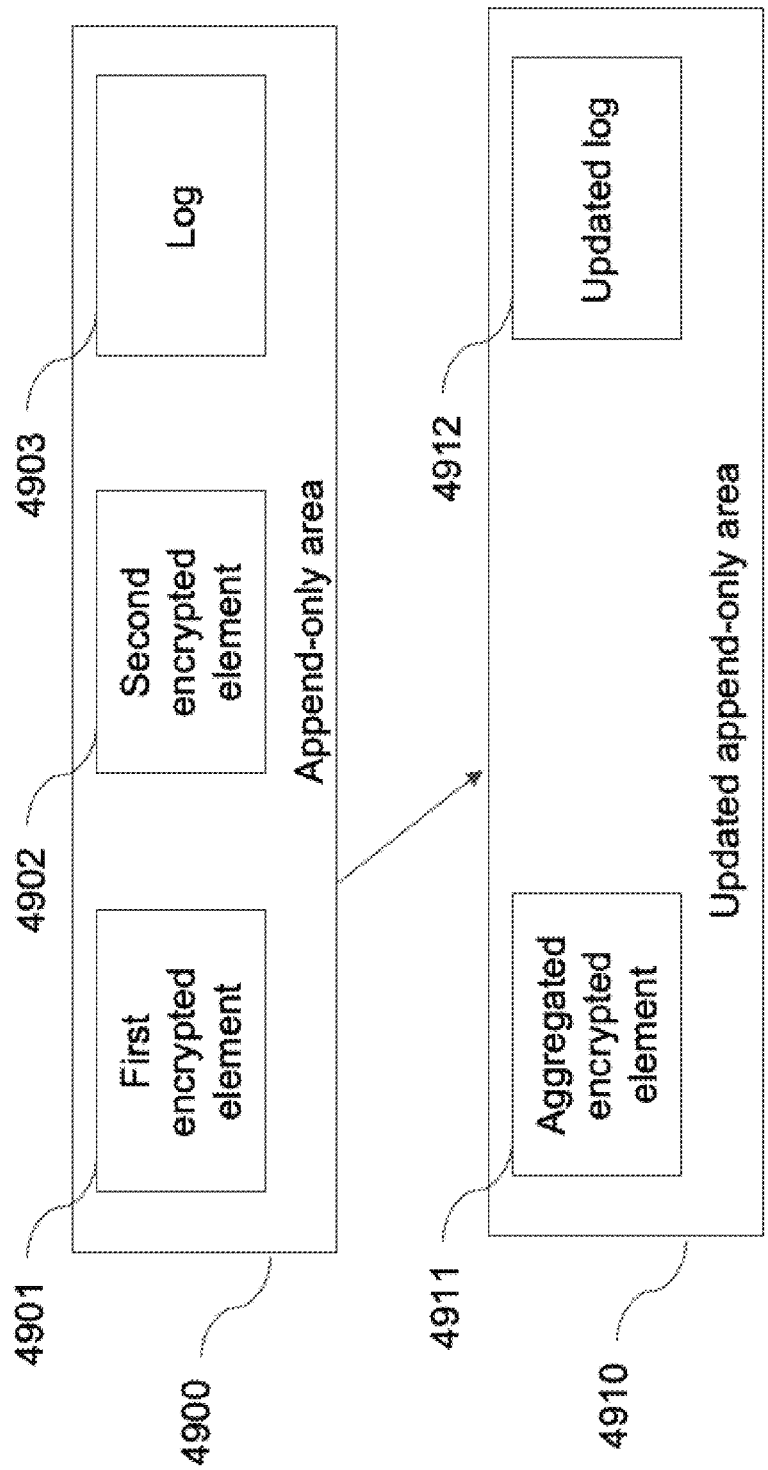
FIG. 49 conceptually illustrates an EE that implements append-only functionality in accordance with an embodiment of the invention.

An EE that implements append-only functionality in accordance with an embodiment of the invention is conceptually illustrated in FIG. 49. In the illustrated embodiment, an append-only area 4900 is illustrated that can only be rewritten by an authorized entity. At a first time, the append-only area 4900 includes a first encrypted element 4901, a second encrypted element 4902, and a log 4903 that describes when and by what entity the first encrypted element 4901 and the second encrypted element 4902 were added to append-only area 4900, as well as optional authentication values, e.g., of the entities that appended first encrypted element 4901 and second encrypted element 4902 to append-only area 4900. As can readily be appreciated, the specific information that is written to an append-only area is largely determined by the requirements of a specific application.

In certain embodiments, the first encrypted element 4901 and the second encrypted element 4902 include authentication values. Furthermore, the log 4903 may be encrypted. There may also be more than two encrypted elements similar to the first encrypted element 4901 and second encrypted element 4902.

At a later time, an updated append-only area 4910 can be created from append-only area 4900 by an entity with access to the decryption key(s) used to encrypt the first encrypted element 4901, and the second encrypted element 4902. In certain embodiment, the decryption key(s) may be one or more private keys associated with a public key(s) associated with append-only area 4900 as well as updated append-only area 4910.

An entity with access to the decryption key(s) can decrypt the first encrypted element 4901 and the second encrypted element 4902. In certain embodiments, an EE determines, based on log 4903 how to combine the results of the now-decrypted first element and now-decrypted second element. From these, the EE can generate an aggregated encrypted element 4911. Furthermore, an entity can create an updated log 4912 based on the log 4903 form the append-only area and additional actions performed by the entity as it created aggregated encrypted element 4911 from the first encrypted element 4901 and then second encrypted element 4902. The entity can then replace the append-only area 4900 with the updated append-only area 4910.

In a number of embodiments, the second area of storage described above can be implemented using storage of the same types as the first storage area. Alternatively, and because the amounts of data associated with the second area of storage are much more limited than those of the first area, it can also be stored on a blockchain in some instances. In several embodiments, the data of the second area of storage can be stored in a public database, and in a manner that enables access by any routine. To avoid negative impacts on user privacy, the records in this second area would not be associated with a long-term identifier of the user to which they belong, but instead using a short-lived pseudonym that is generated by the EE of the user, e.g., using a rolling code algorithm. In many embodiments, a pseudonym is valid for a period of time (e.g., a week), and then the associated record is not relevant, and a new entry is created, describing potentially new interests and a new pseudonym identifier that is not correlated by a third party to the current pseudonym. For example, a pseudonym may be generated as hash(seed, i), where seed is a user-specific random value stored by the user's EE, but which is not accessible to the human user. Here, i is a counter that identifies a time period, and hash a cryptographic hash function or other one-way function. It can also be generated as a new public key, which corresponds to a private key that is generated as hash(seed, i). In this example use case, a phone or other device used by the user to provide information to a temporary EE would not convey a long-term identifier to the temporary EE, but instead, the time-limited pseudonym. When the EE of the temporary device writes data to the append-only area, the temporary key can be used to encrypt the data. The long-term EE associated with the user can have access to the corresponding private key, and is able to combine different append-only additions with the other data of the record, generating an updated record to be stored in the first area.

Figure 51:
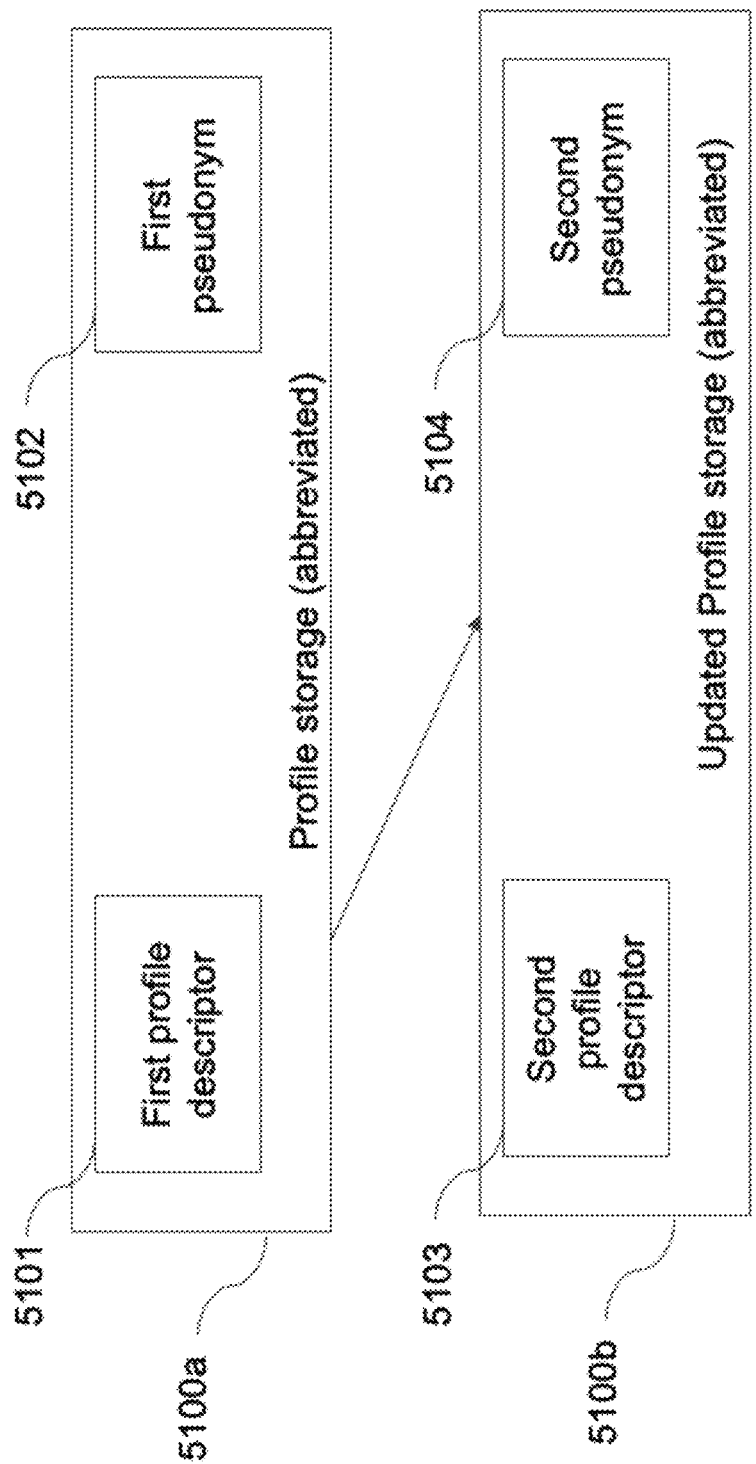
FIG. 51 conceptually illustrates a process for utilizing pseudonyms to securely access profile data in accordance with an embodiment of the invention.

A process for utilizing pseudonyms to securely access profile data in accordance with an embodiment of the invention is conceptually illustrated FIG. 51. In the illustrate embodiment, two consecutive elements of profile storage (abbreviated) 5100*a* and 5100*b* with associated pseudonyms are shown. The profile storage (abbreviated) 5100*a* includes a first profile descriptor 5101, such as (but not limited to) "Interested in buying Ford Bronco, 1990-1995". In several embodiments, the profile storage (abbreviated) 5100*a* can also include a first pseudonym 5102, which may be (but is not limited to) a 256-bit binary value generated using SHA256 on a key and a counter, where the key is known only by the party generating the first pseudonym 5102, which may be the same entity that generated an updated append-only area from an append-only area. Profile storage (abbreviated) 5100*a* can have an expiration date (not shown) which may be the same as the expiration date of many other profile storage elements related to other users. At the time of the expiration, updated profile storage (abbreviated) 5100*b* is used instead of profile storage (abbreviated) 5100*a*. For example, when a temporary EE requests information about a user's interest, the user would be associated with a value matching first pseudonym 5102 during a first time period, and with a value matching second pseudonym 5103 during a second time period that follows the first time period. In some instances, the second profile descriptor 5103 may state a different interest than the first profile descriptor 5101, and may state (but is not limited to) "Interested in seat heater for trucks" or "Has recently purchased a 1992 Ford Bronco", where the latter may indicate a potential interest for related products or services and be based on information that the user performed a purchase.

While specific processes for utilizing pseudonyms to enable temporary EEs to securely access profile data are described above with reference to FIG. 51, any of a variety of processes can be utilized to secure profile data accumulated by EEs in accordance with various embodiments of the invention. Ways in which multiple EEs may interact to gather user action information in accordance with certain embodiments of the invention are discussed further below.

Tracking Users Using Multiple Execution Environments

In several embodiments, two or more execution environments may co-exist in a similar manner as to the dual-storage solutions described above. The two or more execution environments can split the duty of tracking user and influencer behaviors with private, or personally identifiable information maintained by just one of the two instances. This split duty can enable one execution environment to interact with advertisers, for instance, without personally identifiable information. Such interaction can provide advertisers with generic information about interest in their product, such as when the number of non-private EE instances reporting interest in a given product increases. Advertisers often promote products and services in geographical regions, such as countries, counties, cities, and zip codes. Users will be more willing to participate in EE monitoring of their behaviors if they believe a privacy firewall exists between the two EEs that may be monitoring their actions.

In a simple instantiation of dual EEs, a first EE monitors actions and personal information of a specific individual, group, or organization. The first EE can provide the second EE with generic action data that is non-specific to the specific individual, group, or organization. The two EEs may be co-located, or they may be far apart, such as in different countries. The EE instantiations may regularly shift their processing locations in an effort to balance processing loads and to reduce location-based privacy incursions. The EE containing non-personally identifiable information may support multiple EE instances whereby a single EE instance can communicate and aggregate non-personally identifiable information from one or more EE instances containing private information. For example, a manufacturer of bedroom mattresses may wish to improve store sales in a particular zip code with a targeted and highly efficient promotional effort. The manufacturer may utilize an influencer or recommender approach of promotion whereby the manufacturer identifies recent buyers of their product in the target zip code through sales data or registrations, pushes a request for product review via email to those buyers, and then utilizes those reviews with targeted browser advertisements in IP ranges known to exist within or near the target zip code. In exchange for the review, the manufacturer can offer the reviewer a discounted product (e.g., a pillow). As can readily be appreciated, the specific manner in which multiple EEs within a recommendation platform can present recommendations and/or coordinate with advertisers to present advertisements to users is only limited by the requirements of specific applications.

In certain embodiments, advertisements (e.g., display advertisements viewable within a web browser application) may include monitoring capabilities to determine clicks-throughs to the individual buyer reviews. Reviews that place the manufacturer and product in a positive manner should receive, on average, more conversions. In certain embodiments, an advertisement can interact with a first EE, where a potential buyer's personal information is known, and may be configured with EE monitoring characteristics that are controlled by the potential buyer. The first EE, detecting a click-through to a review, can communicate to a second EE the potential buyer's click-through, the one or more reviews displayed, and the zip code of the potential buyer. The first EE may be configured to monitor the potential buyer's email or purchase history to later confirm with certainty that the potential buyer made a purchase at the store, or online, and is in the targeted zip code. This purchase confirmation may be provided again to the second EE, but again only with product information and generic zip code details. The successful purchase attribution may now be made to the original buyer and their review, and a pillow discount offered. The original buyer may also be interacting with a dual-EE system whereby the original buyer is also treated with privacy and provided the discount in a reverse direction from the original buyer's second EE to their first EE. The advertisement referenced in the example above, may be replaced with a personalized animated character that speaks to the potential buyer through augmented and/or virtual environments such as interactions with a smartphone voice assistant or an animated character in a gaming environment. In the animated character example, the EE system would interact with the potential buyer, and/or the previous buyer, in a manner similar to that of the browser advertisement example. As can be readily appreciated, EEs implemented in accordance with various embodiments of the invention are not limited to interact with specific advertising channels and can track conversions with respect to any of a variety of advertising platforms appropriate to the requirements of a specific application.

Figure 50:
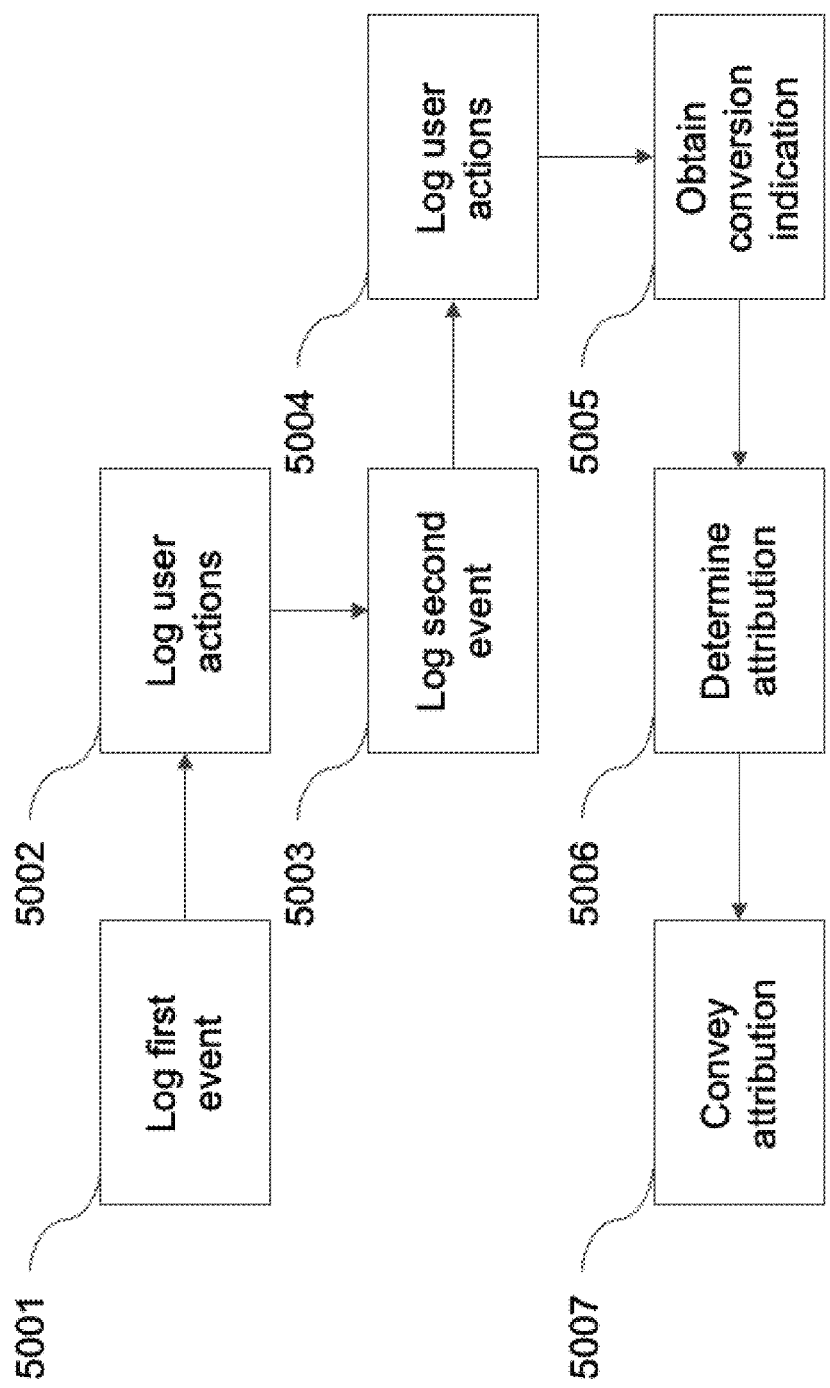
FIG. 50 illustrates a process for determining an attribution associated with a conversion in accordance with an embodiment of the invention.

A process for determining an attribution associated with a conversion in accordance with an embodiment of the invention is illustrated in FIG. 50. The process 5000 includes an EE logging (5001) a first event, which may be determined by event handler. In several embodiments, the EE also logs (5002) user actions. Examples of user actions can include (but are not limited to) time spent watching an advertisement before skipping it, if applicable.

In certain embodiments, the EE logs (5003) a second event 503, which may also be determined by event handler, but may also be determined by an external entity and conveyed to the EE. The EE can also log (5004) user actions related to the second event. In many embodiments, the EE obtains (5005) a conversion indication. For example, conversion indications can include (but are not limited to) a user action observed by event handler, such as a purchase request or request for a coupon. They may also be external, such as a message being conveyed to the EE stating that a particular coupon associated with the logged second event (5003), for example, was used.

In many embodiments, the EE determines (5006) an attribution of the conversion to one or more events, such as the first event and the second event. In several embodiments, the attribution can be determined by analyzing the logs and determining, potentially using a rule-based engine or a machine learning based model or AI model. The attribution can be conveyed (5007 to an external entity, such as (but not limited to) an entity that provides awards to product promoters based on their apparent success in causing conversions such as purchases.

Figure 52:
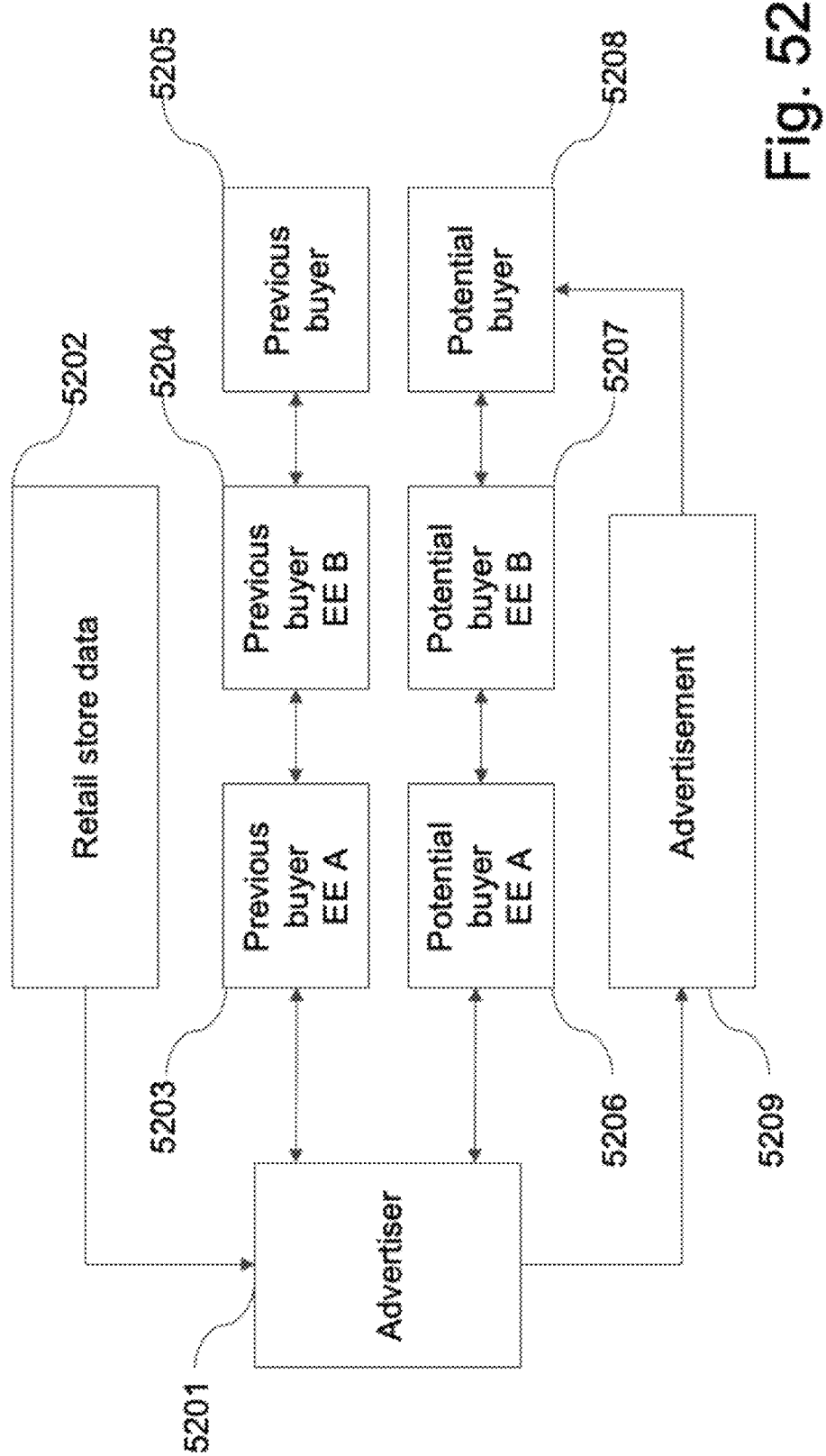
FIG. 52 illustrates an advertiser utilizing a dual execution environment configuration to influence a potential buyer.

FIG. 52 illustrates an advertiser utilizing a dual execution environment configuration to influence a potential buyer. The advertiser 5201, which can be considered to have a similar role to mattress advertiser in the example discussed above, utilizes retail store sales data 5202 and advertisements 5209 to influence a potential buyer 5208 with the use of a pair of dual EE configurations. The first dual EE configuration can involve a previous buyer EE A 5203 and a previous buyer EE B 5204. The second dual EE configuration involves a potential buyer EE A 5106 and a potential buyer EE B 5207. Advertiser 5201 can utilize retail store data 5202 to offer an enticement such as (but not limited to) an enticement for a coupon to leave a review. The enticement may be through any suitable contact method, including the ability for the advertiser 5201 to contact previous buyer 5205 through an anonymous dual EE. The advertiser receives a publicly viewable review from previous buyer 5205, advertises 5209 the review publicly, or in a targeted manner, such as geographical, and entices potential buyer 5208 to click through the advertisement and ultimately purchase the mattress. The click-through can pass through the potential buyer EE pair and the influencer. In many embodiments, the previous buyer 5205 is credited with influencing a sale and ultimately receives a benefit (e.g., a coupon). One skilled in the art will recognize that the advertiser and buyers have numerous potential communication mediums with which to pass information, including an EE, or a pair of EEs designed to protect consumer privacy and encourage the consumer to adopt the new form of communication and tracking. Accordingly, a variety of processes can be utilized by EEs to determine attribution in accordance with various embodiments of the invention.

The described execution environments and associated storage systems may be operated on behalf of promoters or advertisers, they may be operated on behalf of a specific individual, group, or organization, or a combination of both. EE systems operated solely by advertisers may be inherently considered untrustworthy by consumers. Consumers generally prefer to not be spied on, even if the advertiser is utilizing a dual EE environment to assure the consumer's privacy. Therefore, it is expected that the disclosed EE systems may be configured on behalf of specific consumers, or at their request in exchange for value, such as the ability to receive recommendations, rewards, coupons, deal suggestions, etc. An EE promotional system configured with the full consent of the consumer is likely to improve the adoption of such systems and to increase the trust between advertisers and consumers.

While various EEs are described above, it should be readily be appreciated that the processes similar to those described above can be performed on a variety of EEs. In several embodiments, the EE may include an operating system running a DRM, with the support of a TEE, such as TrustZone. The DRM may, at configuration time, generate a key pair, including a public key and a private key, and become associated with the public key. One way to associate the EE may be for a trusted third party to generate a digital certificate on the public key, and on a descriptor of the EE. This descriptor may include a unique identifier, and a list of descriptive elements related to the DRM model, the type of TEE, the type and minimum version of the operating system. The minimum version corresponds to the installed version at the time of certification. As this at some point is updated to a newer version of the same operating system, it remains in compliance with the certificate. Alternatively, the certificate may require updating once a newer version of the operating system is available, to verify and recertify that it runs the more recent version. In some instances, a certified EE that is in compliance with requirements is trusted to request an update of the certificate without on-site inspection, with the certificate authority simply reviewing statements made from a unit that is part of the DRM running in the EE, and determining based on these statements whether to recertify. One such statement may be the result of an anti-virus scan; another may be a list of all installed software and its versions. Based on the extent to which an EE satisfies requirements verified by the certificate authority, it may qualify for different levels of certification. Based on the level of certification, different types of computation may be allowed to be performed by the EE, different types of inputs may be provided to the EE, and/or different types of roles are allowed by the EE. One example of a role is to perform actions associated with trusted tokens, as disclosed in U.S. Provisional Patent Application No. 63/213,251 titled "Token Creation and Management Structure", by Markus Jakobsson. Some actions, such as processing data using secret keys, such as described in "Integration of Real-World Data and Measurements into Distributed and Consensus-Based Environments" by Markus Jakobsson, may require a minimum DRM requirement to be met. Yet other actions, such as storing sensitive data, or portions of such data, may require the use of a TEE that meets some minimum requirements. This is disclosed in U.S. Provisional Patent Application No. 63/232,728 titled "Secure and Intelligent Decentralized Technology" by Markus Jakobsson, Stephen C. Gerber, and Ajay Kapur. Having a minimum certification level may also be required to receive access to sensitive profile data, such as the detailed first storage area profile data disclosed herein. Other security requirements placed on executional environments may include (but are not limited to) having an approved anti-virus software module installed, having an approved operating system installed, having an approved browser type and version installed, having all patches of an identified type installed, not being associated with high-risk IP addresses, and/or communicating between EEs with a secure virtual private network (VPN).

Exemplary Embodiments

While many embodiments are described above, a number of significant exemplary embodiments of the various inventions described herein are provided below by way of example.

A recommendation platform in accordance with a first embodiment includes: a network interface; memory; and a processor, the processor configured to:
retrieve transaction data records stored within an immutable ledger, where each retrieved data record is associated with a public key; and
each public key is associated with a user profile;
identify a need associated with a specific user profile based upon information including retrieved data records associated with the public key of the specific user profile;
identify retrieved data records containing information relevant to the identified need;
identify user profiles associated with the retrieved data records containing information relevant to the identified need;
determine weights based upon similarity of the identified user profiles associated with the retrieved data records containing information relevant to the identified need and the specific user profile;
weight the information from the retrieved data records containing information relevant to the identified need based upon the determined weights;
generate a recommendation with respect to a resource based upon the weighted information from the retrieved data records containing information relevant to the identified need; and
transmit the recommendation to a user device associated with the specific user profile.

A recommendation platform in accordance with a second embodiment includes the features of the first embodiment, wherein the resource is at least one of a specific product and a specific service.

A recommendation platform in accordance with a third embodiment includes the features of any of the first and second embodiments, wherein the retrieved transaction data records stored within an immutable ledger include transactions reflecting actions associated with user profiles.

A recommendation platform in accordance with a fourth embodiment includes the features of any of the first through third embodiments, wherein the processor is further configured to: determine a precision of the recommendation based upon the weighted information from the retrieved data records containing information relevant to the identified need; and transmit the precision to the user device associated with the specific user profile.

A recommendation platform in accordance with a fifth embodiment includes the features of the fourth embodiment, wherein the processor is further configured to determine that the precision is insufficient to generate a recommendation.

A recommendation platform in accordance with a sixth embodiment includes the features of the fifth embodiment, wherein the determination that the precision is insufficient to generate a recommendation includes comparing the determined precision to a threshold.

A recommendation platform in accordance with a seventh embodiment includes the features of any of the first through sixth embodiments, wherein the recommendation includes rendering information that directs the user device how to render the recommendation via a user interface.

A recommendation platform in accordance with an eighth embodiment includes the features of any of the first through seventh embodiments, wherein the recommendation includes a plurality of alternative recommendations.

A recommendation platform in accordance with a ninth embodiment includes the features of any of the first through eighth embodiments, wherein the processor is further configured to determine weights by generating a matrix of weights for the specific user profile.

A recommendation platform in accordance with a tenth embodiment includes the features of any of the first through ninth embodiments, wherein the matrix of weights includes: a first dimension that corresponds to different user profiles; and a second dimension that corresponds to a weighted array, where each entry in the weighted array corresponds to a weight for one resource characterized in that the weight indicates the similarity of the specific user profile with one of the different user profiles.

A recommendation platform in accordance with an eleventh embodiment includes the features of the tenth embodiment, wherein the matrix of weights further includes a third dimension corresponding to different resources.

A recommendation platform in accordance with a twelfth embodiment includes the features of any of the tenth or eleventh embodiments, wherein the matrix of weights further includes at least one dimension representing at least one of temporal aspects, and preferences.

A recommendation platform in accordance with a thirteenth embodiment includes the features of any of the first through twelfth embodiments, wherein the processor is further configured to estimate the scarcity of a resource to which the recommendation relates.

A recommendation platform in accordance with a fourteenth embodiment includes the features of any of the first through thirteenth embodiments, wherein the processor is further configured to receive the specific user profile as an input.

A recommendation platform in accordance with a fifteenth embodiment includes the features of the fourteenth embodiment, wherein the specific user profile includes at least one selected from the group consisting of:
  demographic data;
  action data; and
  at least one recommendation associated with the specific user profile.

A recommendation platform in accordance with a sixteenth embodiment includes the features of any of the first through fifteenth embodiments, wherein the processor is further configured to identify opinions associated with the specific user profile.

A recommendation platform in accordance with a seventeenth embodiment includes the features of the sixteenth embodiment, wherein at least one of the opinions associated with the specific user profile is identified within the retrieved transaction data records.

A recommendation platform in accordance with an eighteenth embodiment includes the features of any of the first through seventeenth embodiments, wherein the processor is further configured to use the specific user profile to retrieve at least one additional source of information selected from the group consisting of:
  demographic data;
  action data; and
  at least one recommendation associated with the specific user profile.

A recommendation platform in accordance with a nineteenth embodiment includes the features of any of the first through eighteenth embodiments, wherein the processor is further configured to store information concerning features of the resource as an N-dimensional feature vector.

A recommendation platform in accordance with a twentieth embodiment includes the features of any of the first through nineteenth embodiments, wherein the processor is further configured to generate a self-organized map of a plurality of resources based upon N-dimensional feature vectors for each of the plurality of resources.

A recommendation platform in accordance with a twenty-first embodiment includes the features of any of the first through twentieth embodiments, wherein the processor is further configured to generate a lower dimensional representation of a plurality of resources based upon N-dimensional feature vectors for each of the plurality of resources.

A recommendation platform in accordance with a twenty-second embodiment includes the features of any of the first through twenty-first embodiments, wherein the processor is further configured to identify a subspace of a plurality of resources based upon N-dimensional feature vectors for each of the plurality of resources.

A recommendation platform in accordance with a twenty-third embodiment includes the features of any of the first through twenty-second embodiments, wherein the subspace corresponds to a plurality of resources having at least one characteristic relevant to the identified need.

A recommendation platform in accordance with a twenty-fourth embodiment includes the features of any of the first through twenty-third embodiments, wherein the processor is further configured to detect user profiles associated with abuse based upon the retrieve transaction data records and a representation of a plurality of resources.

A recommendation platform in accordance with a twenty-fifth embodiment includes the features of any of the first through twenty-fourth embodiments, wherein the processor is further configured to automatically generate user profiles.

A recommendation platform in accordance with a twenty-sixth embodiment includes the features of any of the first through twenty-fifth embodiments, wherein the retrieved transaction data records include information concerning conversion of a previously generated recommendation and the processor is further configured to determine an attribution for the conversion to one of the user profiles associated with the retrieved data records.

A process in accordance with a twenty-seventh embodiment including:
  retrieving data records from at least one immutable ledger using a recommendation platform, where each retrieved data record is associated with a public key;
  associating information obtained from retrieved data records associated with specific public keys using the recommendation platform;
  generating at least one user profile based on information associated with specific public keys using the recommendation platform;
  generating at least one characterization for association within the at least one user profile based on information associated with specific public keys using the recommendation platform;
  receiving a request with respect to an identifier associated with an identified user profile using the recommendation platform; and
  generating a response to the request based upon at least one characterization associated with the identified user profile using the recommendation platform.

A process in accordance with a twenty-eight embodiment includes the features of the twenty-seventh embodiment and further including creating a cluster of user profiles based upon characterizations associated with the clustered user profiles.

A process in accordance with a twenty-ninth embodiment includes the features of the twenty-eight embodiments, wherein the response is a recommendation generated based upon the cluster of user profiles.

A process in accordance with a thirtieth embodiment includes the features of any of the twenty-seventh to twenty-ninth embodiments, wherein the request includes a template identifying at least one characterization.

A process in accordance with a thirty-first embodiment includes the features of any of the twenty-seventh and thirtieth embodiments and further including receiving information associated with the at least one user profile from at least one end-user module present on at least one user device.

A process in accordance with a thirty-second embodiment includes the features of the thirty-first embodiment, wherein the information associated with the at least one user profile is a token.

A process in accordance with a thirty-third embodiment includes the features of any of the twenty-seventh to thirty-second embodiments, wherein the response is a token.

A process in accordance with a thirty-fourth embodiment includes the features of any of the twenty-seventh to thirty-third embodiments and further including receiving information associated with the at least one user profile from at least one execution environment present on at least one user devices.

A user device in accordance with a thirty-fifth embodiment includes: a network interface; memory; and a processor, the processor configured to implement an execution environment that enables:
  initiation of transactions via an immutable ledger;
  recordation of events;
  updating a user profile, where the user profile includes at least one characterization associated with the user profile;
  encrypting the updated user profile and securely storing the encrypted user profile;
  receiving a request to access the encrypted user profile from a process;
  determining access permissions of the process; and
  when the process has sufficient access permissions, decrypting the user profile and providing user profile data to the process.

A user device in accordance with a thirty-sixth embodiment includes the features of the thirty-fifth embodiment, wherein the events include user request and user actions.

A user device in accordance with a thirty-seventh embodiment includes the features any of the thirty-fifth and thirty-sixth embodiments, wherein the processor is further configured to transmit user profile data for remote storage.

A user device in accordance with a thirty-eighth embodiment includes the features any of the thirty-fifth to thirty-seventh embodiments, wherein the processor is further configured to receive user profile data from a remote source and the execution environment enables updating of the user profile data of the encrypted user profile based upon the received user profile data.

A user device in accordance with a thirty-ninth embodiment includes the features any of the thirty-fifth to thirty-eighth embodiments, wherein the processor is further configured to create an append-only area of user profile data using a public key associated with the execution environment and a corresponding private key.

A user device in accordance with a fortieth embodiment includes the features any of the thirty-fifth to thirty-ninth embodiments, wherein the request includes a pseudonym and the process is determined to have sufficient access permissions when the pseudonym is matches a pseudonym associated with the user profile.

A recommendation platform in accordance with a forty-first embodiment including: a network interface; memory; and a processor, the processor configured to:
  retrieve transaction data records stored within an immutable ledger, where each retrieved data record is associated with a public key; and
  each public key is associated with a user profile;
  identify a plurality of needs;
  identify retrieved data records containing information relevant to each of the plurality of identified needs;
  identify user profiles associated with the retrieved data records containing information relevant to the identified need;
  determine a plurality of recommendations with respect to each of the plurality of identified needs based upon the retrieved data records containing information relevant to each of the plurality of identified needs;
  identify a need from the plurality of identified needs associated with a specific user profile based upon information including retrieved data records associated with the public key of the specific user profile;
  determine weights based upon similarity of the identified user profiles associated with the retrieved data records containing information relevant to the identified need from the plurality of identified needs and the specific user profile;
  weight the plurality of recommendations determined with respect to identified need from the plurality of identified needs based upon the determined weights;
  generate a recommendation based upon the plurality of weighted recommendations; and
  transmit the recommendation to a user device associated with the specific user profile.

A recommendation platform in accordance with a forty-second embodiment includes the features of the forty-first embodiment, wherein the resource is at least one of a specific product and a specific service.

A recommendation platform in accordance with a forty-third embodiment includes the features any of the forty-first and forty-second embodiments, wherein the retrieved transaction data records stored within an immutable ledger include transactions reflecting actions associated with user profiles.

A recommendation platform in accordance with a forty-fourth embodiment includes the features any of the forty-first to forty-third embodiments, wherein the processor is further configured to: determine a precision of the recommendation based upon the weighted information from the retrieved data records containing information relevant to the identified need; and transmit the precision to the user device associated with the specific user profile.

A recommendation platform in accordance with a forty-fifth embodiment includes the features of the forty-fourth embodiment, wherein the processor is further configured to determine that the precision is insufficient to generate a recommendation.

A recommendation platform in accordance with a forty-sixth embodiment includes the features of the forty-fifth embodiment, wherein the determination that the precision is insufficient to generate a recommendation includes comparing the determined precision to a threshold.

A recommendation platform in accordance with a forty-seventh embodiment includes the features any of the forty-first to forty-sixth embodiments, wherein the recommendation includes rendering information that directs the user device how to render the recommendation via a user interface.

A recommendation platform in accordance with a forty-eight embodiment includes the features any of the forty-first to forty-seventh embodiments, wherein the recommendation includes a plurality of alternative recommendations.

A recommendation platform in accordance with a forty-ninth embodiment includes the features any of the forty-first to forty-ninth embodiments, wherein the processor is further configured to determine weights by generating a matrix of weights for the specific user profile.

A recommendation platform in accordance with a fiftieth embodiment includes the features of the forty-ninth embodiment, wherein the matrix of weights include:
 a first dimension that corresponds to different user profiles; and
 a second dimension that corresponds to a weighted array, where each entry in the weighted array corresponds to a weight for one resource characterized in that the weight indicates the similarity of the specific user profile with one of the different user profiles.

A recommendation platform in accordance with a fifty-first embodiment includes the features of the fiftieth embodiment, wherein the matrix of weights further includes a third dimension corresponding to different resources.

A recommendation platform in accordance with a fifty-second embodiment includes the features any of the fiftieth and fifty-first embodiments, wherein the matrix of weights further includes at least one dimension representing at least one of temporal aspects, and preferences.

A recommendation platform in accordance with a fifty-third embodiment includes the features any of the forty-first and fifty-second embodiments, wherein the processor is further configured to estimate the scarcity of a resource to which the recommendation relates.

A recommendation platform in accordance with a fifty-third embodiment includes the features any of the forty-first and fifty-second embodiments, A recommendation platform in accordance with a fifty-fourth embodiment includes the features any of the forty-first and fifty-third embodiments, wherein the processor is further configured to receive the specific user profile as an input.

A recommendation platform in accordance with a fifty-fifth embodiment includes the features of the fifty-fourth embodiment, wherein the specific user profile includes at least one selected from the group consisting of:
 demographic data;
 action data; and
 at least one recommendation associated with the specific user profile.

A recommendation platform in accordance with a fifty-sixth embodiment includes the features any of the forty-first and fifty-fifth embodiments, wherein the processor is further configured to identify opinions associated with the specific user profile.

A recommendation platform in accordance with a fifty-seventh embodiment includes the features any of the forty-first and fifty-sixth embodiments, wherein at least one of the opinions associated with the specific user profile is identified within the retrieved transaction data records.

A recommendation platform in accordance with a fifty-eighth embodiment includes the features any of the forty-first and fifty-seventh embodiments, wherein the processor is further configured to use the specific user profile to retrieve at least one additional source of information selected from the group consisting of:
 demographic data;
 action data; and
 at least one recommendation associated with the specific user profile.

A recommendation platform in accordance with a fifty-ninth embodiment includes the features any of the forty-first and fifty-eighth embodiments, wherein the processor is further configured to store information concerning features of the resource as an N-dimensional feature vector.

A recommendation platform in accordance with a sixtieth embodiment includes the features any of the forty-first and fifty-ninth embodiments, wherein the processor is further configured to generate a self-organized map of a plurality of resources based upon N-dimensional feature vectors for each of the plurality of resources.

A recommendation platform in accordance with a sixty-first embodiment includes the features any of the forty-first and sixtieth embodiments, wherein the processor is further configured to generate a lower dimensional representation of a plurality of resources based upon N-dimensional feature vectors for each of the plurality of resources.

A recommendation platform in accordance with a sixty-second embodiment includes the features any of the forty-first and sixty-first embodiment, wherein the processor is further configured to identify a subspace of a plurality of resources based upon N-dimensional feature vectors for each of the plurality of resources.

A recommendation platform in accordance with a sixty-third embodiment includes the features of the sixty-second embodiment, wherein the subspace corresponds to a plurality of resources having at least one characteristic relevant to the identified need.

A recommendation platform in accordance with a sixty-fourth embodiment includes the features any of the forty-first and sixty-third embodiments, wherein the processor is further configured to detect user profiles associated with abuse based upon the retrieve transaction data records and a representation of a plurality of resources.

A recommendation platform in accordance with a sixty-fifth embodiment includes the features any of the forty-first and sixty-fourth embodiments, wherein the processor is further configured to automatically generate user profiles.

A recommendation platform in accordance with a sixty-sixth embodiment includes the features any of the forty-first and sixty-fifth embodiments, wherein the retrieved transaction data records include information concerning conversion of a previously generated recommendation and the processor is further configured to determine an attribution for the conversion to one of the user profiles associated with the retrieved data records.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A user device configured to initiate transactions via an immutable ledger, comprising:
 a network interface;
 memory; and a processor, the processor configured to implement an execution environment that enables:
  initiation of transactions via the immutable ledger;
  recordation of events;
  updating a user profile, wherein the user profile comprises at least one characterization associated with the user profile;
  encrypting the updated user profile;
  securely storing the encrypted user profile;
  receiving a request to access the encrypted user profile from a process;
  determining access permissions of the process; and
  when the process has sufficient access permissions:
    decrypting the user profile,
    providing user profile data to the process, and
    creating an append-only area of the user profile data using:
      a public key associated with the execution environment, and
      a corresponding private key.

2. The user device of claim 1, wherein the events comprise user requests and user actions.

3. The user device of claim 1, wherein the processor is further configured to transmit the user profile data for remote storage.

4. The user device of claim 1, wherein:
the processor is further configured to receive the user profile data from a remote source, and
the execution environment further enables updating of the user profile data of the encrypted user profile based upon the received user profile data.

5. The user device of claim 1, wherein:
the request includes a pseudonym, and
the process is determined to have the sufficient access permissions when the pseudonym matches a pseudonym associated with the user profile.

6. A computer-implemented method, executed by one or more computer processors, of restricting access to encrypted user profiles, comprising:
  updating a user profile based upon events recorded in an immutable ledger, wherein the user profile comprises at least one characterization associated with the user profile;
  encrypting the updated user profile;
  securely storing the encrypted user profile;
  receiving a request to access the encrypted user profile from a process; and
  determining that the process has sufficient access permissions to perform:
    decrypting the user profile,
    providing user profile data to the process, and
    creating an append-only area of the user profile data using:
      a public key associated with an execution environment, and
      a corresponding private key.

7. The computer-implemented method of claim 6, wherein the events comprise user requests and user actions.

8. The computer-implemented method of claim 6, further comprising transmitting the user profile data for remote storage.

9. The computer-implemented method of claim 6, further comprising receiving the user profile data from a remote source, wherein the execution environment enables updating the user profile data of the encrypted user profile based upon the received user profile data.

10. The computer-implemented method of claim 6, wherein:
the request includes a pseudonym, and
the process is determined to have the sufficient access permissions when the pseudonym matches a pseudonym associated with the user profile.

11. A non-transitory computer-readable medium containing computer-readable instructions, wherein execution of the computer-readable instructions causes one or more processors to:
  update a user profile based upon events recorded in an immutable ledger, wherein the user profile comprises at least one characterization associated with the user profile;
  encrypt the updated user profile;
  securely storing the encrypted user profile;
  receive a request to access the encrypted user profile from a process;
  determine access permissions of the process; and
  when the process has sufficient access permissions:
    decrypt the user profile,
    provide user profile data to the process, and
    create an append-only area of the user profile data using:
      a public key associated with an execution environment, and
      a corresponding private key.

12. The non-transitory computer-readable medium of claim 11, wherein the events comprise user requests and user actions.

13. The non-transitory computer-readable medium of claim 11, wherein the execution of the computer-readable instructions further causes the one or more processors to transmit the user profile data for remote storage.

14. The non-transitory computer-readable medium of claim 11, wherein the execution of the computer-readable instructions further causes the one or more processors to receive the user profile data from a remote source, wherein the execution environment enables updating the user profile data of the encrypted user profile based upon the received user profile data.

15. The non-transitory computer-readable medium of claim 11, wherein:
the request includes a pseudonym, and
the process is determined to have the sufficient access permissions when the pseudonym matches a pseudonym associated with the user profile.

* * * * *